United States Patent [19]
Kimura et al.

[11] Patent Number: 5,905,844
[45] Date of Patent: May 18, 1999

[54] METHOD AND APPARATUS FOR SELECTIVELY RECORDING CHARACTER BROADCASTING PROGRAM DATA

[75] Inventors: Masanori Kimura, Aichi; Masaki Oguro, Tokyo, both of Japan

[73] Assignee: Sony Corporation, Tokyo, Japan

[21] Appl. No.: 08/846,527

[22] Filed: Apr. 29, 1997

Related U.S. Application Data

[63] Continuation of application No. 08/313,270, filed as application No. PCT/JP94/00156, Feb. 3, 1994, abandoned.

[30] Foreign Application Priority Data

Feb. 4, 1993 [JP] Japan ..................................... 5-017608

[51] Int. Cl.$^6$ ..................................................... H04N 5/91
[52] U.S. Cl. ............................................... 386/95; 386/83
[58] Field of Search .......................... 360/18, 19.1, 33.1; 358/335; 386/95–96, 83, 125, 126

[56] References Cited

U.S. PATENT DOCUMENTS

| | | | |
|---|---|---|---|
| 5,132,807 | 7/1992 | Takimoto et al. | 358/335 |
| 5,237,412 | 8/1993 | Nakajima | 358/335 X |

FOREIGN PATENT DOCUMENTS

| | | |
|---|---|---|
| 0 123 959 | 11/1984 | European Pat. Off. . |
| 0183076 | 6/1984 | Japan . |
| 0060165 | 3/1989 | Japan . |
| 0184745 | 7/1989 | Japan . |
| 0026186 | 2/1991 | Japan . |
| 0132479 | 5/1992 | Japan . |
| 0170875 | 6/1992 | Japan . |

OTHER PUBLICATIONS

Patent Abstracts Of Japan vol. 17, No. 19 (E–1306) Jan. 13, 1993.
Patent Abstracts Of Japan vol. 18, No. 17 (E–223) Jan. 25, 1984.
Patent Abstracts Of Japan vol. 14, No. 537 (E–1006) Nov. 27, 1990.
Patent Abstracts Of Japan vol. 14, No. 557 (E–1011) Dec. 11, 1990.
Patent Abstracts Of Japan vol. 9, No. 20 (P–330) Jan. 26, 1985.

*Primary Examiner*—Andrew L. Sniezek
*Attorney, Agent, or Firm*—Frommer Lawrence & Haug, LLP; William S. Frommer

[57] ABSTRACT

A recording and reproducing apparatus which receives character broadcasting information transmitted via a vertical blanking period of audio/video signals. The apparatus detects certain information from the received data, including a prefix portion and character information. The character information is screened for desired information which is then separated from the remaining broadcasting information based on the detected information, such as the prefix portion. The separated data is then recorded in a separate area on the recording track. Video data is recorded in a first area and audio data is recorded in a second area on the recording track. The character broadcasting information is reproduced by inserting the reproduced desired character information into the vertical blanking period of reproduced video data.

10 Claims, 55 Drawing Sheets

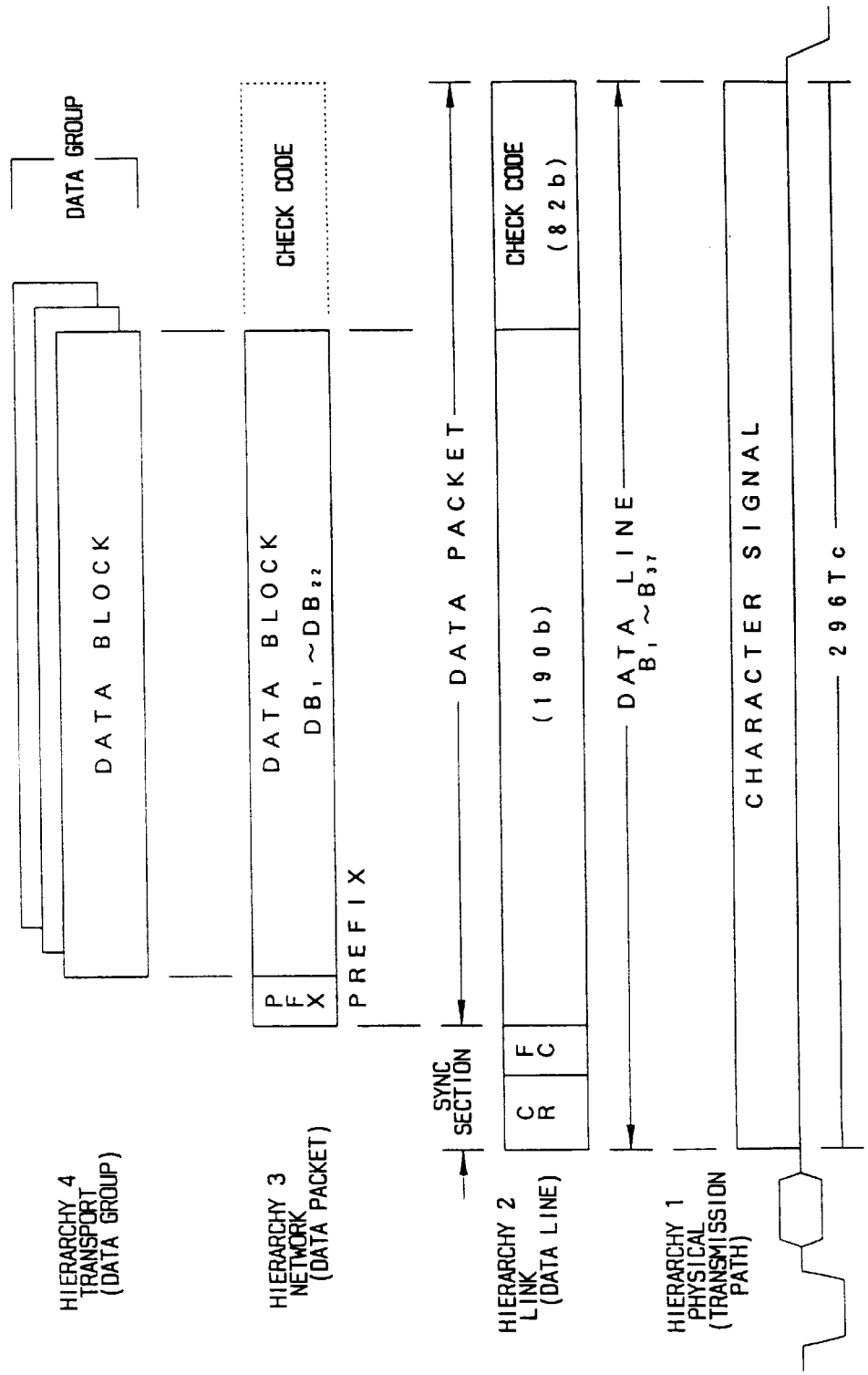

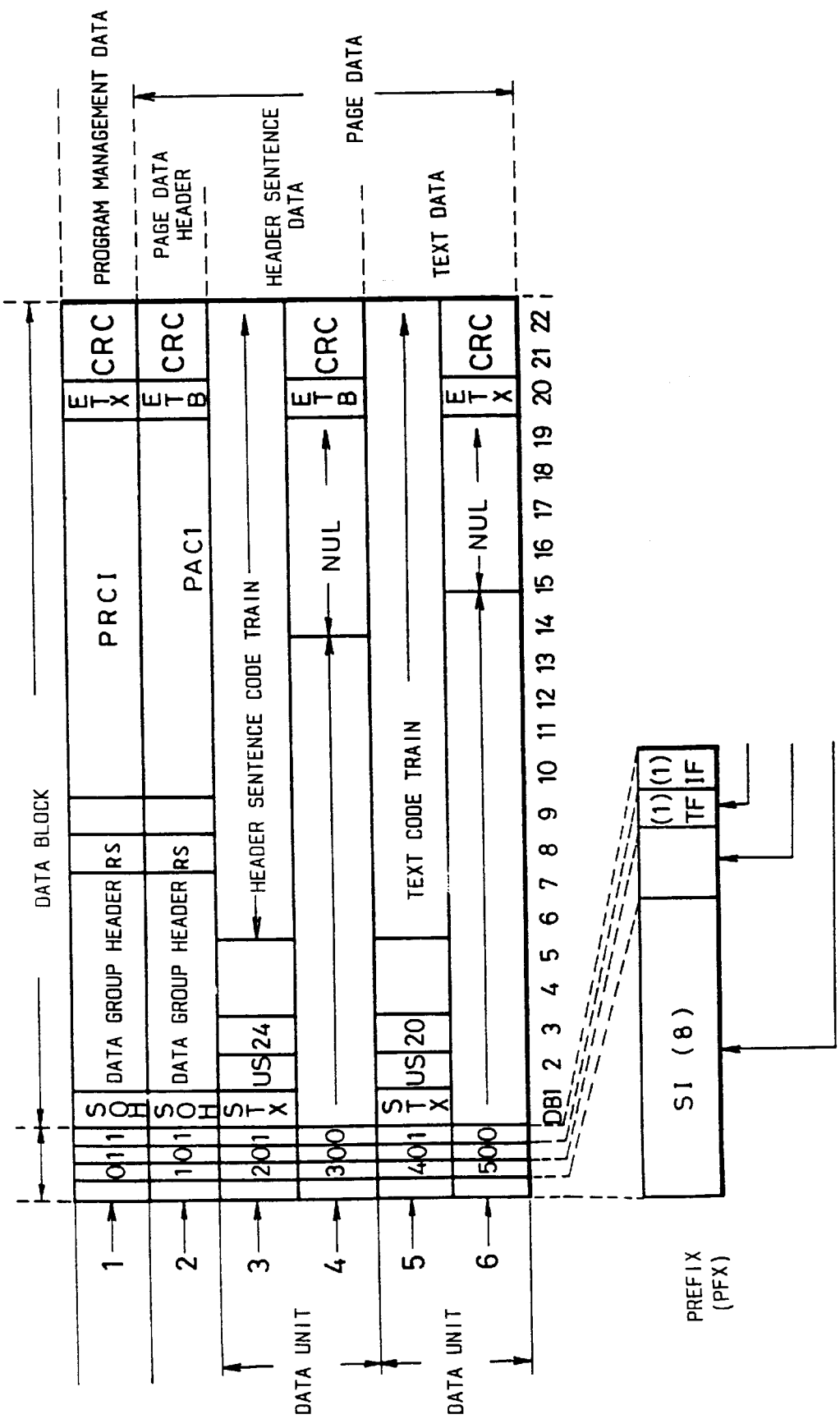

Fig. 8

| | | | | |
|---|---|---|---|---|
| CLOCK RUN-IN | CLOCK RUN-IN | FRAMING CODE | MAGAZINE AND PACKET ADDRESS | SEE BELOW |

X/0

| | | | | |
|---|---|---|---|---|
| CLOCK RUN-IN | CLOCK RUN-IN | FRAMING CODE | MAGAZINE AND PACKET ADDRESS (DISPLAY ROW NO.) | 40 CHARACTER BYTES ODD NUMBER PARITY |

X/1–X/25

| | | |
|---|---|---|
| CLOCK RUN-IN | FRAMING CODE | MAGAZINE PACKET NUMBER ADDRESS 3 BITS 5 BITS |
| 10101010101010 | 11100100 | POPOPOPOPOPOPO |

X/0

| PAGE NO. UNIT | PAGE NO. DIGIT OF 10 | PAGE SUBCODE | PAGE SUBCODE AND CONTROL BIT C4 | PAGE SUBCODE | PAGE SUBCODE C 5 AND C 6 | CONTROL BITS C 7 TO C10 | CONTROL BITS C 11 TO C 14 | 32 CHARACTER BYTES ODD NUMBER PARITY | |
|---|---|---|---|---|---|---|---|---|---|
| POPOPOPO | POPOPOPO | POPOPOPO | POPOPOPC4 | POPOPOPO | POPOPOPC5PC6 | PC7PC8PC9PC10 | PC11PC12PC13PC14 | 0000000P | etc. |
| | | | | | | | | 0000000P | |

WHEN APT = 0 0 0

| ITI | GAP | AREA 1 | GAP | AREA 2 | GAP | AREA 3 |

OVERWRITE MARGIN

Fig. 13B

FURTHER, WHEN
AP1 = AP2 = AP3 = 0 0 0 :

| ITI | GAP | AUDIO | GAP | VIDEO | GAP | SUB CODE |

OVERWRITE MARGIN

| WORD NAME | MSB | LSB |
|---|---|---|
| PC0 | HEADER | |
| PC1 | DATA | |
| PC2 | | |
| PC3 | | |
| PC4 | | |

..... UPPER HEADER

..... LOWER HEADER

..... LOWEST LAYER BY BIT ASSIGNMENT

| TRACK NO. → | 1 | 2 | 3 | 4 | 5 | 6 | 7 | 8 | 9 | 10 |
|---|---|---|---|---|---|---|---|---|---|---|
| 8 | 55 | f | 55 | | 55 | | 55 | | 55 | |
| 7 | 54 | e | 54 | | 54 | | 54 | | 54 | |
| 6 | 53 | d | 53 | | 53 | | 53 | | 53 | |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | c | 52 | | 52 | | 52 | | 52 | | 52 |
| 1 | b | 51 | h | 51 | | 51 | | 51 | | 51 |
| PACK NO. 0 | a | 50 | g | 50 | | 50 | | 50 | | 50 |

```
MSB  APPLI 2   SYNC 7
     APPLI 1   SYNC 6
     APPLI 0   SYNC 5
     SEQ 0     SYNC 4
     TRACK 3   SYNC 3
     TRACK 2   SYNC 2
     TRACK 1   SYNC 1
     TRACK 0   SYNC 0
LSB
```

```
MSB  SEQ 3     SYNC 7
     SEQ 2     SYNC 6
     SEQ 1     SYNC 5
     SEQ 0     SYNC 4
     TRACK 3   SYNC 3
     TRACK 2   SYNC 2
     TRACK 1   SYNC 1
     TRACK 0   SYNC 0
LSB
```

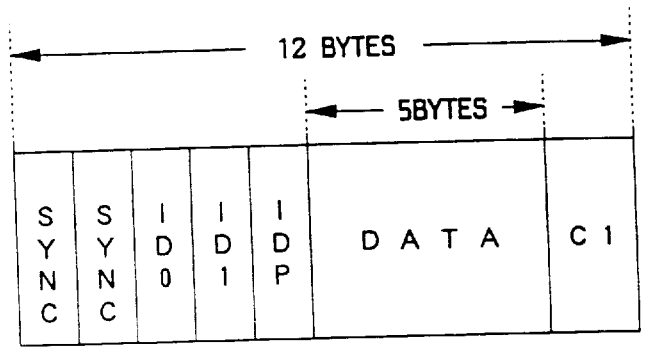

Fig. 33

| VAUX PACK NO. | TRACK NO. | | | | | | | | | |
|---|---|---|---|---|---|---|---|---|---|---|
| | 1 | 2 | 3 | 4 | 5 | 6 | 7 | 8 | 9 | 10 |
| | 6 5 | | 6 5 | | 6 5 | | 6 5 | | 6 5 | F F H |
| | 6 4 | | 6 4 | | 6 4 | | 6 4 | | 6 4 | F F H |
| | 6 3 | T 3 | 6 3 | | 6 3 | | 6 3 | | 6 3 | F F H |
| | 6 2 | T 2 | 6 2 | | 6 2 | | 6 2 | | 6 2 | . |
| 40 | 6 1 | T 1 | 6 1 | . | 6 1 | | 6 1 | | 6 1 | . |
| | 6 0 | T 0 | 6 0 | . | 6 0 | | 6 0 | | 6 0 | . |
| | T 3 8 | T 7 1 | | . | | | | | | . |
| | T 3 7 | T 7 0 | | . | | | | | | |
| | . | T 6 9 | | T 3 | | | | | | |
| 35 | . | . | | T 2 | | | | | | |
| | . | . | | T 1 | | . | | | | |
| | . | . | | T 0 | | . | | | | |
| | | . | | T 7 1 | | . | | | | |
| | | | | T 7 0 | | . | | | | |
| 30 | | | | T 6 9 | | T 3 | | | | |
| | | | | . | | T 2 | | | | |
| | | | | . | | T 1 | | . | | |
| | | | | . | | T 0 | | . | | |
| | | | | . | | T 7 1 | | . | | |
| 25 | | | | | | T 7 0 | | . | | |
| | | | | | | T 6 9 | | T 3 | | |
| | | | | | | . | | T 2 | | |
| | | | | | | . | | T 1 | | |
| | | | | | | . | | T 0 | | . |
| 20 | | | | | | . | | T 7 1 | | . |
| | | | | | | | | T 7 0 | | . |
| | | | | | | | | T 6 9 | | . |
| | | | | | | | | . | | F F H |
| | | | | | | | | . | | F F H |
| 15 | | | | | | | | . | | F F H |
| | | | | | | | | . | | T 7 1 |
| | | | | | | | | | | T 7 0 |
| | | | | | | | | | | T 6 9 |
| | | | . | | | | | | | . |
| 10 | | | . | | | | | | | . |
| | | | . | | | | | | | . |
| | | T 4 1 | | | | | | | | |
| | | T 4 0 | | | | | | | | . |
| | . | T 3 9 | | | | | | | | . |
| 5 | . | 6 5 | | 6 5 | | 6 5 | | 6 5 | | 6 5 |
| | . | 6 4 | | 6 4 | | 6 4 | | 6 4 | | 6 4 |
| | T 3 | 6 3 | | 6 3 | | 6 3 | | 6 3 | | 6 3 |
| | T 2 | 6 2 | | 6 2 | | 6 2 | | 6 2 | | 6 2 |
| | T 1 | 6 1 | | 6 1 | | 6 1 | | 6 1 | | 6 1 |
| 0 | T 0 | 6 0 | | 6 0 | | 6 0 | | 6 0 | | 6 0 |

Fig. 34

| | MSB | | | | | | | LSB |
|---|---|---|---|---|---|---|---|---|
| PC0 | 0 | 1 | 1 | 0 | 1 | 0 | 0 | 0 |
| PC1 | ········ TDP (BINARY) ········▶ LSB | | | | | | | |
| PC2 | TEXT TYPE | | | | OPTION | | | ◀······ MSB |
| PC3 | TEXT CODE | | | | | | | |
| PC4 | | | | | | | | |

Fig. 35

| | MSB | | | | | | | LSB |
|---|---|---|---|---|---|---|---|---|
| PC0 | 0 | 1 | 1 | 0 | 0 | 1 | 1 | 1 |
| PC1 | | | | | | | | |
| PC2 | TELETEXT DATA | | | | | | | |
| PC3 | | | | | | | | |
| PC4 | | | | | | | | |

Fig. 36

| | MSB | | | | | | | LSB |
|---|---|---|---|---|---|---|---|---|
| PC0 | 0 | 1 | 0 | 0 | 1 | 0 | 0 | 0 |
| PC1 | ········ TDP (BINARY) ········▶ LSB | | | | | | | |
| PC2 | TEXT TYPE | | | | OPTION | | | ◀······ MSB |
| PC3 | TEXT CODE | | | | | | | |
| PC4 | | | | | | | | |

Fig. 37

| | MSB | | | | | | | LSB |
|---|---|---|---|---|---|---|---|---|
| P C 0 | 0 | 0 | 0 | 0 | 1 | 1 | 0 | 0 |
| P C 1 | | | | | | | | |
| P C 2 | | | | | | | | |
| P C 3 | | | | | | | | |
| P C 4 | | | | | | | | |

Fig. 39A

CHARACTER MULTIPLEX BROADCAST

| | MSB | | | | | | | LSB |
|---|---|---|---|---|---|---|---|---|
| P C 0 | 0 | 0 | 0 | 0 | 1 | 1 | 0 | 0 |
| P C 1 | DIGIT OF 10 OF PROGRAM | | | | DIGIT OF 1 OF PROGRAM | | | |
| P C 2 | MAGAZINE NO. | | | | DIGIT OF 100 OF PROGRAM | | | |
| P C 3 | DIGIT OF 10 OF PAGE NO. | | | | DIGIT OF 1 OF PAGE NO. | | | |
| P C 4 | DIGIT OF 10 OF ALL PAGES | | | | DIGIT OF 1 OF ALL PAGES | | | |

Fig. 39B

WST

| | MSB | | | | | | | LSB |
|---|---|---|---|---|---|---|---|---|
| P C 0 | 0 | 0 | 0 | 0 | 1 | 1 | 0 | 0 |
| P C 1 | DIGIT OF 10 OF PAGE | | | | DIGIT OF 1 OF PAGE | | | |
| P C 2 | 1 | 1 | 1 | 1 | DIGIT OF 100 OF PAGE | | | |
| P C 3 | DIGIT OF 10 OF SUBPAGE NO. | | | | DIGIT OF 1 OF PAGE SUBPAGE NO. | | | |
| P C 4 | DIGIT OF 10 OF ALL SUBPAGES | | | | DIGIT OF 1 OF ALL SUBPAGES | | | |

Fig. 38

| TEXT TYPE (HEX) | | PROGRAM TEXT HEADER |
|---|---|---|
| NAME | 0 | PROGRAM NAME |
| MEMORANDUM | 1 | MEMO REGARDING PROGRAM |
| STATION | 2 | NAME OF BROADCASTING STATION |
| MODEL | 3 | PROGRAM SOURCE MODEL NAME |
| LENS | 4 | ———— |
| FILTER | 5 | ———— |
| OPERATOR | 6 | NAME OF OPERATER |
| SUBTITLE | 7 | SUBTITLE |
| OUTLINE | 8 | OUTLINE OF PROGRAM |
| TELETEXT | 9 | FULL SCREEN |
| | A | WITH CONTROL CODE |
| 1-BYTE CODE FONT | C | FONT DATA USED IN PROGRAM TEXT |
| 2-BYTE CODE FONT | D | |
| GRAPHIC | E | GRAPHIC DATA USED IN PROGRAM TEXT |

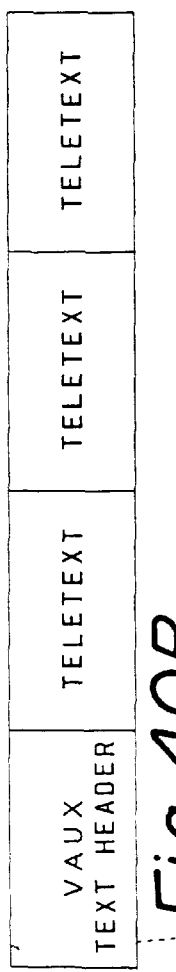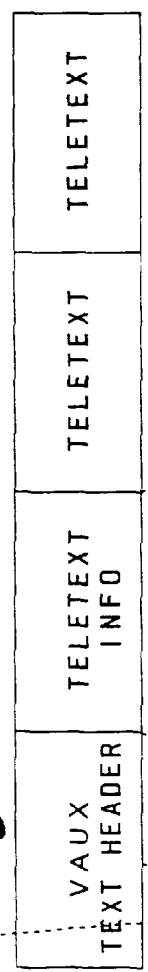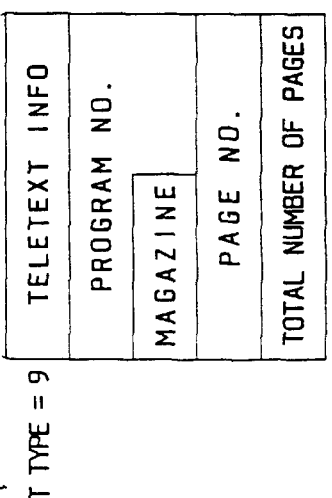
Fig. 40A
Fig. 40B

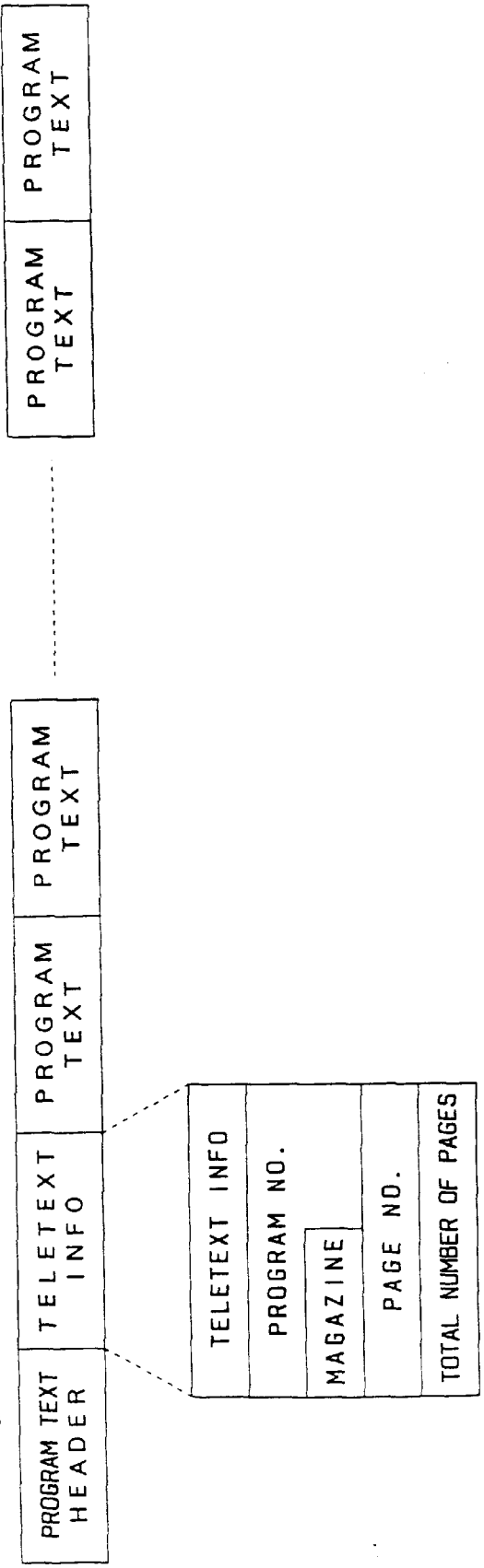
Fig. 41A
Fig. 41B

Fig. 47

| | MSB | | | | | | | LSB |
|---|---|---|---|---|---|---|---|---|
| PC0 | 0 | 1 | 1 | 0 | 0 | 0 | 0 | 1 |
| PC1 | RESERVE ||||||||
| PC2 | REC ST | 1 | REC MODE || 1 | DISPLAY |||
| PC3 | FF | FS | FC | IL | ST | SC | BCSYS ||
| PC4 | 1 | GENRE CATEGORY |||||||

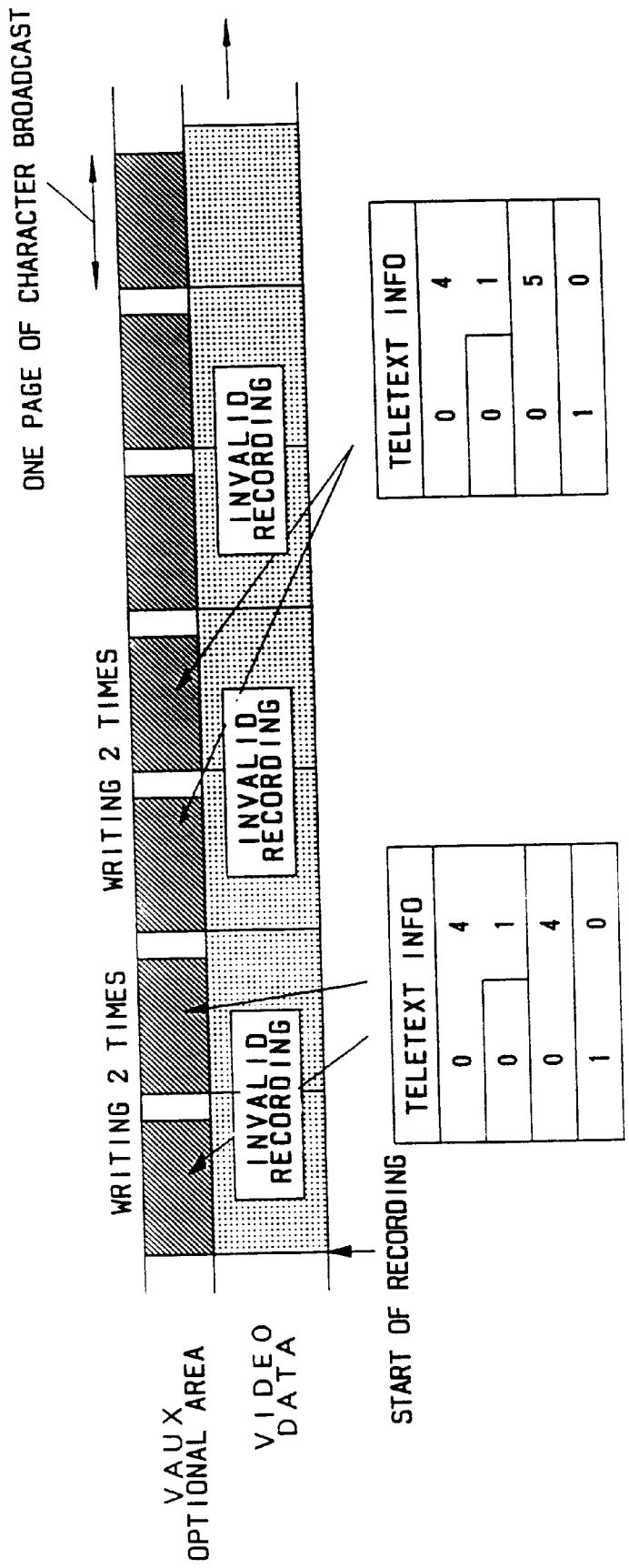

Fig. 52

TIMER RECORDING DATE/HOUR PACK

MSB — LSB

| | | | | | | | | |
|---|---|---|---|---|---|---|---|---|
| P C 0 | 0 | 0 | 0 | 0 | 0 | 0 | 1 | 0 |
| P C 1 | SL | DAY | | | | | | |
| P C 2 | RP | TCF | | MONTH | | | | |
| P C 3 | | YEAR | | | | | | |
| P C 4 | Text | GENRE CATEGORY | | | | | | |

Fig. 53

TIMER RECORDING S/S PACK

MSB — LSB

| | | | | | | | | |
|---|---|---|---|---|---|---|---|---|
| P C 0 | 0 | 0 | 0 | 0 | 0 | 0 | 1 | 1 |
| P C 1 | RECORDING START MINUTES | | | | | | | |
| P C 2 | RECORDING START HOURS | | | | | | | |
| P C 3 | RECORDING END MINUTES | | | | | | | |
| P C 4 | REC METH | | RECORDING END HOURS | | | | | |

Fig. 54

VAUX SOURCE PACK

MSB — LSB

| | | | | | | | | |
|---|---|---|---|---|---|---|---|---|
| P C 0 | 0 | 1 | 1 | 0 | 0 | 0 | 0 | 0 |
| P C 1 | DIGIT OF 10 OF TV CH | | | | DIGIT OF 1 OF TV CH | | | |
| P C 2 | B/W | EN | CLF | | | DIGIT OF 100 OF TV CH | | |
| P C 3 | SOURCECODE | | 50/60 | | S TYPE | | | |
| P C 4 | TUNER CATEGORY | | | | | | | |

Fig.55

| TIMER RECORDING DATE/HOUR PACK | |
|---|---|
| SP/LP | DAY |
| MONTH | |
| YEAR | |
| GENRE | |
| TIMER RECORDING S/S | |
| RECORDING START MINUTES | |
| RECORDING START HOURS | |
| RECORDING END MINUTES | |
| 0 0 | RECORDING END HOURS |
| VAUX SOURCE | |
| TV CHANNEL | |
| SD/HD | |
| 50/60 | |
| TUNER CATEGORY | |

- TIMER RECORDING RESERVATION YEAR/MONTH/DAY (MONTH, YEAR, GENRE)
- TIMER RECORDING RESERVATION START AND END TIMES
- TIMER RECORDING RESERVATION MODE TV CHANNEL

Fig. 56A

| TIMER RECORDING S/S |
|---|
| RECORDING START MINUTES |
| RECORDING START HOURS |
| RECORDING END MINUTES |
| RECORDING END HOURS |

Fig. 56B

| TIMER RECORDING S/S |
|---|
| RECORDING START MINUTES |
| RECORDING START HOURS |
| F F H |
| F F H |

Fig. 56C

| TIMER RECORDING S/S |
|---|
| F F H |
| F F H |
| RECORDING END MINUTES |
| RECORDING END HOURS |

Fig.57A

| TIMER RECORDING DATE/HOUR | |
|---|---|
| SP/LP | DAY |
| MONTH | |
| YEAR | |
| GENRE | |
| TIMER RECORDING S/S | |
| RECORDING START MINUTES | |
| RECORDING START HOURS | |
| RECORDING END MINITES | |
| 01 | RECORDING END HOURS |
| VAUX SOURCE | |
| TV CHANNEL | |
| SD/HD | |
| 50/60 | |
| TUNER CATEGORY | |
| TELETEXT INFO | |
| PROGRAM NO. | |
| MAGAZINE | PAGE NO. |
| FFH | |
| FFH | |

Fig.57B

| TIMER RECORDING DATE/HOUR | |
|---|---|
| SP/LP | DAY |
| MONTH | |
| YEAR | |
| GENRE | |
| TIMER RECORDING S/S | |
| RECORDING START MINUTES | |
| RECORDING START HOURS | |
| RECORDING END MINITES | |
| 01 | RECORDING END HOURS |
| VAUX SOURCE | |
| TV CHANNEL | |
| SD/HD | |
| 50/60 | |
| TUNER CATEGORY | |
| TELETEXT INFO | |
| PROGRAM NO. | |
| MAGAZINE | PAGE NO. |
| FFH | |

Fig.57C

| TIMER RECORDING DATE/HOUR | |
|---|---|
| SP/LP | DAY |
| MONTH | |
| YEAR | |
| GENRE | |
| TIMER RECORDING S/S | |
| RECORDING START MINUTES | |
| RECORDING START HOURS | |
| RECORDING END MINITES | |
| 01 | RECORDING END HOURS |
| VAUX SOURCE | |
| TV CHANNEL | |
| SD/HD | |
| 50/60 | |
| TUNER CATEGORY | |
| TELETEXT INFO | |
| PROGRAM NO. | |
| MAGAZINE | PAGE NO. |
| FFH | |
| TELETEXT INFO | |
| PROGRAM NO. | |
| MAGAZINE | |
| FFH | |

Fig. 60A
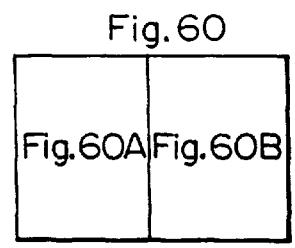
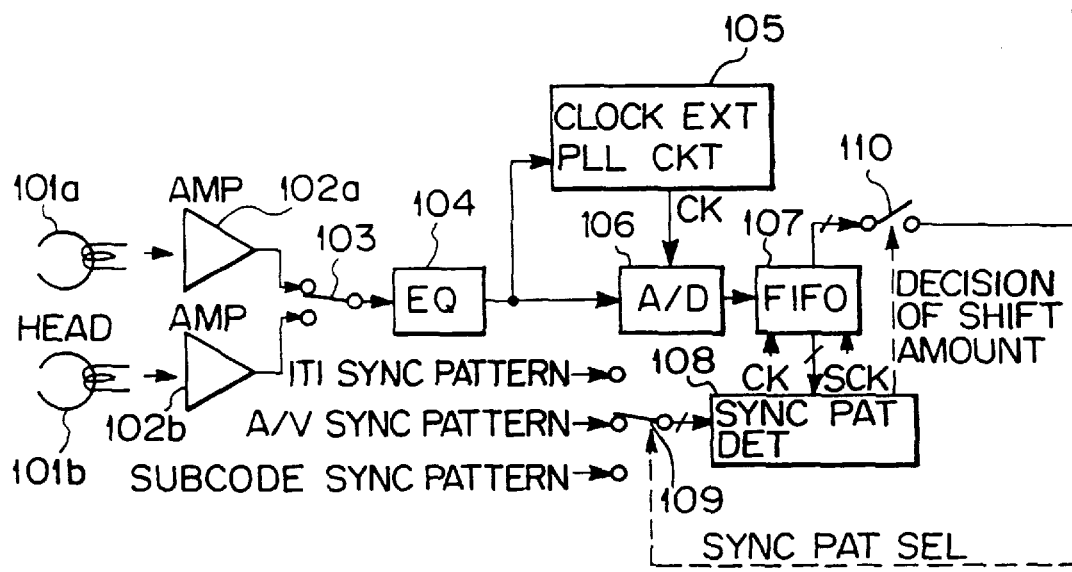
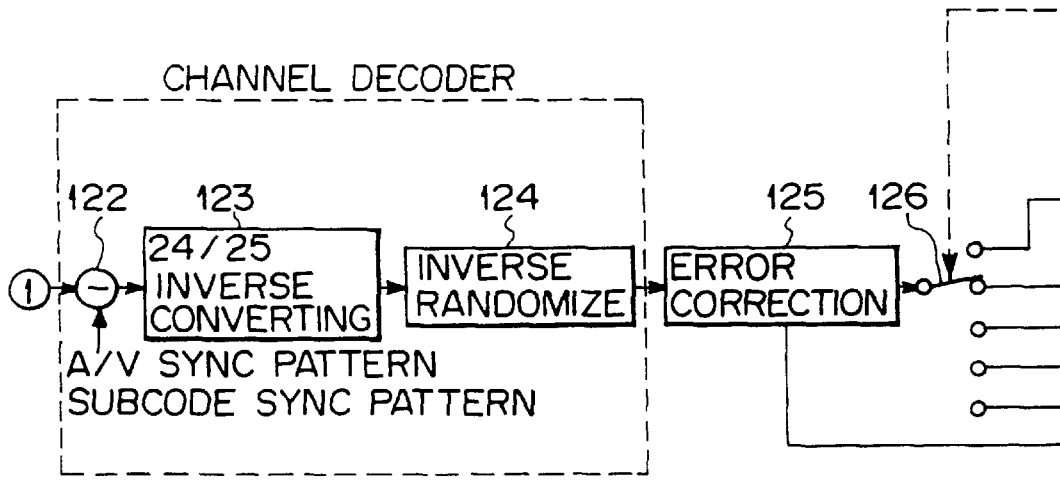

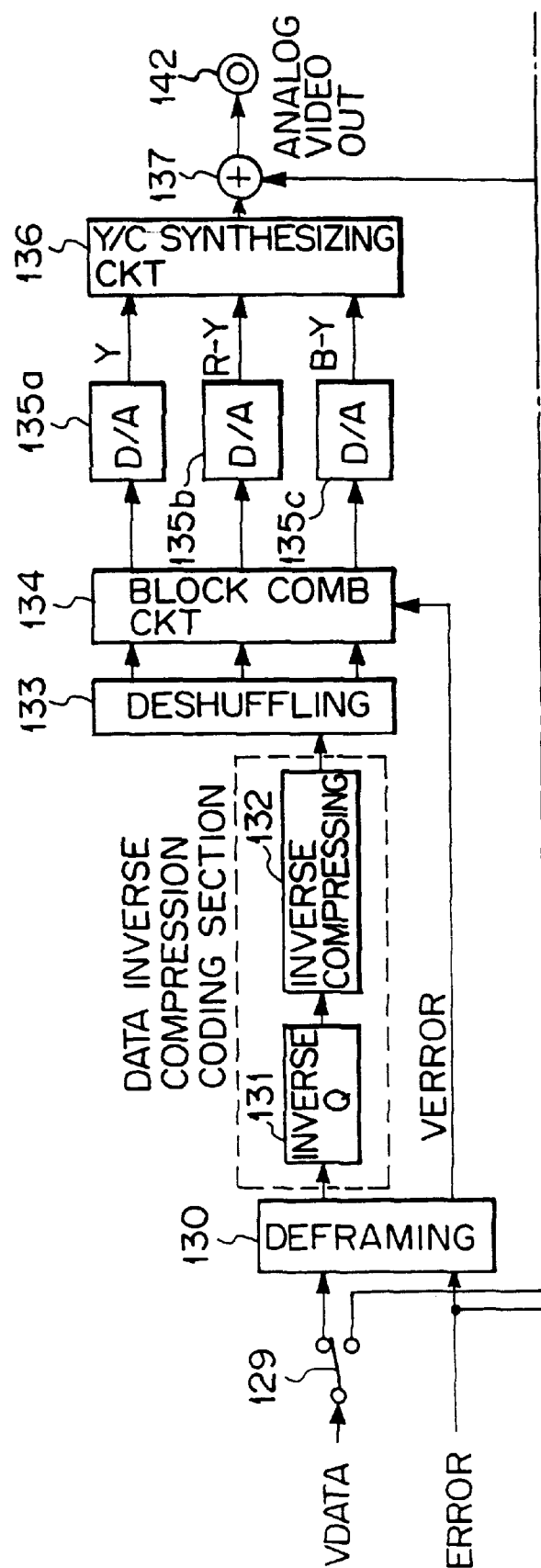

METHOD AND APPARATUS FOR SELECTIVELY RECORDING CHARACTER BROADCASTING PROGRAM DATA

This application is a continuation of application Ser. No. 08/313,270, filed Jan. 17, 1995 now abandoned which, is a 371 of PCT/JP94/00/56 filed Feb. 3, 1994.

TECHNICAL FIELD

The present invention relates to a magnetic recording and reproducing apparatus for recording a video signal and an audio signal and for enabling a character broadcast program to be recorded.

BACKGROUND ART

A character broadcast which can insert a signal for character broadcast for a V blanking period of time of a video signal and can reproduce character data on the reception side has been put into practical use. A character multiplex broadcast will now be described hereinbelow.

At present, a character broadcast signal is, as shown in FIG. 1, multiplexed into total eight lines of 14, 15, 16, 21 H (odd number fields) and 277, 278, 279, 284 H (even number fields) in the vertical blanking period (VBL) of a TV signal and is transmitted.

One line comprises a data line (296 bits), in which data of a clock run-in CR (16 bits) for obtaining bit synchronization and a framing code FC (8 bits) for obtaining byte synchronization and a check code (82 bits) for error correction are included. When eliminating them, a data amount per one H is equal to 190 bits.

In the character multiplex broadcast, tens of different programs are transmitted with respect to one TV broadcasting channel. Generally, one character broadcasting program comprises a plurality of pages. Those programs are sent as by a batch type in which whole data (all pages) of one program is transmitted in a lump or a non-batch type in which the data is sent on a page unit basis.

One character broadcasting program needs data of the unit of kilobyte (1 kilobyte=8192 bits). However, since only 190 bits can be stored per one line as mentioned above, the data is sent by using a number of lines.

In the character multiplex broadcast, data of one character broadcast program is sent by using same H (horizontal period) line.

In case of the batch type, data can be transmitted for, for example, one second or shorter even by using the same line. In case of the non-batch type, however, since the data of the other character broadcasting program is transmitted between pages, the data of each page is sent once in a while.

In this case, when the user designates a program number which doesn't exist by using a remote controller or the like, there is no response for a long time, so that there is a remarkable inconvenience. Therefore, even in the non-batch type, data of one page is certainly transmitted at an interval of 20 or 30 seconds, thereby preventing such an inconvenience. On the other hand, it is recommended that program index data of the line is also transmitted at the same interval.

FIGS. 2A and 2B shows a hierarchy structure of the data until a character broadcast is presented on the screen. At a head position of a data packet of each data line, PFX (prefix) of 14 bits certainly exists and functions as an ID of the packet. In detail, the PFX includes:

| SI (service ID information) | 8 bits |
| CI (packet control code) | 4 bits |
| TF (transmission control flag) | 1 bit |
| IF (error detection coding interval ID flag) | 1 bit |

176 bits subsequent to the PFX are provided as a data block.

A plurality of data blocks are collected, thereby constructing a data group. A plurality of data groups are collected and construct a program. Each program starts by program management data and comprises several page data.

FIG. 3 shows a data block of one arbitrary program. At first, there is a program management data block. The block is $$CI=0, TF=1, IF=1$$

In this block, there is a program data header called a PRCI (refer to FIG. 4). A magazine number is used for expansion in the future and is set to only 0 at present. When receiving the character multiplex broadcast, it is unnecessary to especially designate the magazine number. As program numbers, decimal numbers of three digits are prepared. The total page number shows the number of all pages of the program. A function level is set to 0 when it is used as a level specified as a fundamental function and is set to 1 when it is used as a level including an additional function.

As for program forms,

0: independent type program
1: complementary program
2: subtitle program are shown. A program contents updating flag changes from 1 to 0 or 0 to 1 when the contents are changed.

Subsequently, there is a page data header block. The block is, $$CI=1, TF=0, IF=1$$

in the non-batch type;

$$CI=n, TF=0, IF=1 (n=0 \text{ to } F)$$

in the batch type.

In the block, there is a page data header called a PACI (refer to FIG. 5). The belonging program No. of the page and the page No. (decimal notation and two digits) are recorded in the PACI.

Actual character data comprises a header sentence shown in the upper portion of the screen and a text. Both of the header sentence and the text are constructed by character codes determined by JIS. Since a data packet of one H line is set as a reference, NUL data is recorded in the remaining areas and a CRC code (error detection code) is recorded so as to certainly exist at the end of the data block. In FIG. 3, "ETX" means "end of text" and "ETB" means "end of transmission block". ETB is recorded at the end of the header sentence data because the block is finished there. ETX is recorded at the end of the text. The appearance of ETX means that there are further other pages and the text still continues. An end of transmission code EOT is recorded at the end position of the actual text of the final page.

Program index data is distinguished by DGI (data group ID code) in the data group header in FIG. 3.

DGI=0 indicates program management data, page data
DCI=F indicates program index data Since the program index data is not a program, it is handled as a mere page. At that time, a format as shown in FIG. 6 is prepared as PACI. The program Nos. of the H line are arranged as text data after PACI. It is not obviously intended to display.

Subsequently, an European character multiplex broadcasting signal (alias, TELETEXT) will now be described. It is also called as UK system or WST (World System TELETEXT). As shown in FIG. 7, the WST is a system in which the signal is multiplexed to total 25 lines of 6 H to 22 H (odd number fields) and 318 H to 335 H (even number fields) in the vertical blanking period (VBL) of a TV signal and is transmitted. In the present situation, the broadcast is performed by using at least four lines or at most 15 lines among them. However, the number of H lines which are used are also different depending on a country or a broadcasting station. One line comprises a data line (360 bits), in which data of the clock run-in CR (16 bits) for obtaining a bit synchronization and the framing code FC (8 bits) for obtaining a byte synchronization is included. A data amount per one H is equal to 336 bits. The check code for error correction for every H line existing in the Japanese character multiplex broadcast doesn't exist.

In the WST, in a manner similar to the character multiplex broadcast, tens of different programs are transmitted with respect to one TV broadcasting channel. However, there is no concept of the program number. Although one program is constructed by almost one page, there is a case where one program is constructed by a plurality of pages. On the other hand, there is also a case where one page has a plurality of subpages.

In case of the WST, a program is also sent by using a number of lines. However, it is not always limited that one page data is sent by using only the same H (horizontal period) lines as in the Japanese character multiplex broadcast but all of H lines to be used are used. This is because data is transmitted by using at most 7-bit ASCII code (1-byte code) by only the alphabets without needing Chinese characters as in Japan (a Chinese character needs a two-byte code). As mentioned above, it is based on that the total amount of data is small. That is, this is because even if the number of apparent transmitting channels is not increased by fixing the H lines, other pages can be soon successively transmitted.

FIG. 8 shows data blocks of one arbitrary page. PFX (prefix) of 16 bits exists at the head of a data packet of each data line. In FIG. 8, two bytes in which a magazine and a packet address are written correspond to the PFX. The magazine, packet address, and page will now be explained. In the diagram, "P" means a parity and "D" means data.

For instance, a 150 page in the WST means the magazine No. 1 and the page No. 50. By combining both of them, they are handled as a page. One magazine comprises packets of 0 to 29. Exceptionally, only magazine No. 8 has a packet 30. Such a state is expressed as a packet 8/30. The packet 8/30 is used as a service data packet of the broadcasting station, for example, it is used for a PCD control of timer reservation or the like. Due to this, the packet 8/30 is transmitted at an interval of about one second.

A packet X/0 is a page header packet. As contents, as shown in FIG. 8, the page number, page subcodes, control bits, and 32 characters as a header sentence are inserted. Each character is set to an ASCII code of seven bits in which an odd number parity is added to the MSB.

Packets of X/1 to X/25 are text data packets. Data itself of forty characters per one line is stored to the packets. That is, in the WST, a picture plane itself of one page is transmitted. As for a protection of each character, only the parity of at most one bit is protected, so that a change in character often occurs due to a bad state of a TV signal. Even in such a case, however, since the characters are constructed by only the alphabets, such a character change can be judged from the relation between the front and back characters. B y waiting for a little while, the same page will be transmitted, so that the character change can be corrected there.

Packets X/26 to X/29 are text auxiliary data packets. Control information indicating whether the character code sent once by the text packet is displayed by, for example, flashing or inverting black and white is stored into those packets. In the Japanese character multiplex broadcast, those control information is included in the text and is expressed by a form such that the character as a control target is sandwiched.

In the WST, as mentioned above, alphabets are fundamentally used as data and a repeating period of each page is fast, so that a waiting time for the user is not so longer than that in the Japanese character multiplex broadcast. At the lowest stage shown in FIG. 8, a case where the page subcode is equal to 3F7Eh and the page No. is equal to FEh is set to page index data. Data such as the number of subpages of each page or the like is transmitted as such page index data. On the other hand, in order to improve the use efficiency for the user, a man-machine interface called an FASTEXT (or FLOF) in England and called a TOP in Germany has already been executed, so that there is hardly a possibility such that the user erroneously operates.

In case of receiving the foregoing character broadcast program, a time which is necessary to receive the whole data of one program is at most tens of minutes, although it is different in dependence on individual program contents. Such a time also includes a transmitting time of program data except the programs which the user wants to watch. So long as such a time can be eliminated by some device, a time that is required to watch the actual character broadcasting program can be reduced.

When considering that such an improvement is performed on only the reception side, for example, a viewer previously designates a desired character broadcasting program and after all of the program data was received, the viewer watches the program, so that the waiting time for the data reception can be eliminated. Among the character broadcasting tuners which are commercially available at present, there is a tuner using a semiconductor memory which can correspond to such a problem. However, an amount of program data that can be stored is limited according to such a tuner.

On the other hand, a construction such that a conventional VCR and a character broadcasting tuner are combined and the character broadcasting picture plane itself decoded by the character broadcasting tuner recorded and reproduced is also considered. In this case, however, a consumption amount of tape is remarkably larger than the information to be recorded. This is because substantially the same picture plane is continuously recorded for about twenty to thirty seconds from a time point after one page data was transmitted until a time point when the next page data is transmitted. According to such a method, not only the consumption amount of the tape increases but also it takes a time to retrieve the page upon reproduction.

When the recording is performed by the timer reservation, there is a fear such that the whole target program cannot be recorded by only the designation of the recording start and end times of one character broadcasting program.

Further, information regarding the actual TV broadcast, for example, a subtitle broadcast or a complementary program which transmits an outline or the like cannot be simultaneously recorded.

Therefore, an object of the invention is to provide a magnetic recording and reproducing apparatus made in consideration of the above mentioned problems.

DISCLOSURE OF INVENTION

According to the present invention, there is provided a magnetic recording and reproducing apparatus characterized by comprising: recognizing means for detecting at least a prefix portion in character broadcasting information that is transmitted by using a vertical blanking period of a television signal and for recognizing the contents; means for designating desired character information in character information that is transmitted by a character broadcast; separating means for separating only the desired character information in accordance with the information recognized by the recognizing means; recording means for recording the separated desired character information; reproducing means for reproducing the recorded character information; and means for inserting the reproduced character information into a predetermined line in a vertical blanking period and for generating.

According to the invention, in the case where the designated desired character information comprises a plurality of pages, the recording means performs recording at a time point when all of the character information is received.

According to the invention, the recording means sequentially records in accordance with the order of the page numbers.

According to the invention, there is provided means for designating the recording order of the pages in case of recording character information of a plurality of pages and the recording means sequentially records in accordance with the designated page order.

According to the invention, the recording means records the portions in which a clock run-in portion and a framing code portion in the character broadcasting signal are eliminated without decoding.

According to the invention, the recording means decodes and records the character broadcasting signal.

According to the invention, means for detecting that the contents of the character broadcasting program has been updated is further provided, the designated character broadcasting program is repetitively received, and when it is judged that the program contents were updated, the updated character broadcasting program is recorded.

According to the invention, when it is judged that the program contents were updated, the above updated character broadcasting program is recorded together with the time of the updating.

In the invention, there are provided a first area for encoding an analog signal or a digital signal and recording and reproducing, thereby recording a video signal, a second area for recording an audio signal, and a third area for recording information annexed to the video signal, and a character information signal is recorded in the third area.

According to the invention, the character information signal is record ed by using a pack structure.

According to the present invention, there is also provided a magnetic recording and reproducing apparatus characterized by comprising: detecting means for detecting the presence or absence of a character broadcasting signal that is transmitted by using a vertical blanking period of a television signal; separating means for separating the character broadcasting signal when the character broadcasting signal is transmitted; recording means for recording a TV broadcasting signal and the character broadcasting signal in the case where the detecting means detects that the character broadcasting signal has been transmitted by using the same channel as that of a TV broadcast; means for reproducing the recorded TV broadcasting signal and character broadcasting signal; and means for inserting the reproduced character broadcasting signal into a predetermined line in the vertical blanking period and for generating.

According to the invention, means for designating at least a broadcasting channel and the broadcasting start time is further provided and, when the broadcasting start time comes, the recording means starts the recording.

The invention further has: means for detecting at least a prefix portion in the character broadcasting information that is transmitted by using the vertical blanking period of the TV signal and for recognizing the contents; means for designating desired character information in the character information that is transmitted by the character broadcast; and separating means for separating only the desired character information in accordance with the information recognized by the recognizing means, wherein the recording means records the foregoing desired character information and TV broadcasting signal.

The invention further has: means for detecting at least a prefix portion in the character broadcasting information that is transmitted by using the vertical blanking period of the TV signal and for recognizing the contents; means for designating desired character information in the character information that is transmitted by the character broadcast; and separating means for separating only the desired character information in accordance with the contents of the prefix portion, wherein the recording means records the desired character information and TV broadcasting signal.

In the invention, there is further provided switching means for switching a mode for simultaneously recording the TV broadcasting signal and character broadcasting signal and a mode for recording only the character broadcasting signal.

In the invention, there is further provided means for detecting program format information of the character broadcasting signal and, when the detecting means detects that information regarding the TV broadcasting program recorded in the character broadcast is broadcasted at the time of recording of the TV broadcasting program, the character broadcasting information is automatically recorded.

BRIEF DESCRIPTION OF DRAWINGS

FIGS. 2A and 2B are schematic diagrams showing a hierarchy structure of data until a character broadcast is displayed on a screen; FIG. 3 is a schematic diagram of a data block of one program; FIG. 8 is a schematic diagram showing data blocks of one page; FIGS. 13A and 13B are schematic diagrams showing situations when ATP=000; FIG. 28 is a schematic diagram showing subcode sync blocks; FIGS. 29A and 29B are schematic diagrams showing the ID sections of the subcodes; FIG. 33 is a schematic diagram showing a situation in which packs when recording a character broadcasting signal are recorded in VAUX optional areas; FIGS. 34 and 35 are schematic diagrams each showing a practical pack construction when recording a character broadcasting signal; FIG. 36 is a schematic diagram showing a program text header pack; FIG. 37 is a schematic diagram showing a program text pack; FIG. 38 is a schematic line diagram showing a text type of a program text header pack; FIGS. 39A and 39B are schematic diagrams showing a teletext information pack; FIGS. 40A and 40B are schematic diagrams of packs for explaining a use example of the teletext information pack; FIGS. 41A and 41B are schematic diagrams showing a constructional example of packs in case of decoding a character broadcast and recording into optional areas in the VAUX area; FIG. 47 is a schematic diagram showing a VAUX source control pack; FIGS. 48 to 51 are schematic diagrams each showing a recording area of a tape in the case where data of the character broadcast is decoded and recorded; FIG. 52 is a schematic diagram showing a timer recording data/hour pack of an MIC; FIG. 53 is a schematic diagram showing a timer recording S/S pack; FIG. 54 is a schematic diagram showing a VAUX source pack; FIG. 55 is a schematic diagram showing a timer reservation recording event; FIGS. 56A to 56C are schematic diagrams showing a timer recording S/S pack; FIGS. 57A to 57C are schematic diagrams which is used for explanation of a recording method flag of the timer recording S/S pack; FIGS. 58, 58A and 58B are circuit diagrams showing a construction of a recording system of a digital VCR; FIGS. 59, 59A and 59B are circuit diagrams of a simple type decoder; and FIGS. 60, 60A, 60B, 61, 61A, 61B, 62, 62A and 62B are circuit diagrams each showing a construction on the reproduction side of the digital VCR.

BEST MODE FOR CARRYING OUT THE INVENTION

A preferred embodiment of the present invention will now be described hereinbelow with reference to the drawings. In the following embodiment, the invention is applied to a digital VCR for compressing a digital video signal and recording/reproducing it. In such a digital VCR, a composite digital color video signal is separated into a luminance signal (Y) and color difference signals (R-Y, B-Y). Those signals are compressed by a high efficient compressing system using a DCT transformation and a variable length code and are recorded onto a magnetic tape by a rotary head. As a recording system, an SD system (525 lines/60 Hz, 625 lines/50 Hz) and an HD system (1125 lines/60 Hz, 1250 lines/50 Hz) can be set. In case of the SD system, 10 tracks (in case of 525 lines/60 Hz) or 12 tracks (in case of 625 lines/50 Hz) per one frame are recorded. In case of the HD system, the number of tracks per one frame is twice as large as that in case of the SD system. That is, 20 tracks (in case of 1125 lines/60 Hz) or 24 tracks (in case of 1250 lines/50 Hz) are recorded.

In such a digital VCR, as a system which can easily manage data and is used for enabling the digital VCR to be used as a general recording and reproducing apparatus, the applicant of the present invention has already proposed a system called an Application ID. According to an embodiment, the system called an Application ID is used. By using such a system, it is possible to easily manage spare data VAUX or AAUX and subcodes of video and audio signals and a cassette with a memory called an MIC.

According to the invention, a character broadcasting signal of a character multiplex broadcast, a teletext, or the like is recorded into, for example, a VAUX optional area or a video area. There are a case where the character broadcasting signal is decoded and recorded and a case where it is recorded without decoding. Recording systems of those character broadcasts will be described in detail hereinlater.

Figures 9A, 9B:
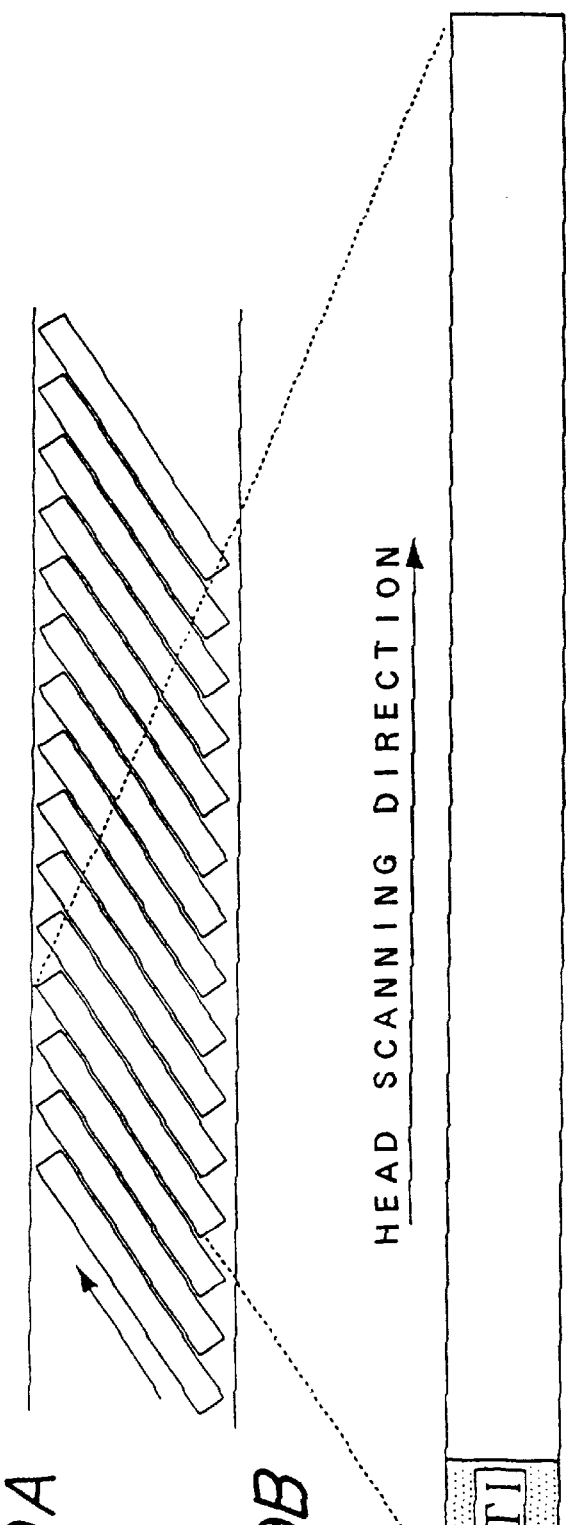
FIGS. 9A and 9B are schematic diagrams regarding a tape format which is used in a digital VCR.

First, the Application ID system will be described. In the digital VCR to which the invention is applied, tracks are obliquely formed on a tape as shown in FIG. 9A. As a number of tracks per one frame, there are 10 tracks or 12 tracks in the SD system, while there are 20 tracks or 24 tracks in the HD system.

FIG. 9B shows one track of a digital signal recording and reproducing apparatus. A timing block to certainly perform the after recording such as ITI (Insert and Track Information) exists on the track entrance side. In the case where the data written in an area subsequent to the timing block is rewritten by after recording, the timing block is provided to accurately position such an area.

Even in any digital signal recording and reproducing application apparatus, since it is inevitable to rewrite the data in a specific area, the ITI area certainly exists on the track entrance side.

That is, a number of sync blocks of a short sync length are written in the ITI area and the sync numbers are allocated to the sync blocks in accordance with the order from the track entrance side when the user intends to perform the after recording, so long as any one of the sync blocks in the ITI area can be detected, the present position on the track can be accurately judged from the number written there. On the basis of such an accurate position, the area for the after recording can be identified.

Generally, it is hard to obtain a good head contacting state and the head contacting state is unstable on the track entrance side from a viewpoint of a mechanical precision or the like. Therefore, by reducing the sync length and writing a number of sync blocks, a detecting probability is raised.

Figure 10:
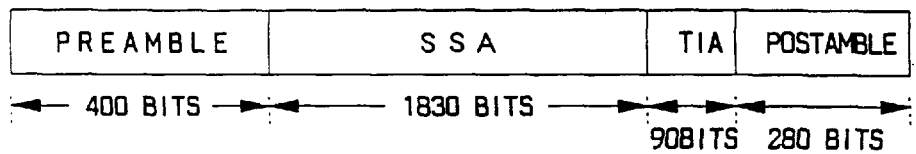
FIG. 10 is a schematic diagram which is used for explanation of an ITI area.

As shown in FIG. 10, the ITI area comprises four portions of a preamble, an SSA, a TIA, and a postamble. The preamble of 400 bits performs a function of the run-in of PLL of the digital signal reproduction or the like. The SSA (Start SYNC Block Area) is used for such a function and is constructed by 30 bits per one block and includes 61 blocks. There is the TIA (Track Information Area) after the SSA. The TIA is constructed by total 90 bits of three blocks. The TIA denotes an area to store information regarding the whole track. Total six bits of three bits of APT (Application ID of a Track) as an original Application ID, one bit SP/LP indicative of a track pitch, one bit of reserve, and one bit of PF (Pilot Frame) indicative of a reference frame of a servo system are stored in the TIA area. Finally, there is a postamble of 280 bits to provide a margin.

In the above apparatus, the applicant of the present invention has already proposed apparatuses in which a circuit board having a memory IC is installed into a cassette in which a recording medium is enclosed and, when the cassette is loaded into the apparatus, data written in the memory IC is read out, thereby assisting the recording and reproduction (Japanese Patent Application Nos. 4-165444 and 4-287875). In the present invention, it is now assumed that such a cassette is called an MIC (Memory In Cassette).

In addition to the APT of the above TIA area, the Application ID is also stored in upper three bits of address 0 in the MIC as an APM (Application ID of MIC). The Application ID is defined as follows.

[The Application ID specifies a data structure.]

In brief, the Application ID is not an ID to decide its application example but merely determines a data structure of the area. Therefore, there are the following meanings.

Figure 11:
FIG. 11 is a schematic diagram which is used for explanation of the ITI area.

APT . . . Decide a data structure on the track
APM . . . Decide a data structure of the MIC The data structure on the track is specified by the value of APT. Namely, as shown in FIG. 11, the tracks after the ITI area are divided into several areas and the data structure such as positions on those tracks, sync block construction, ECC construction to protect the data from errors, and the like is unconditionally determined. Further, the Application ID to decide the data structure of each area exists. Such an Application ID simply has the following meaning.

[Application ID of the area n . . . decide a data structure of the area n.]

Figure 12:
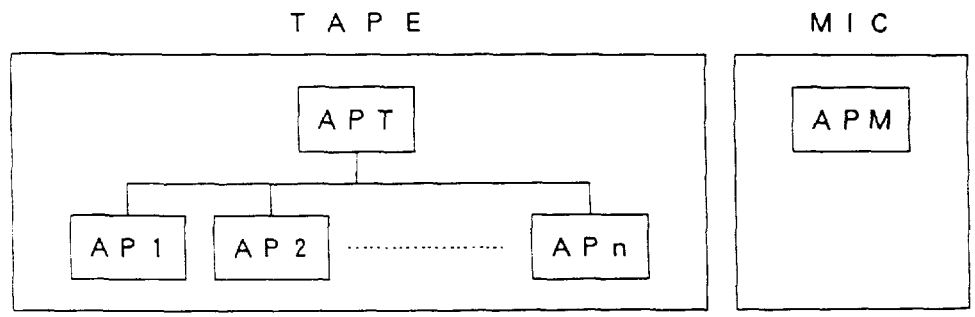
FIG. 12 is a schematic diagram showing a hierarchy structure.

The Application ID has a hierarchy structure as shown in FIG. 12. The areas on the tracks are specified by the APT as an original Application ID and AP1 to APn are further specified in the respective areas. The number of areas is defined by the APT. In FIG. 12, the areas are shown as a double hierarchy. However, another hierarchy can be also further formed under the double hierarchy as necessary. The APM as an Application ID in the MIC is constructed by only one hierarchy. As a value of the hierarchy, the same value as that of APT of the apparatus is written by the digital VCR.

From the home-use digital VCR, by commonly using the cassette, mechanism, servo system, ITI area producing and detecting circuit, and the like of such a VCR, other different articles such as data streamer and multitrack digital audio tape recorder can be also produced. Even when one area is determined, its contents can be further defined by the Application ID of the area. Therefore, a very wide-range data setting can be performed in a manner such that, in case of a certain value of the Application ID, the video data is recorded there and, in case of another value, the video/audio data or computer data is recorded there.

FIGS. 13A and 13B show situations when APT=000. As shown in the diagram, an area 1, an area 2, and an area 3 are specified on the track. The positions on the track, a sync block construction, an ECC construction to protect data from errors, a gap to assure each area, and an overwrite margin to assure the overwriting are determined.

The Application ID to decide a data structure of each area exists in each area. Such Application IDs simply have the following meanings.

AP1 . . . Decide a data structure of the area 1
AP2 . . . Decide a data structure of the area 2
AP3 . . . Decide a data structure of the area 3

When the Application ID of each area is equal to 000, such a state is defined as follows.

AP1=000 . . . Use an audio of CVCR and a data structure of AAUX
AP2=000 . . . Use a video of CVCR and a data structure of VAUX
AP3=000 . . . Use a subcode of CVCR and a data structure of ID Where, CVCR: Home-use digital video/audio signal recording and reproducing apparatus
AAUX: Audio auxiliary data
VAUX: Video auxiliary data That is, when realizing the home-use digital VCR, APT, AP1, AP2, AP3=000

The APM also obviously uses the value of 000.

Figures 14, 15:
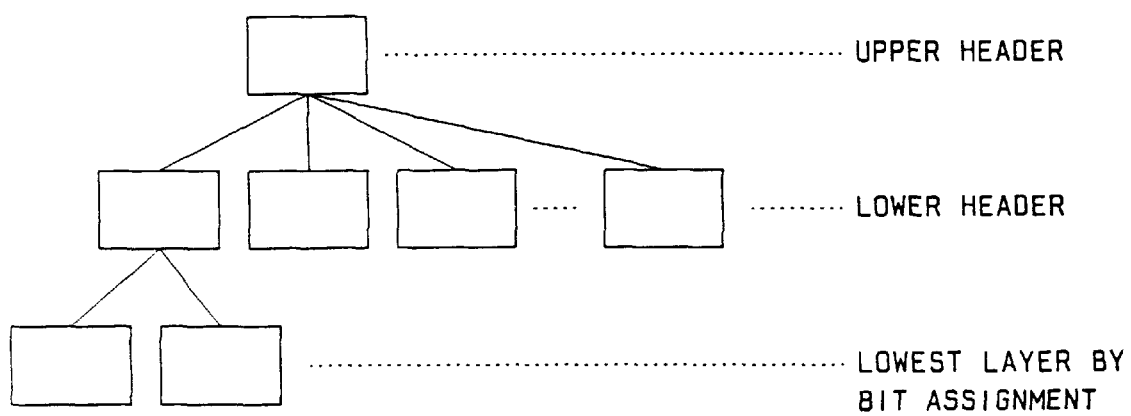
FIG. 14 is a schematic diagram showing a pack structure.
FIG. 15 is a schematic diagram showing a hierarchy structure.

When APT=000, all of the areas of AAUX, VAUX, subcode, and MIC are described by a common pack structure. As shown in FIG. 14, one pack is constructed by five bytes. One head byte denotes a header and remaining four bytes denote data. "pack" denotes the minimum unit of a data group and one pack is constructed by collecting the data concerned.

Figure 16:
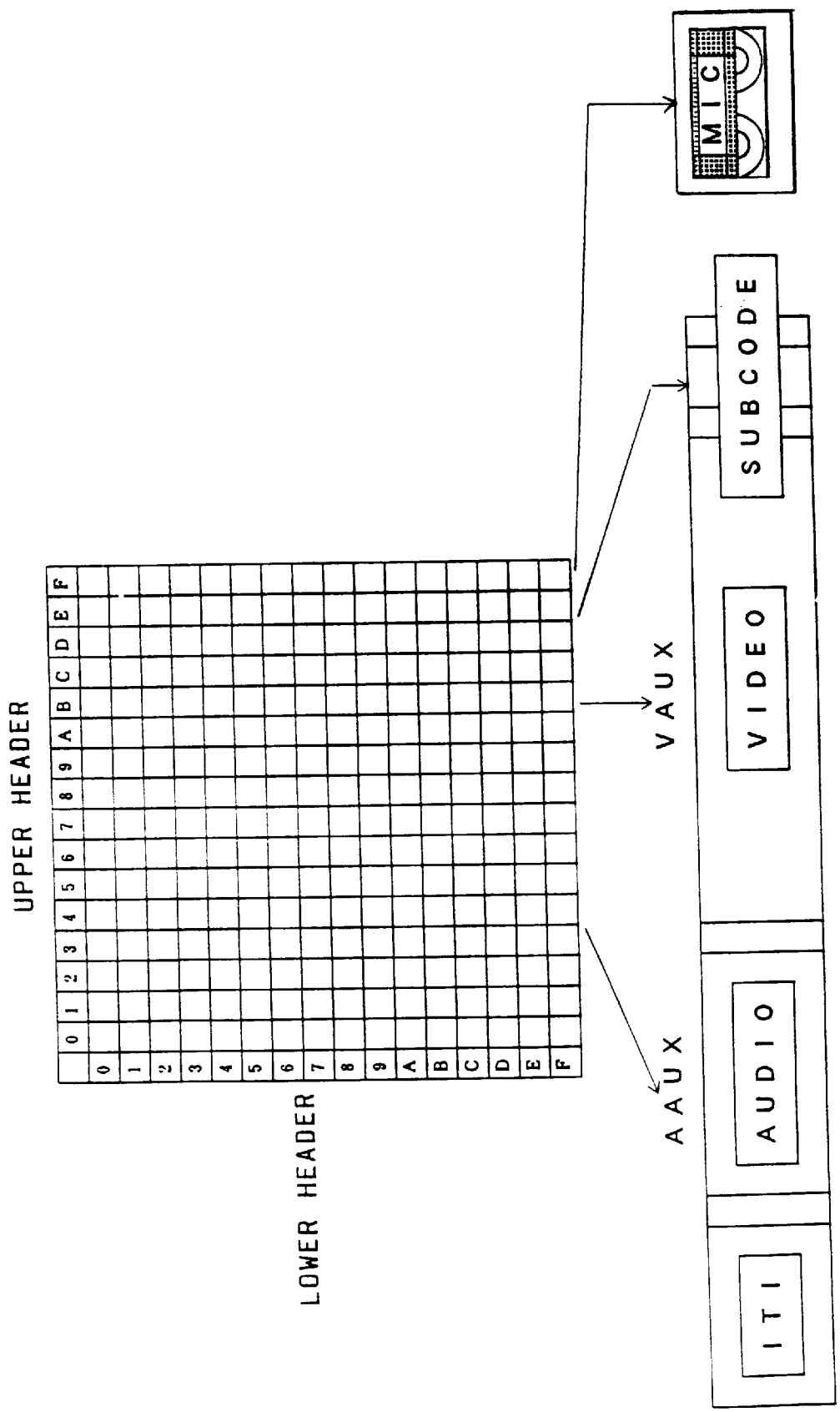
FIG. 16 is a schematic diagram showing a pack header table.

Eight bits of the header are divided into upper four bits and lower four bits and form a hierarchy structure. As shown in FIG. 15, the upper four bits are set to an upper header and the lower four bits are set to a lower header, thereby forming a double hierarchy. The hierarchy structure can be further expanded to a hierarchy under the double hierarchy by a bit assignment of the data. The contents of the pack are clearly systematized by such a hierarchy forming process and can be also easily expanded. The 256 spaces by the upper and lower headers are prepared as a pack header table together with the contents of each pack (refer to FIG. 16). Each of the above areas is described by using them. The pack structure fundamentally uses a fixed length of five bytes. However, only when character data is described in the MIC as an exception, a pack structure of a variable length is used. This is because a limited buffer memory is effectively used.

Figure 17:
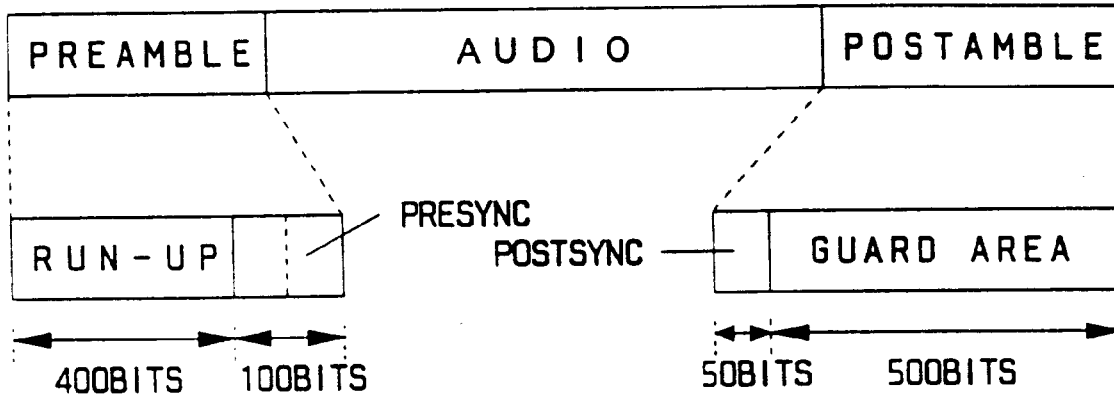
FIG. 17 is a schematic diagram showing a construction of an audio sector.

The audio area and the video area are called an audio sector and a video sector, respectively. FIG. 17 shows a construction of the audio sector. The audio sector comprises a preamble, a data section, and a postamble. The preamble is constructed by 500 bits and comprises a run-up of 400 bits and two presync blocks. The run-up is used as a run-up pattern for a pull-in of a PLL. The presyncs are used as a predetection of the audio sync block. The data section is constructed by 10500 bits. The last postamble is constructed by 550 bits and comprises one postsync block and a guard area of 500 bits. The postsync is used for allowing the end of audio sector to be confirmed by the sync number of the ID. The guard area is used to guard in a manner such that even when the video sector after the guard area is subjected to the after recording, the video sector doesn't enter the audio sector.

Figure 18A:
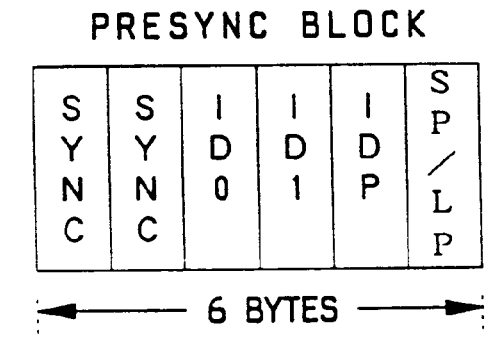
FIGS. 18A and 18B are schematic diagrams showing sync blocks.
Figure 18B:
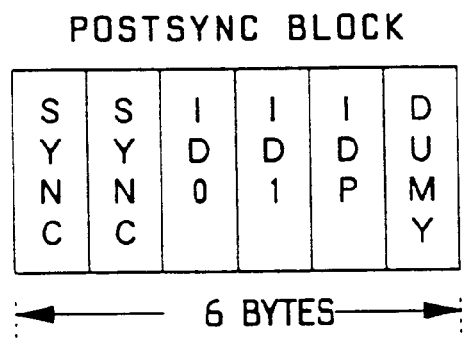

As shown in FIGS. 18A and 18B, each block of the presync and postsync is constructed by six bytes. A discrimination byte of SP/LP exists at the sixth byte of the presync. FFh indicates SP and 00 h indicates LP. FFh is stored as dummy data at the sixth byte of the postsync.

The discrimination byte of SP/LP also exists as an SP/LP flag in the foregoing TIA area and is used for protection thereof. When the value of the TIA area can be read, it is used. When it cannot be read, the value of the area is used.

The six bytes of each of the presync and the postsync are subjected to a 24–25 conversion (modulating system for converting data of 24 bits into 25 bits and recording) and are recorded after that. Therefore, the total bit lengths are as follows.

Presync: 6×2×8×25÷24=100 bits
Postsync: 6×1×8×25÷24=50 bits.

Figure 19:
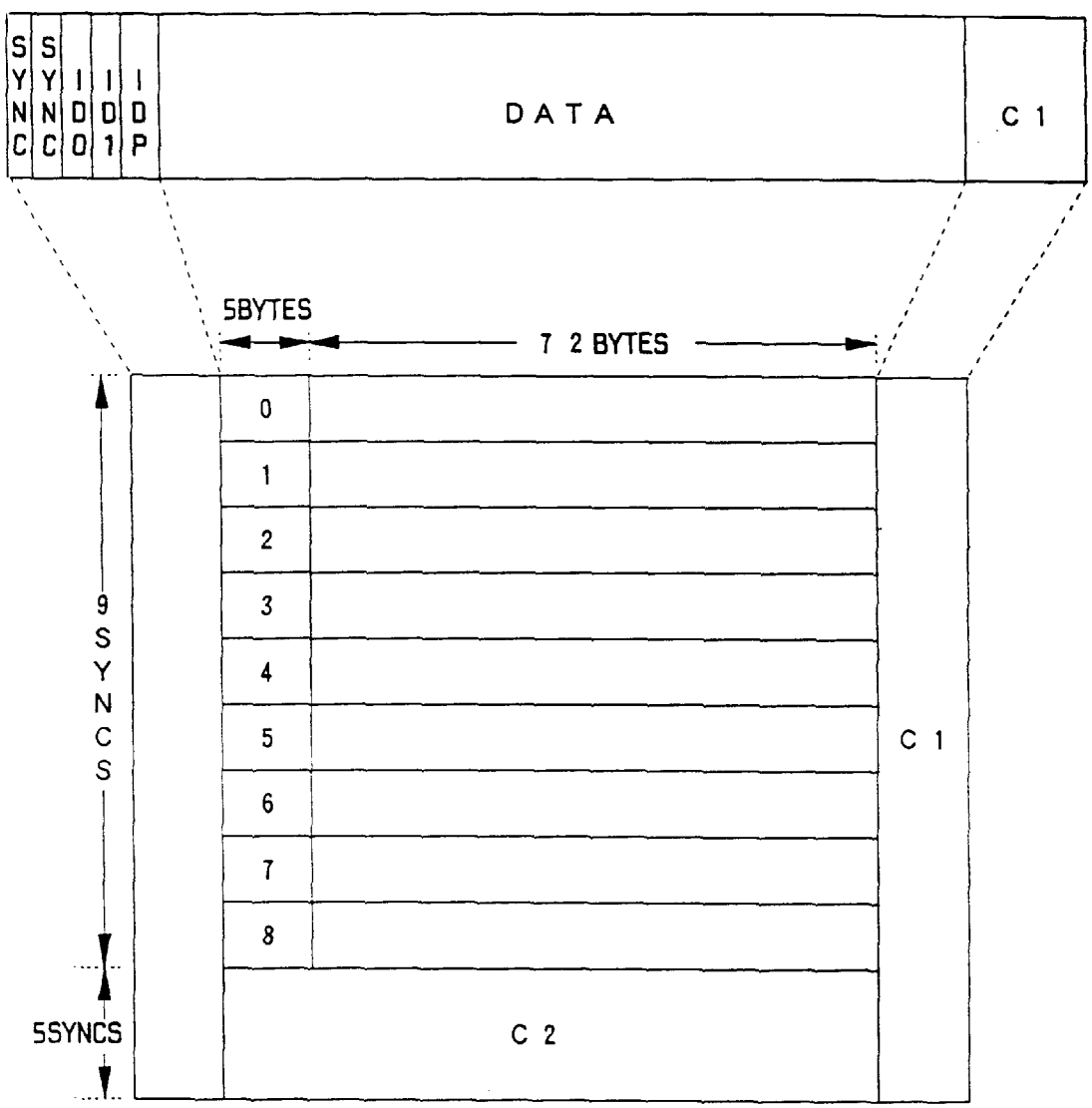
FIG. 19 is a schematic diagram showing audio sync blocks.

As shown in FIG. 19, one sync block of the audio sync block is constructed by 90 bytes. The former half five bytes have a construction similar to that of each of the presync and the postsync. The data section is constructed by 77 bytes and is protected by a horizontal parity C1 (8 bytes) and a vertical parity C2 (5 sync blocks). The audio sync block is constructed by 14 sync blocks per one track. After the 24–25 conversion was performed to the audio sync block, it is recorded. Therefore, the total bit length is equal to 90×14×8×25÷24=10500 bits The former half five bytes of the data section are used for AAUX (Audio Auxiliary data), one pack is constructed by them, and nine packs are prepared per one track. The numbers 0 to 8 in FIG. 19 indicate the pack numbers in the track.

Figures 20, 21:
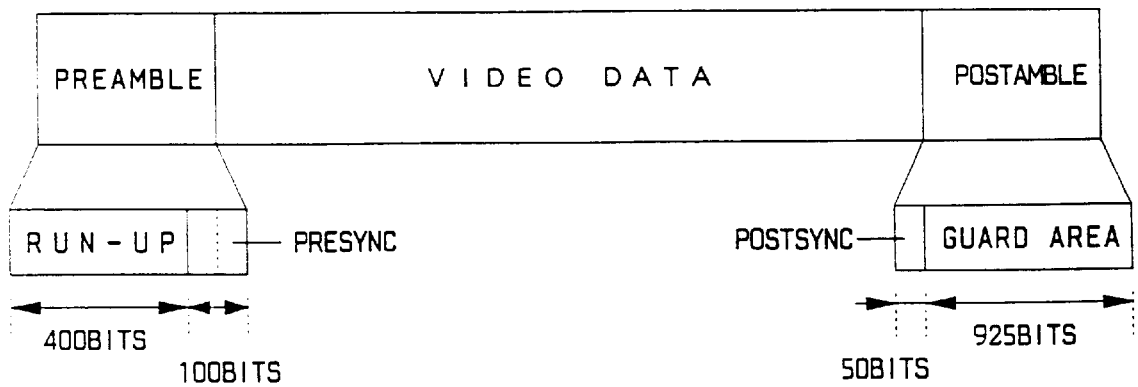
FIG. 20 is a schematic diagram describing nine packs of the audio sync block in the track direction.
FIG. 21 is a schematic diagram showing a construction of video sectors.

FIG. 20 is a diagram of nine packs shown in the track direction. One video frame is constructed by 10 tracks in case of the system of 525 lines/60 Hz and 12 tracks in case of the system of 625 lines/50 Hz. The audio signal and the subcode are also recorded and reproduced in accordance with such a one video frame.

In FIG. 20, numerals 50 to 55 show the values (hexadecimal notation) of the pack headers. As will be also understood from FIG. 20, the same pack is written in ten tracks ten times. Such a portion is called a main area. Since essential items such as sampling frequency, number of quantization bits, and the like which are necessary to reproduce the audio signal are mainly stored in the main area, the same pack is written a number of times for protection of the data. Due to this, even in the case where a scratch in the lateral direction, a one channel clog, or the like which is likely caused in a tape transport occurs, the data in the main area can be reconstructed.

The other remaining packs are sequentially combined and used as an optional area. As shown in a, b, c, d, e, f, g, h, . . . in FIG. 20, the packs other than the packs in the main area are coupled in the directions shown by arrows. In one video frame, the optional areas of 30 packs (525 lines/60 Hz) and 36 packs (625 lines/50 Hz) are prepared. Since those portions are obviously options, a desired pack can be freely selected from the pack header table in FIG. 16 and described every digital VCR.

The optional area comprises: a common option (for example, character data) which is common; and a maker's option having no commonness whose contents can be uniquely determined by each maker. Since they are optional, it is also possible to use any one of the state in which only one of them exists, the state in which both of them exist, and the state in which none of them exists. In case of no information, the optional area is described by using a pack of no information (NO INFO pack). The Application ID and the area of both of them are partitioned by the appearance of a maker code pack. The areas after them are set to a maker's optional area.

A construction of such main area, optional area, common option, and maker's option is common to all of the AAUX, VAUX, subcode, and MIC.

FIG. 21 shows a construction of a video sector. A construction of each of the preamble and the postamble is similar to that of the audio sector shown in FIG. 17. An amount of guard area of the postamble is larger than that of the audio sector.

Figure 22:
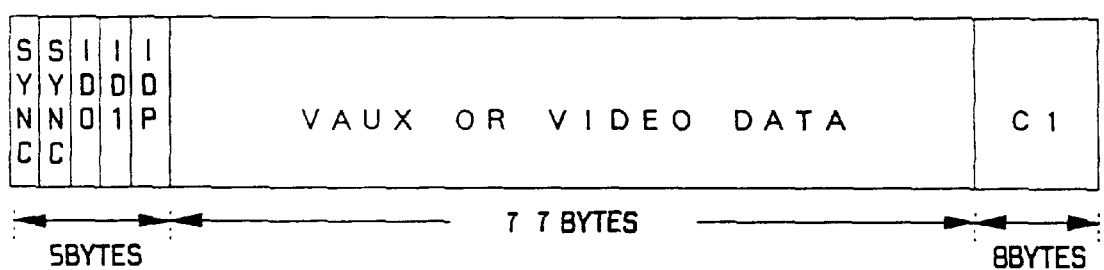
FIG. 22 is a schematic diagram showing video sync blocks.
Figure 23:
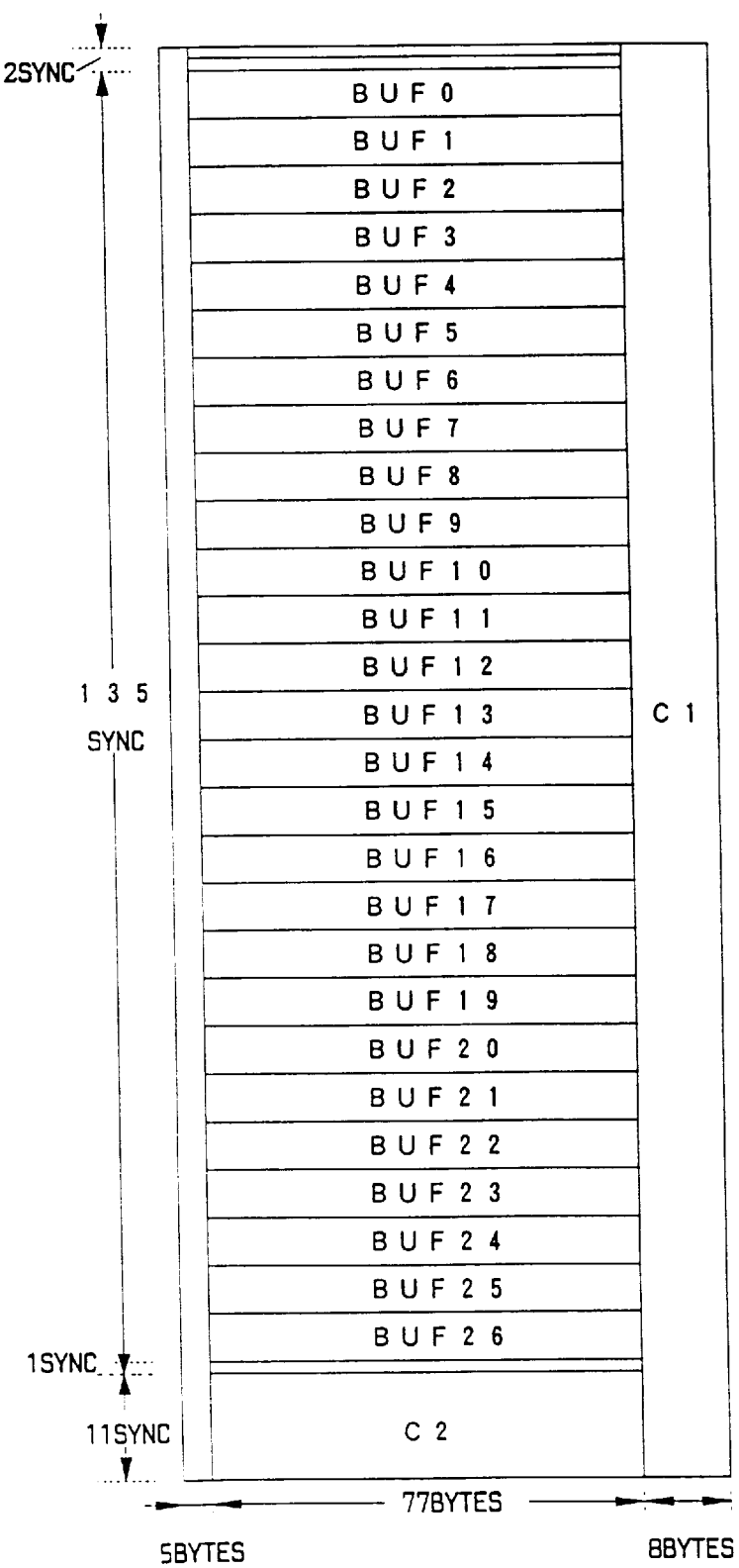
FIG. 23 is a schematic diagram describing 149 packs of the video sync blocks which are arranged.

As shown in FIG. 22, one sync block of the video sync block is constructed by 90 bytes in a manner similar to the audio. The former half five bytes have a construction similar to that of each of the presync, postsync, and audio sync. The data section comprises 77 bytes and is protected by the horizontal parity C1 (8 bytes) and the vertical parity C2 (11 sync blocks) as shown in FIG. 23. In FIG. 23, upper two sync blocks and one sync block just before the C2 parity are syncs for use in only VAUX. The data of 77 bytes is used as VAUX data. The video data of the video signal compressed by using a DCT (discrete cosine transform) other than the VAUX exclusive-use syncs and the C2 sync is stored.

The video sync block comprises 149 sync blocks per one track. After the 24–25 conversion was performed to the video sync block, it is recorded. Therefore, the total bit length is 90×149×8×25÷24=111750 bits.

Figure 24:
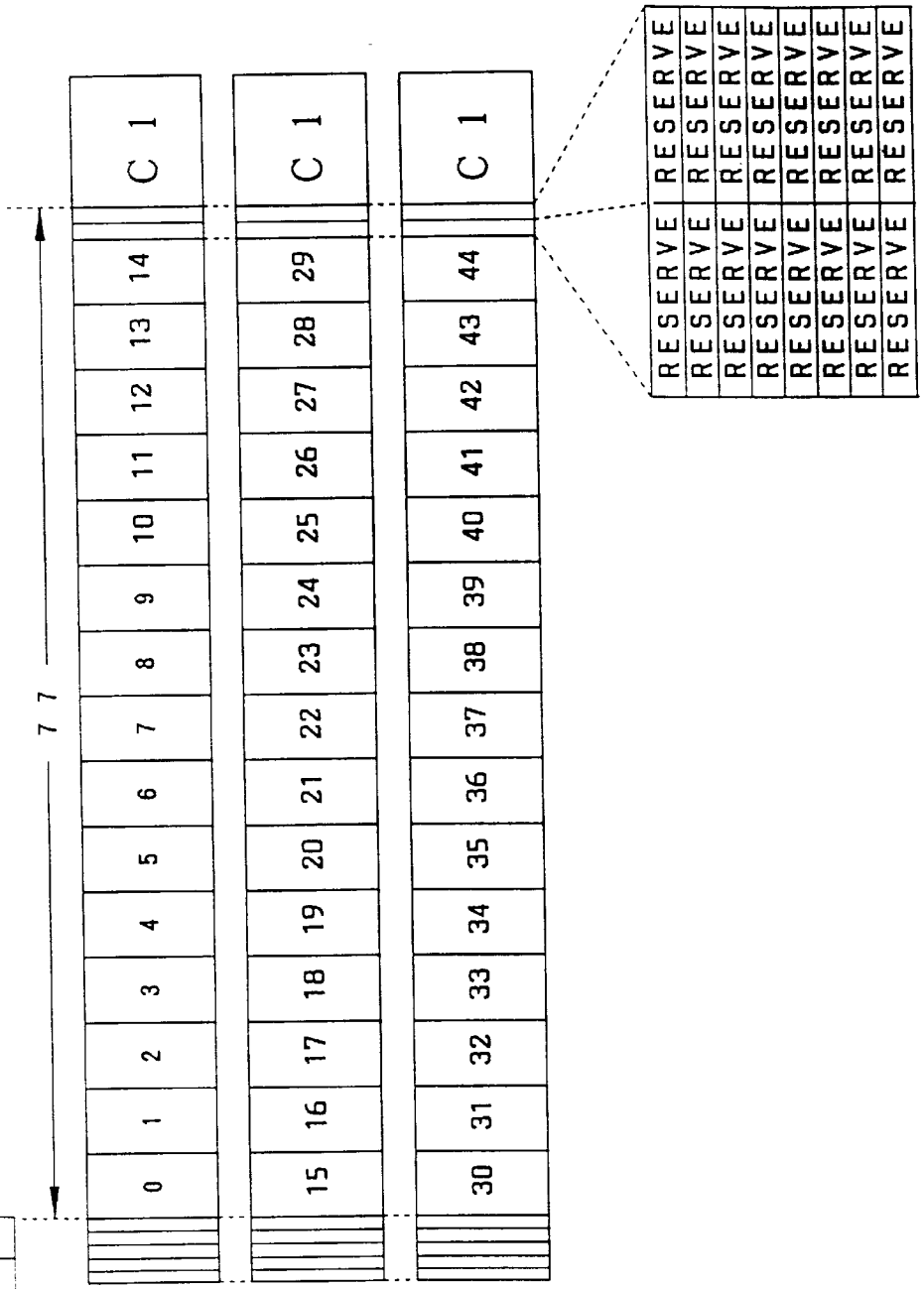
FIG. 24 is a schematic diagram showing syncs only for use in a VAUX.

FIG. 24 shows a state of the VAUX exclusive-use syncs. Upper two syncs in FIG. 24 correspond to the upper two syncs in FIG. 23. The lowest sync in FIG. 24 corresponds to one sync just before C1 in FIG. 23. When 77 bytes are divided on a pack unit basis of five bytes, two bytes remain. However, those two bytes are not specially used as reserved bytes. When those packs are numbered in a manner similar to the case of audio, 45 packs from 0 to 44 are assured per one track.

Figure 25:
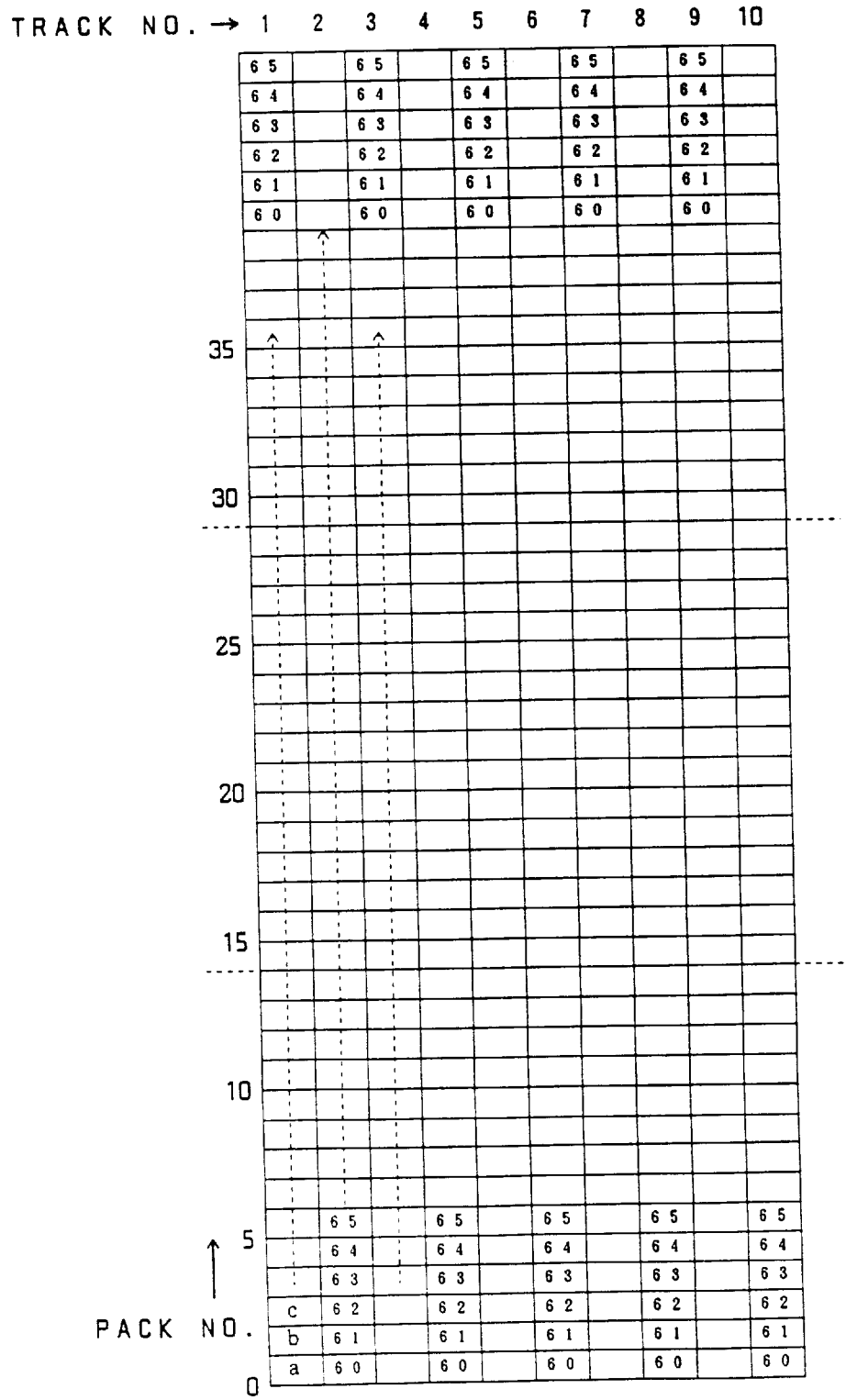
FIG. 25 is a schematic diagram describing 45 packs of the syncs only for use in the VAUX in the track direction.

FIG. 25 is a diagram of those 45 packs shown in the track direction. In FIG. 25, numerals of 60 to 65 indicate the values (hexadecimal notation) of the pack headers. Those portions are set to a main area. The same pack is written ten times in ten tracks in a manner similar to the case of the audio. Inevitable items such as television system, aspect ratio of the screen, and the like which are necessary to reproduce the video signal are mainly stored in the main area. Due to this, the data in the main area can be reproduced even for a scratch in the lateral direction, a one-channel clog, or the like which are likely to occur in the tape transport.

All of the other remaining packs are sequentially combined and are used as optional areas. In FIG. 25, in a manner similar to the case of the audio, the packs are combined in the directions shown by arrows such as a, b, c, . . . while eliminating the packs of the main area. In one video frame, 390 packs (525 lines/60 Hz) and 468 packs (625 lines/50 Hz) are prepared as optional areas. A method of handling the optional areas is similar to the case of the audio.

In FIG. 23, central 135 sync blocks relate to a storage area of the video signal. In the diagram, each of BUF0 to BUF26 shows one buffering block. One buffering block is constructed by five sync blocks. There are 27 buffering blocks per one track. There are 270 buffering blocks per one video frame and per ten tracks.

Namely, in the image data of on e frame, the areas which are effective as an image are extracted and the digital data obtained by sampling them is shuffled and collected from various portions of a real image, so that 270 groups are formed. One group among them corresponds to one buffering unit. The data of those groups are compressed on its unit basis by using a compressing technique such as a DCT system or the like. The processes are executed while evaluating whether a whole data amount lies within a target compression value or not. After that, the data of one buffering unit compressed is stored into one buffering block and five syncs.

The ID section will now be described. The IDP is used by the same system in each sector of the audio, video, and subcode and is also used as a parity to protect ID0 and ID1. Although FIGS. 26A and 26B shows the contents of the ID section, t he IDP is omitted here.

First, ID1 indicates a location to store the sync number in the track. Numbers of 0 to 168 are continuously written by the binary notation in a range from the presync of the audio sector to the postsync of the video sector. The track numbers in one video frame are written in lower four bits of ID0. The numbers are written at a rate of one number for two tracks. Both of them can be distinguished by an azimuth angle of the head. The contents of upper four bits of ID0 are changed depending on the location of the sync. First, four bits of the sequence number are inserted in the syncs of AAUX+audio and the syncs of the video data. This means that twelve kinds of numbers 0000 to 1011 are sequentially written for every one video frame. Consequently, it is possible to distinguish whether the data obtained in the variable speed reproducing mode is the data in the same frame or not.

In the presync, postsync, and sync of the C2 parity shown in FIGS. 17, 19, 21, and 23, the Application ID, AP1, and AP2 are stored into upper three bits of ID0. Therefore, AP1 is written eight times and AP2 is written fourteen times. By writing the data a number of times and also by distributing the writing positions as mentioned above, the reliability of the Application ID is assured and it is protected.

Figures 26A, 26B, 27:
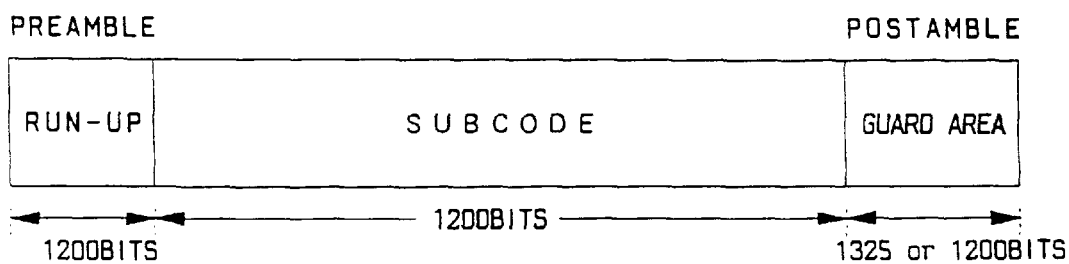
FIGS. 26A and 26B are schematic diagrams showing the contents of an ID section.
FIG. 27 is a schematic diagram of a subcode sector.

FIG. 27 is a constructional diagram of a sub-code sector. Different from the audio or video, there is none of the presync and postsync in the preamble and postamble of the subcode sector. A length of subcode sector is longer than that of the other sector. This is because the subcode sector is used in an application such as index writing or the like in which it is frequently rewritten and, since it is located at the last of the track, all of deviations of the former half of the track are added and the position of the subcode sector is totally influenced. The subcode sync block has at most 12 bytes as shown in FIG. 28. The former half five bytes have a construction similar to that of each of the presync, postsync, audio sync, and video sync. Subsequent five bytes relate to the data section. A pack is constructed by only the data section. The horizontal parity C1 has only two bytes, by which the data section is protected. So called a product code construction by C1 and C2 like the audio and video is not used. This is because the subcode is mainly used for a high speed search and the C2 parity is also not captured together in such a limited envelope. In order to search at a high speed of about 200 times, the sync length is also set to a short length of 12 bytes.

As for the subcode sync block, there are 12 sync blocks per one track. After the 24–25 conversion was performed to the subcode sync block, it is recorded. Therefore, the total bit length is 12×12×8×25÷24=1200 bits.

FIGS. 29A and 29B show the ID section of the subcode. In the subcode sector, the contents of the data section of the former half five tracks (525 lines/60 Hz) or six tracks (625 lines/50 Hz) differ from the contents of the latter half. There is an F/R flag in the MSB of ID0 to distinguish the former half portion and the latter half portion in the variable speed reproducing mode or high speed searching mode. In the sync numbers 0 and 6, the Application ID and AP3 are inserted into lower three bits. In the sync numbers other than the sync Nos. 0 and 6, an index ID, a skip ID, PP, and ID (Photo, Picture ID) are sequentially stored in accordance with the order from the upper portion. The index ID is used for a conventional index search. The skip ID is an ID for cutting an unnecessary scene like a commercial cut or the like. The PP and ID are used to search a still image.

An absolute track number exists over ID0 and ID1. As an absolute track number, the absolute numbers are sequentially written in accordance with the order from the head of the tape. On the basis of the absolute track numbers, the MIC executes a TOC (Table Of Contents) search or the like. Lower four bits of ID1 denote the sync numbers in the track.

Figures 30, 31:
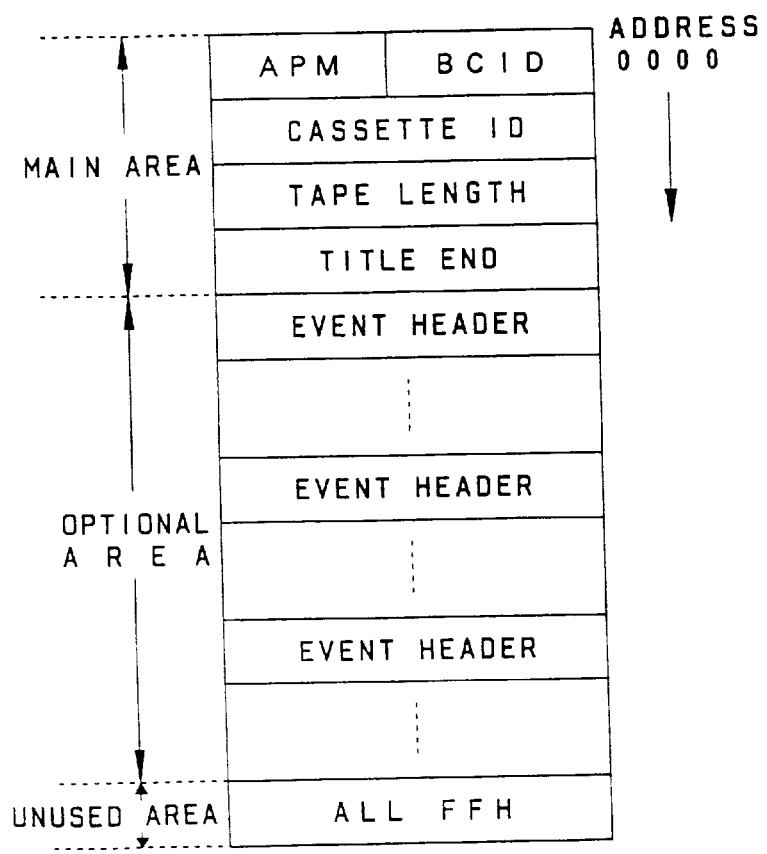
FIG. 30 is a schematic diagram showing a data section of the subcode.
FIG. 31 is a schematic diagram showing a data structure of an MIC.

FIG. 30 shows the data section of the subcode. An alphabet of a capital letter indicates the main area. An alphabet of a small letter indicates an optional area. Since one pack exists in one sync block of the subcode, there are total twelve packs of 0 to 11 as pack numbers in one track. The same character indicates the same pack contents. It will be understood that the contents of the former half are different from those of the latter half.

Items such as time code, recording year/month/day, and the like which are necessary for the high speed search are stored in the main area. Since the data can be searched on a pack unit basis, such a search is specially called a pack search.

A method such that all of the optional areas are combined and used like AAUX or VAUX cannot be used in the optional areas. This is because since the protection of the parity is weak as mentioned above, the contents are distributed to the upper and lower portions every track and the same data is written a number of times in the former half and latter half tracks, thereby protecting. Therefore, the data of six packs for each of the former half and the latter half can be used as optional areas. Such a point shall also similarly apply to both of the system of 525 lines/60 Hz and the system of 625 lines/50 Hz.

FIG. 31 shows a data structure of the MIC. The inside of the MIC is also divided into the main area and the optional areas. All of the areas are described by a pack structure except head one byte and unused area (FFh). As mentioned above, only the character data is stored by a pack structure of a variable length. The other data is stored by a pack structure of the same fixed length of five bytes as that of the VAUX, AAUX, or subcode.

In head address 0 of the MIC main area, there are three bits of the Application ID and APM of MIC and four bits of BCID (Basic Cassette ID). The BCID is a basic cassette ID and has the same contents as those of an ID board for ID recognition (tape thickness, tape kind, tape grade) in a cassette without an MIC. The ID board is used for allowing an MIC reading terminal to have the same function as a recognition hole of a conventional 8 mm VCR. Due to this, there is no need to form a hole in a cassette half as in the conventional device.

After address 1, three packs of a cassette ID, a tape length, and a title end are inserted. A more specific value of the tape thickness and memory information about the MIC exist in the cassette ID pack. As for the tape length pack, the tape manufacturer stores the tape length of the cassette by an expression of the number of tracks. A remaining amount of the tape can be soon calculated from the tape length pack and the next title end pack (recorded by the recording final position information and the absolute track number). The recording final position information provides a convenient use efficiency when a halfway is reproduced by a camcorder and stopped and, after that, the reproducing position is returned to the original final recording position or when a timer reservation is made.

The optional area is constructed by an optional event. Although the main area is a fixed area of 16 bytes in a range from address 0 to address 15, the optional area is a variable length area existing after address 16. A length of area is changed in dependence on the contents. When the event is erased, the remaining events are shifted forward in the direction of address 16, thereby preserving. FFh is written into all of the data which are unnecessary after the shifting work, thereby setting those unnecessary data into the unused areas. The optional area is obviously optional and the TOC (Table Of Contents), tag information indicative of a point on the tape, character information such as a title and the like regarding the program, and the like are stored in the optional area. When the MIC is read out, the next pack header appears every five bytes or every bytes of a variable length (character data) in dependence on the contents of the pack header. However, when FFh in the unused area is read out as a header, since it corresponds to the pack header of the no information pack (hereinafter, referred to as a NO INFO pack), the control microcomputer can detect that there is no information after that.

After that, in case of recording and reproducing the character broadcasting signal by using the foregoing digital VCR, a method of directly recording and reproducing the character broadcasting signal as original data without decoding and a method of decoding the character broadcasting signal and, after that, recording and reproducing as character data will now be described.

Figure 1:
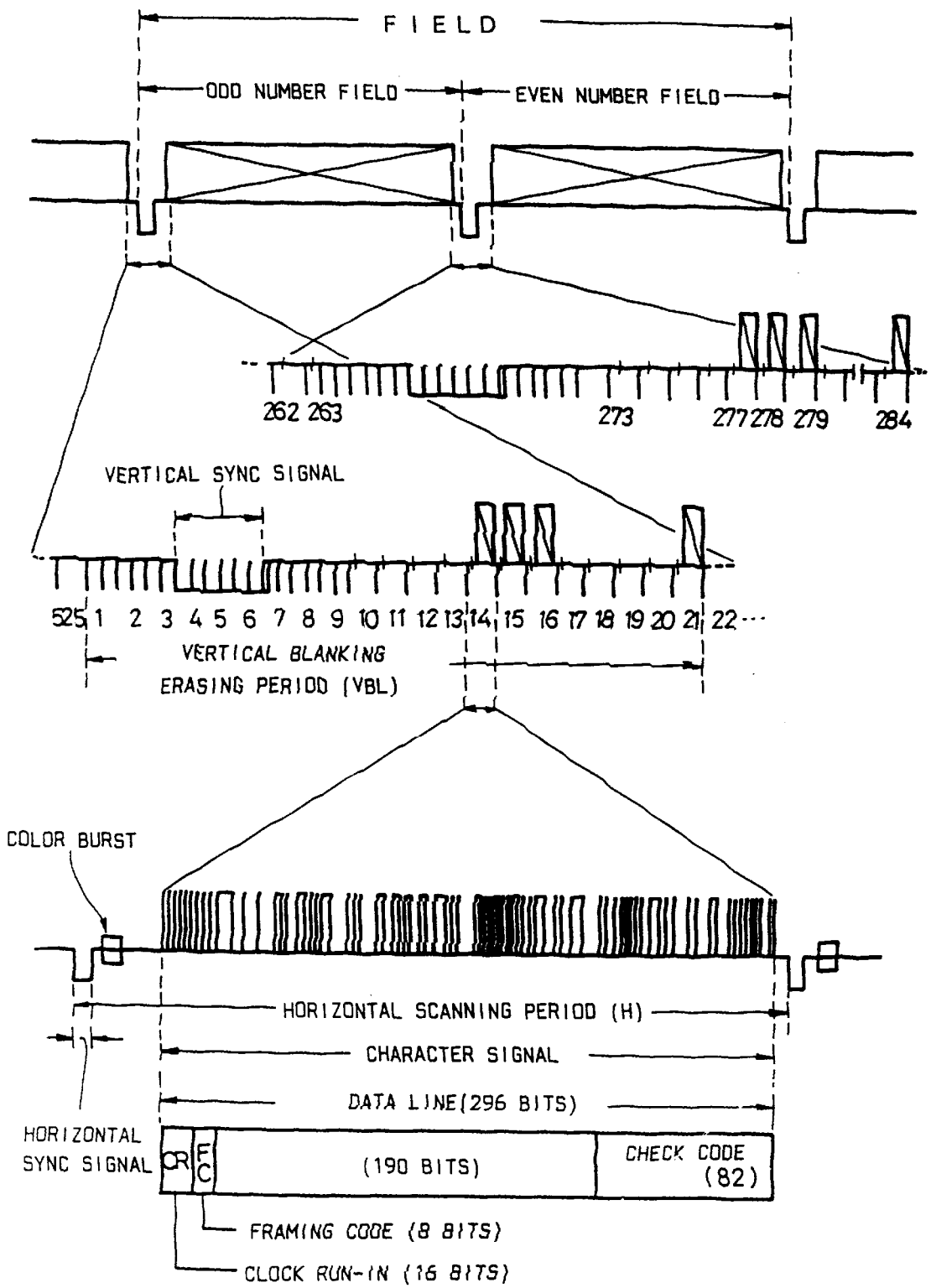
FIG. 1 is a waveform diagram showing character broadcasting signals in a vertical blanking period.
Figure 2A:
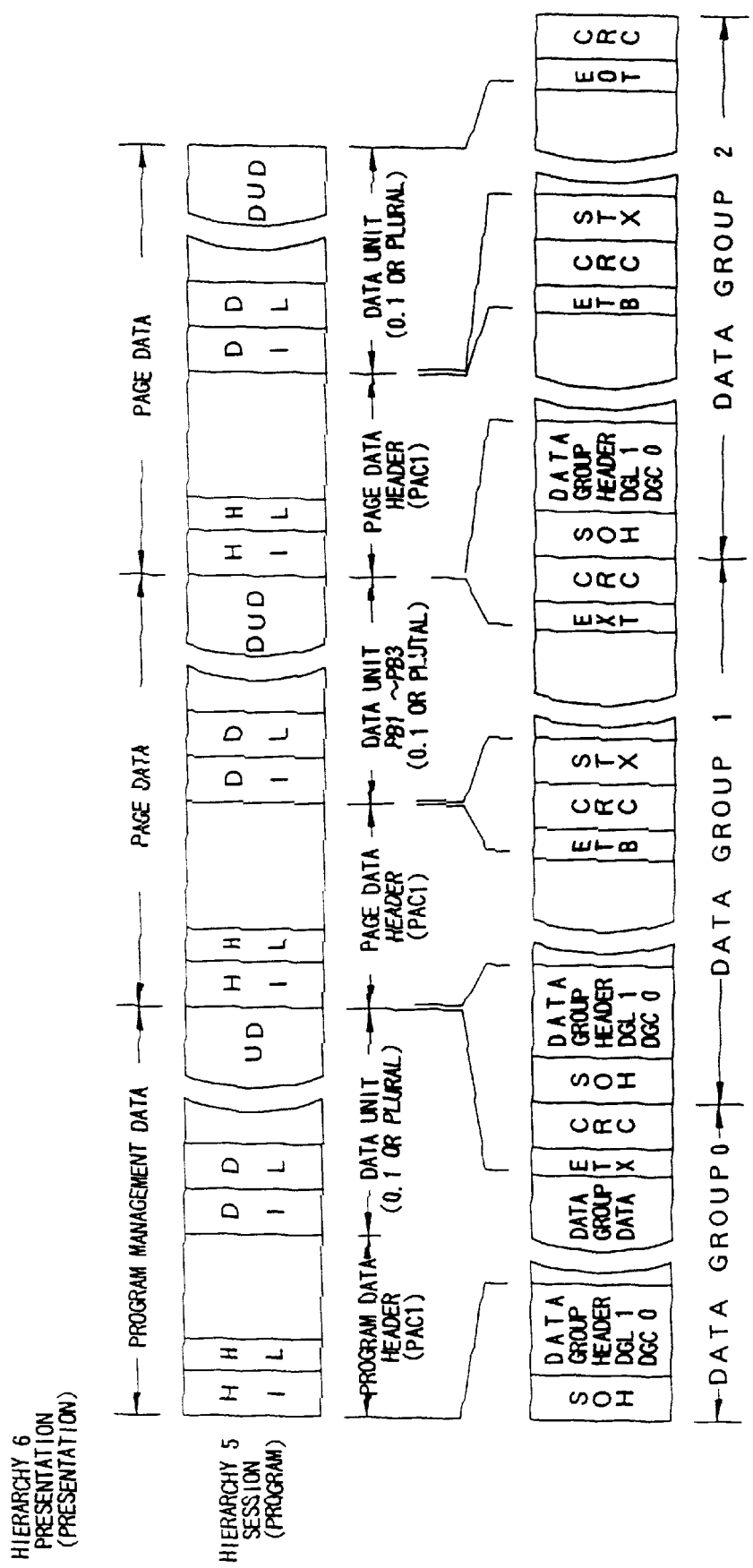
Figure 7:
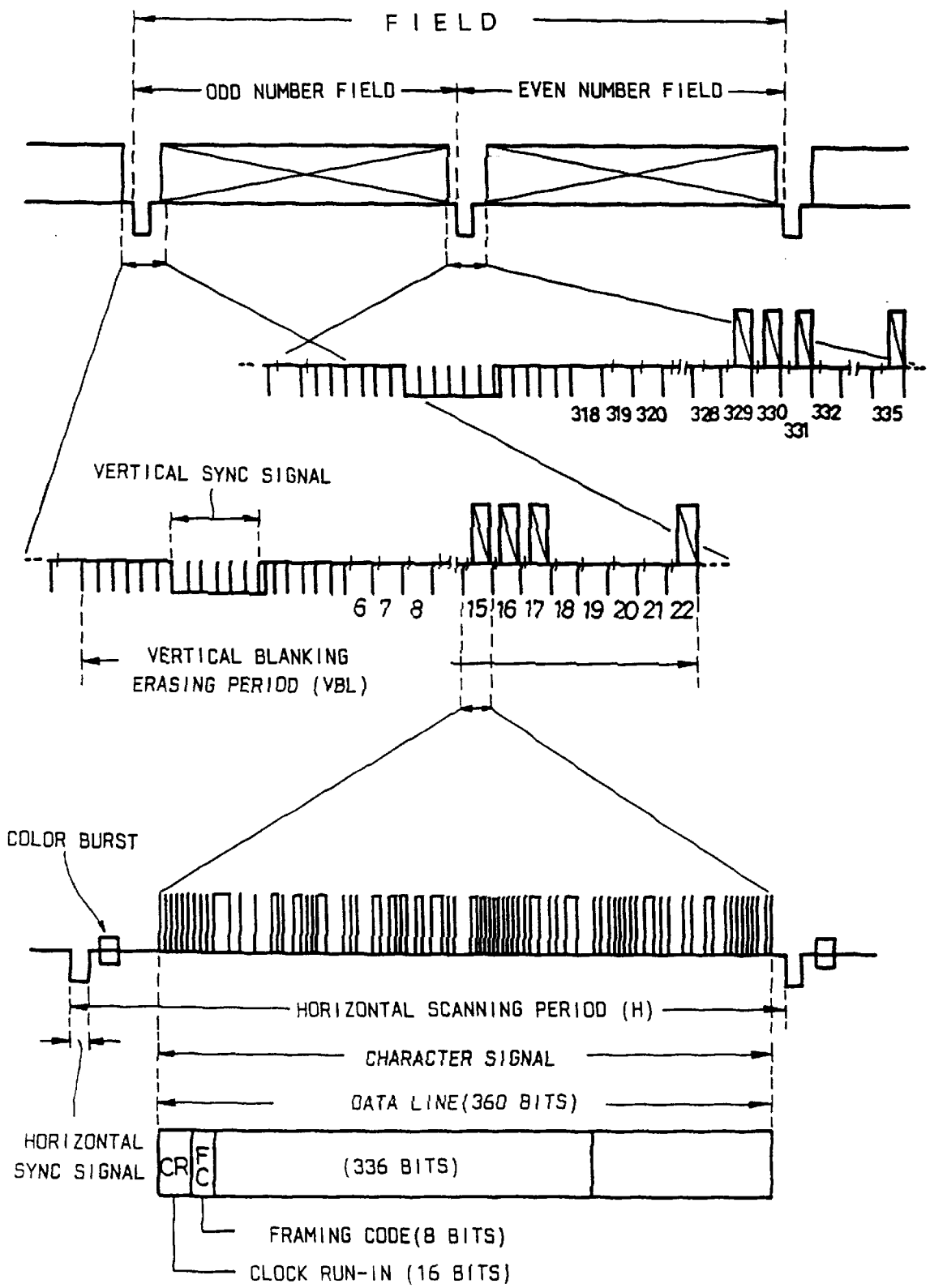
FIG. 7 is a waveform diagram showing a character broadcasting signal in a WST system in the vertical blanking period.

First, the method of directly recording the character broadcasting signal as original data without decoding will be described. The applicant of the present invention has already invented the apparatus for recording and reproducing the character broadcasting signal without decoding (Japanese Patent Application No. 5-24297). In case of the Japanese character multiplex broadcast, 16 bits of the clock run-in and 8 bits of the framing code are excluded from 296 bits of the data line in FIG. 1, an ID code comprising two bits of a format ID, one bit of discrimination of the odd number/even number field, and five bits of a line encode number is newly added to the head, and data and a check code section are stored into the buffer memory. When the character broadcasting signal as much as one video frame is stored, a terminate code is finally added. In case of the WST, although the numbers of bits differ as shown in FIG. 7, the processing method is equal.

Figure 32:
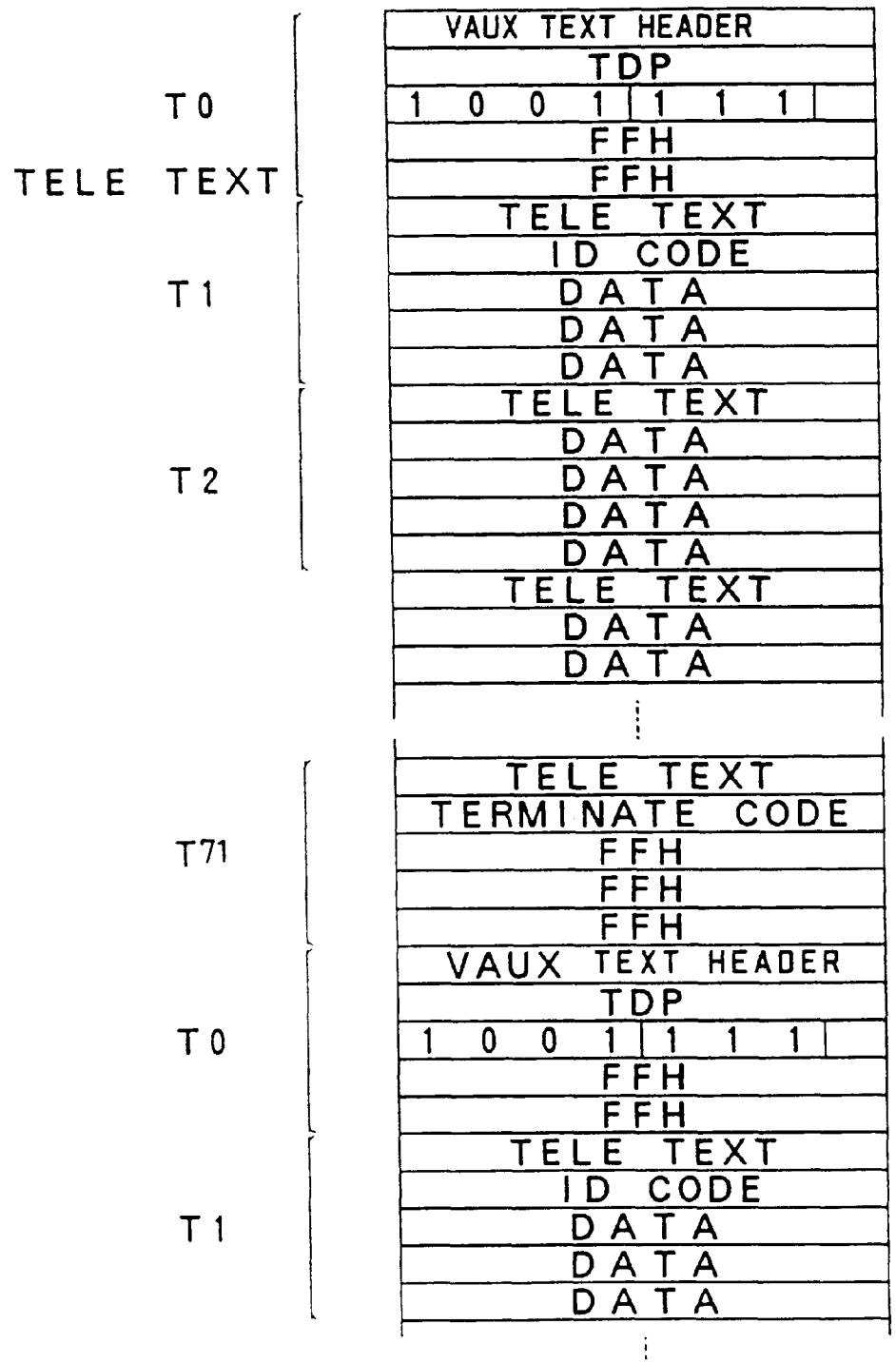
FIG. 32 is a schematic diagram showing an example of a pack construction when recording a character broadcasting signal.

FIG. 32 shows an example of a pack construction when the character broadcasting signal is recorded. Upon recording, as shown in FIG. 32, a VAUX text header pack is added to the head and, after that, the foregoing data is stored into the teletext pack on a four byte unit basis. As mentioned above, the teletext pack is used to record the character broadcast without decoding. FFh indicating no information is stored into the remaining pack data areas. When eight lines each consisting of 35 bytes are added with a terminate code and are stored into the packs, 71 packs are obtained. When the head VAUX text header pack is added, total 72 packs are derived. FIG. 33 shows a state in which they are recorded in the VAUX optional areas in FIG. 25. Such an example relates to the case of the existing 8-line recording in the Japanese character multiplex broadcast. The same data is written five times and the remaining portions are filled with NO INFO packs (all of five bytes are set to FFh).

As shown in FIG. 33, the data in a range from data T0 including the VAUX text header to data T71 including the terminate code indicative of the end of data is recorded as a group data a plurality of number of times. Consequently, even when a one-channel clog or the like occurs, the data can be properly read out. T0 to T38 are recorded to the pack Nos. 0 to 38 of the track No. 1. T39 to T71 are recorded into the pack Nos. 6 to 38 of the track No. 2. As mentioned above, one group data (T0 to T71) is recorded into the optional areas of two tracks. In a manner similar to the packs recorded in the main area in FIG. 25, the packs of the same contents are also recorded in the main area a plurality of number of times in FIG. 33.

The packs which are used here are shown in FIGS. 34 and 35. FIG. 34 shows the text header pack of VAUX. It is specified when the header is set to "01101000". The TDP (teletext pack subsequent to the text header pack or the total number of text packs) is recorded as a binary number into the LSB of PC1 and PC2. The text type is recorded into upper four bits of PC2. The option numbers ("111" in case of recording the teletext) are written into lower three bits. The text code (FFh in case of recording the teletext) is recorded into PC3. The teletext data is recorded when t he text type is s et to "9".

FIG. 35 shows the teletext pack which is recorded into the VAUX area. It is specified when the header is set to "01100111". The teletext data is recorded into PC1 to PC4.

The method of decoding the character broadcasting signal and recording and reproducing as character data will now be described. In case of the digital VCR having a character broadcasting decoder therein, it is decoded and can be recorded as actual character data.

The character data obtained by decoding is recorded by using both of program text header pack shown in FIG. 36 and program text pack shown in FIG. 37. The program text header packs are specified when the header is set to "01001000". In a manner similar to the foregoing VAUX text header pack, the TDP is written as a binary number into the LSB of PC1 and PC2. The text type is written into upper four bits of PC2. The option number is written into lower three bits. The text code is written into PC3.

The program text pack is specified when the header is set to "01001001". The font data, graphic data, text data, and the like which coincide with the text type that is designated by the program text header pack are included in the program text pack in a range of PC1 to PC4.

The contents of the character data recorded are discriminated by the text type recorded in the text header pack. FIG. 38 shows the text type of the program text header pack. The text type "name (0 as a hexadecimal notation expression) indicates the program name of the program text header. "memorandum (1)" indicates a memorandum regarding the program. "station (2)" indicates a broadcasting station name. "model (3)" indicates a program source and a model name. "operator (6)" indicates an operator name. "subtitle (7)" indicates a subtitle. "outline (8)" indicates an outline of the program. "teletext (9)" indicates a full screen. "teletext (A)" indicates (with control code). "1-byte code font (C)" and "2-byte code font (D)" indicate font data that is used in the program text. "graphic (E)" indicates graphic data that is used in the program text.

For example, when recording subtitle data, the subtitle of "7" is used. The outline of "8" is used for an outline or the like of the television broadcasting program. Upon reproduction, character data is reconstructed on the basis of the text code of the program text header pack.

As a method of recording a character broadcasting signal, there are three kinds of methods: method (first method) whereby essences (only subtitles and outline) of the character broadcast are extracted and recorded; method (second method) whereby only the actual display screen itself of the character multiplex broadcast is recorded; and method (third method) whereby control codes and the like are recorded instead of the display screen itself. In case of recording by the second method, the full screen of the text type 9 is used.

In case of recording by the third method, (with control code) of the text type A is used.

A method of searching a target character broadcasting program or teletext page will now be described with respect to a VCR of the simple decoder built-in type and a VCR of the full decoder built-in type, respectively. In case of recording without decoding, it is sufficient to use a simple decoder. In case of decoding and recording as character data, a full decoder is necessary.

Figure 4:
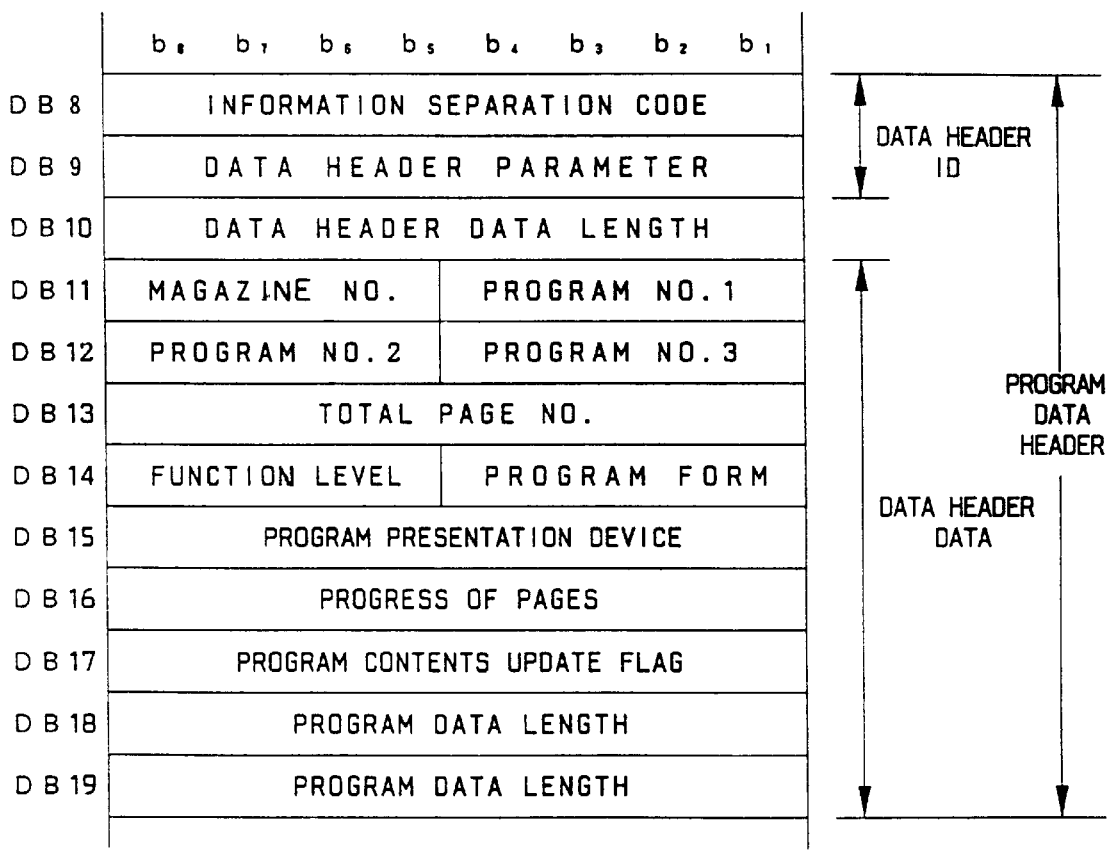
FIG. 4 is a schematic diagram showing a program data header.

First, explanation will now be made with respect to the VCR having a simple decoder of the Japanese character multiplex broadcast. When the channel number and the program number of the character broadcasting program to be seen are designated, the channel of a tuner built in the VCR is switched. Thus, the character broadcasting number is received. The prefixes of all of H lines in the received number are detected and a program management data block is searched. After that, a check is made to see if the program number (refer to FIG. 4) in the program data header (PRCI) coincides with the designated program number or not. When they coincide, this means that the program has been sent by using the H lines, so that only the H lines are searched after that. In this instance, the data such as total number of pages of the program, program format, program content updating flag, and the like is also fetched.

Figure 5:
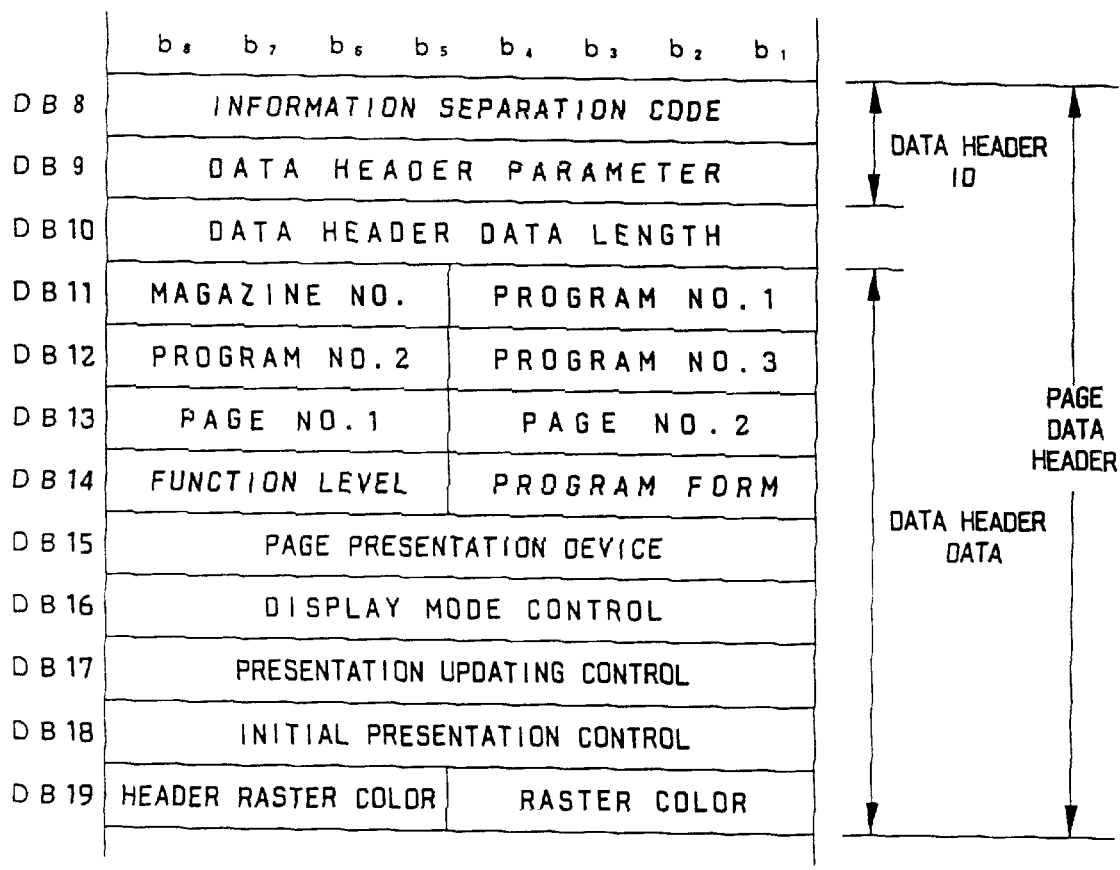
FIG. 5 is a schematic diagram showing a page data header.
Figure 6:
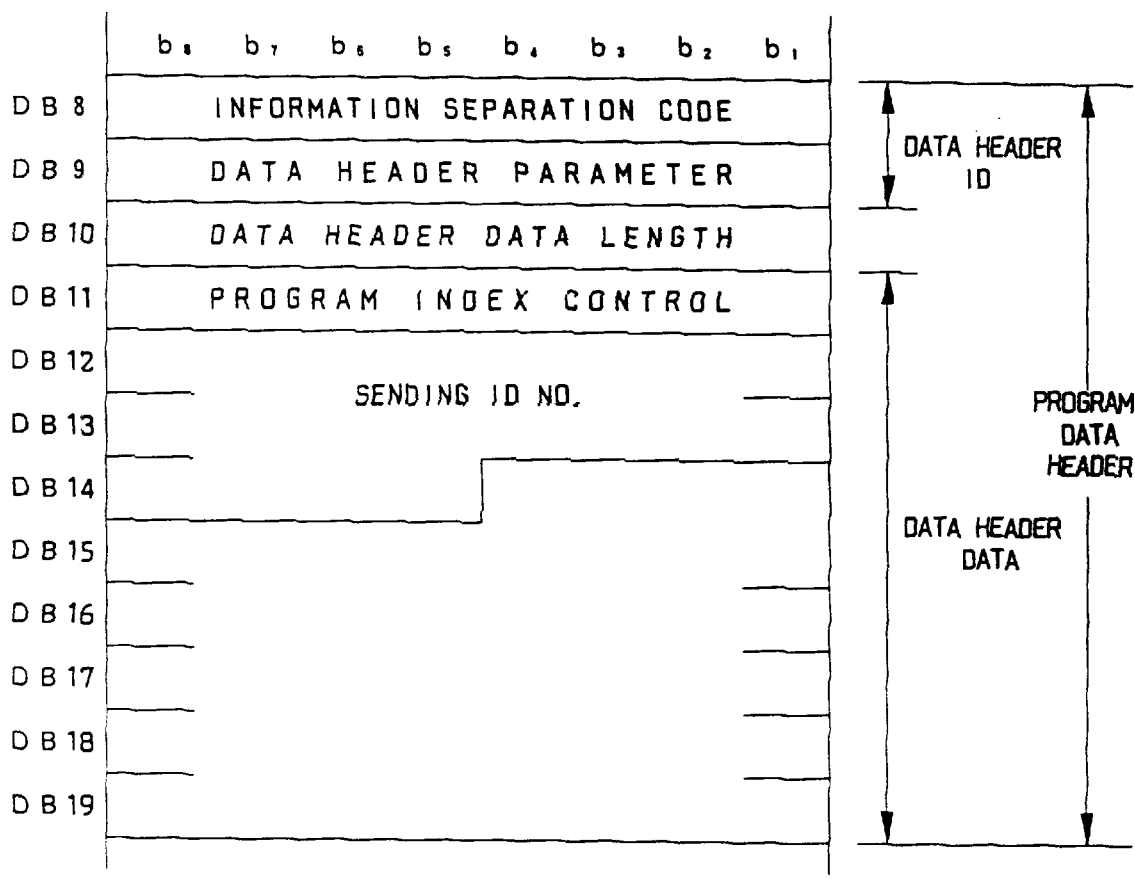
FIG. 6 is a schematic diagram showing a page data header.

The page data header block is subsequently searched. When the program number in FIG. 5 coincides, the page is directly recorded without decoding. After that, all of the pages are recorded by a similar procedure. At a time point when the end of transmission code EOT is detected, the completion of the transmission of one program is recognized. In this instance, even when all of the pages of one program are recorded, they are further repetitively recorded a plurality of number of times in consideration of that an error exists in the data itself obtained from the character broadcasting tuner or an error which occurs by recording onto the tape. As for the recording, when the image recording is started after the page No. 1 in FIG. 5 was found out, the data can be seen from the first page of a desired program upon reproduction of the tape, so that it is convenient. The recognition of those picture plane progressing information can be realized by a simple microcomputer program or circuit. The circuit will be described hereinlater.

The system having a full decoder of the Japanese character multiplex broadcast will now be described. When the channel number and the program number of a desired character broadcasting program are designated, the channel of the VCR built-in tuner is switched and the character broadcasting program is received. Information regarding that the designated character broadcasting program has been transmitted by using which H lines is judged. That is,

TF=0, IF=1, DG1=F are searched and the program index data is found out. In the case where the designated program number doesn't exist in the program index data, the program index data of the other H lines is searched. On the contrary, in the case where the designated program number exists in the program index data, the character signal that is transmitted by those H lines is subsequently checked. The apparatus waits until the designated program data is transmitted. According to such a method, although the target program can be searched earlier than the method described in the simple decoder, its microcomputer program is complicated. In place of such a method, the desired program can be also searched by the method described in the simple decoder. Such a method can be also used in case of the simple decoder.

Each time the program management data block is found out, the program number (refer to FIG. 4) in the program data header (PRCI) is checked, thereby judging whether it coincides with the designated number or not. In this instance, the total number of pages of such a program, program format, program contents updating flag, and the like are also fetched. The page data header block is subsequently searched. When the program number coincides, the relevant page is decoded and stored into the buffer memory. When all of the pages are stored in the buffer memory, they are recorded to the VCR. At this time, they are repetitively recorded a plurality of number of times also in consideration of an error which occurs due to the recording onto the tape. In this case, it is sufficient to merely repetitively generate the contents of the buffer memory. If the data is sequentially stored into the buffer memory in accordance with the order from the page found out and the images are sequentially recorded from the page No. 1, the desired program can be seen from the first page upon reproduction of the tape.

The digital VCR having a simple decoder in case of the WST will now be described. When the channel number and the page number of a desired character broadcasting program are designated, the channel of the VCR built-in tuner is switched and the character broadcasting program is received. The prefixes of all of the H lines in the number are retrieved. The packet of the magazine number of the page is searched and is discriminated to see if it coincides with the designated packet or not. That is, after the magazine number coincided, lower two digits of the page number are checked, thereby judging whether they coincide with the designated numbers or not. If YES, the page is directly recorded without decoding. In this instance, even when the page is recorded, it is further repetitively recorded a number of times in consideration of that an error exists in the data itself derived from the WST tuner and an error which occurs by recording onto the tape. The recognition of those screen progressing information can be realized by a simple microcomputer program or circuit.

The digital VCR having a full decoder in case of the WST will now be described. In this case, the page is merely decoded and stored into the buffer memory. After that, the page is recorded in the VCR. In this instance, the page is repetitively recorded a number of times also in consideration of an error which occurs by recording onto the tape. In the case where a plurality of pages are designated and stored into the buffer memory, the contents of them are sequentially sorted in accordance with the order from the small page number or the images are sequentially recorded in accordance with the designated order of the user, so that the data can be seen from the first page upon reproduction of the tape. A sorting method and a designating method by the user will be described hereinbelow.

In case of the character multiplex broadcast, various recordings can be performed by using program format information and program updating flag. Due to this, it is possible to realize a VCR having a function such that, when the program is updated, the recording is automatically started or, when a subtitle broadcast or outline is broadcasted, the recording is automatically started. That is, when a change in program updating flag is detected, the updated program is recorded. At this time, the time at which the program was updated is also recorded. In case of the Japanese character multiplex broadcast, the subtitle broadcast is fixedly set to the program number 999 page. Further, whether the program is a subtitle program or a complementary program can be recognized by the foregoing program format. In case of the WST, such a page of the subtitle broadcast differs every country. For example, in England, it is fixed to 888 page. In Germany, it is fixed to 150 page. As for the complementary page, in case of the WST, by referring to the packet X/27 (X indicates the magazine number), the relative page information can be obtained.

FIGS. 39A and 39B show teletext information packs. FIG. 39A shows a pack for the Japanese character multiplex broadcast. FIG. 39B shows a pack for the WST. In FIG. 39A, such a pack is constructed when the header is set to "00001100". The digit of 10 of the program number is written into upper four bits of PC1 and the digit of 1 of the program number is written into lower four bits. The magazine number is written into upper four bits of PC2 and the digit of 100 of the program number is written into lower four bits. The digit of 10 of the page number is written into upper four bits of PC3 and the digit of 1 of the page number is written into lower four bits. The digit of 10 of the total number of pages of the program is written into upper four bits of PC4 and the digit of 1 of the total number of pages is written into lower four bits. In FIG. 39B, the digit of 10 of the page number is written into upper four bits of PC1 and the digit of 1 of the page number is written into lower four bits. "1111" is written into upper four bits of PC2 and the digit of 100 of the page number is written into lower four bits. The digit of 10 of the subpage number is written into upper four bits of PC3 and the digit of 1 of the subpage number is written into lower four bits. The digit of 10 of the total number of subpages is written into upper four bits of PC4 and the digit of 1 of the total number of subpages is written into lower four bits. FIGS. 39A and 39B will now be integratedly described. The program number is written into all bits of PC1 and into lower four bits of PC2, the magazine number is written into upper four bits of PC2, the page number is written into PC3, and the total number of pages is written into PC4, respectively. In case of the WST, since a concept indicative of the magazine is included in a concept indicative of the page, "1111" is set.

FIGS. 40A and 40B are pack constructional diagrams for explaining a use example of the foregoing teletext information pack. FIG. 40A shows an example in case of recording the character broadcast into the optional area in the VAUX area without decoding. FIG. 40B shows an example in case of inserting the teletext information pack into the character broadcast and recording the resultant signal without decoding. The text type 9, namely, teletext is used (refer to FIG. 34) in the VAUX text header shown in FIGS. 40A and 40B. Due to this, the data of the character broadcasting signal is directly recorded. In FIG. 40A, it is sequentially recorded in accordance with the transmitting order of the teletext data. Therefore, in the case where the character broadcast is executed by the foregoing non-batch type, page data of various programs is mixed and recorded. In FIG. 40B, the teletext information pack is inserted between the VAUX text header pack and the teletext pack. In this case, the page and program are designated and the data is recorded. Therefore, as shown in FIG. 40A, the page data of various programs are not mixed but one program is recorded as one group. As mentioned above, in the case where the teletext information pack has been inserted, one program can be recorded as one group. It is also possible to perform the recording in a manner such that only the second page of a certain program is recorded.

FIGS. 41A and 41B show examples of a construction of a pack in case of decoding the character broadcast and recording into the optional area in the VAUX area. In this case, the character data of the character broadcast is handled as a program text. FIG. 41A shows an example in the case where only the essence (for instance, a subtitle program or a complementary program) is extracted from the character broadcast and is recorded. FIG. 41B shows an example in the case where the text data is recorded as one group every program. In case of decoding and recording the character broadcast, the following text type of the program text header is used. Namely, as shown in FIG. 41A, in case of extracting and recording only the essence of the character information, the text type 7 (subtitle character data) or 8 (complementary character data (outline or the like)) is used. In case of recording the picture plane itself of the character broadcast as shown in FIG. 41B, the text type 9 (full screen) is used. In case of recording while leaving the control code, the text type A (with control code) is used.

Figure 42:
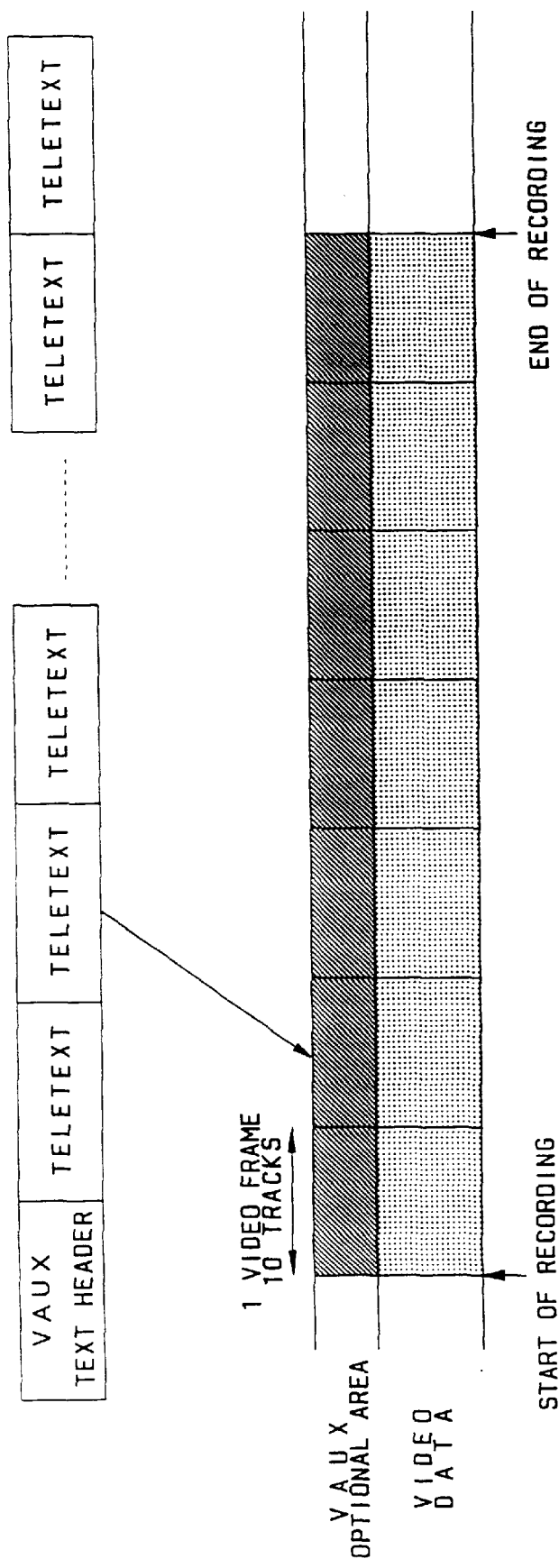
FIGS. 42 to 46 are schematic diagrams each showing a recording area of a tape in case of recording a character broadcast without decoding.

FIGS. 42 to 46 show recording areas of a tape in case of recording the character broadcast without decoding. As mentioned above, the text type in the text header of the VAUX is recorded as a teletext (9). FIG. 42 shows a recording area of the teletext in case of recording as shown in FIG. 40A. As will be also understood from FIG. 42, the teletext is recorded into the VAUX optional area. The teletext is recorded in correspondence to ten tracks (one video frame) of the real image data that is recorded into the video data area. Namely, the recording of the character broadcasting data sent for a time in one frame has to be completed in the corresponding ten tracks and must not overflow into the next ten tracks. Even when recording a number of times, the recording must lie within the ten tracks. Such a limitation is caused on the basis of the performance of the digital VCR such that the data is edited on a unit basis of one video frame. The start and end of the recording can be set manually or by reservation of the timer recording. By recording all of the character broadcasting data at the time of video recording as mentioned above, the contents can be referred later and the subtitle broadcast, complementary broadcast, or the like can be also used. Particularly, when considering a television of the wide type, since there is a case where subtitles are transmitted in the character broadcast instead of the image, it is desirable to always store the character broadcasting data.

Figure 43:
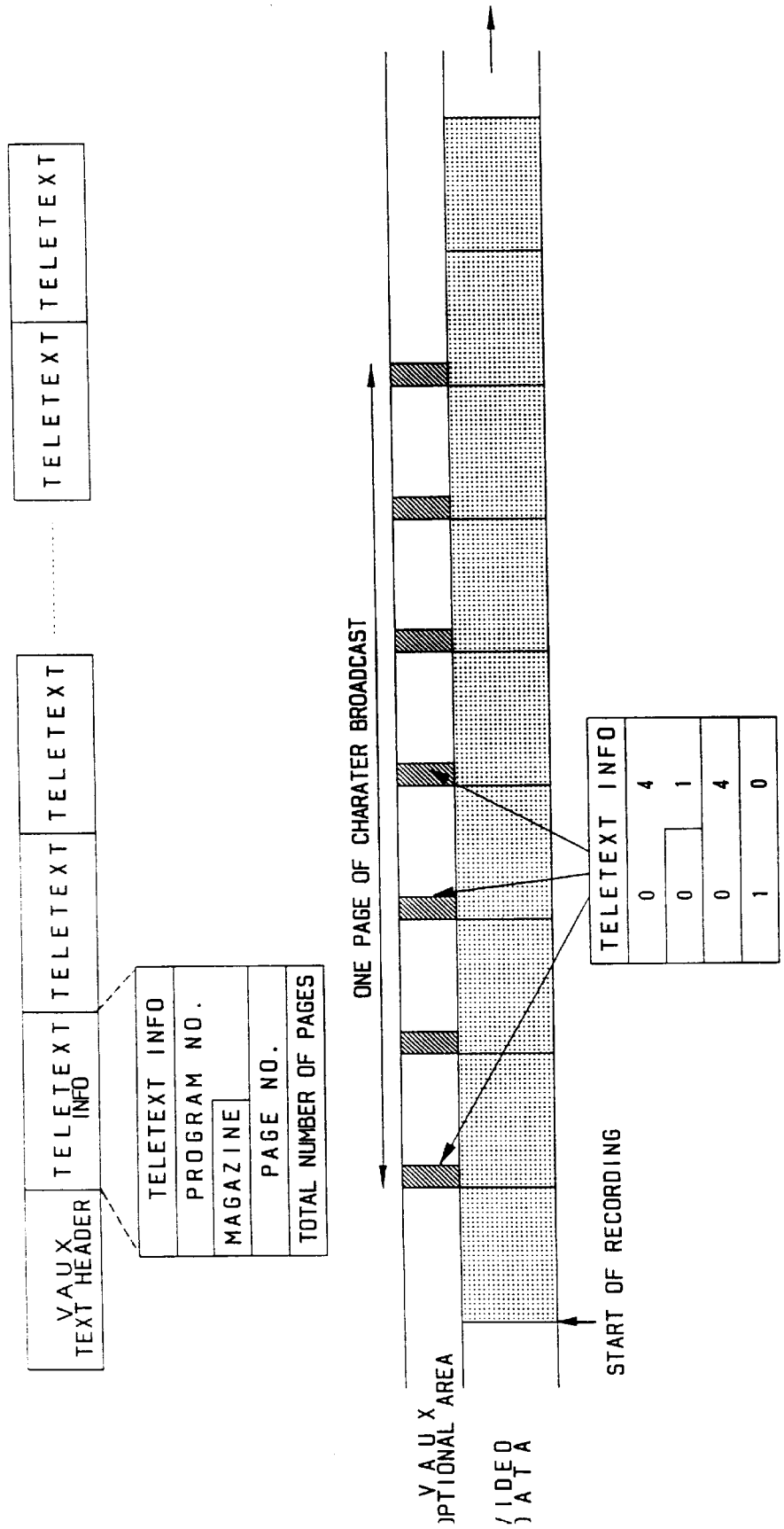

FIG. 43 shows a recording area of the teletext in case of recording as shown in FIG. 40B. In FIG. 43, only the character broadcasting data (program or page designated by the teletext information pack) in the character broadcast that is transmitted in one video frame is selected and recorded. In this case, since all of the program data of the transmitted character broadcast are not always recorded, with respect to one character broadcasting program, two H lines per one video frame are merely recorded in the Japanese character multiplex broadcast. This is because one program is broadcasted by using one H line and two lines per one frame. In the WST, maximum 30 lines in a range from the packet X/0 to the packet X/29 are fetched. When considering an error, it is preferable to record the same teletext information pack a plurality of number of times. As shown in the diagram, although the video data has been recorded at the recording start time point, no character broadcasting data is recorded. This is because it is necessary to wait until the designated character broadcasting program is transmitted.

Figure 44:
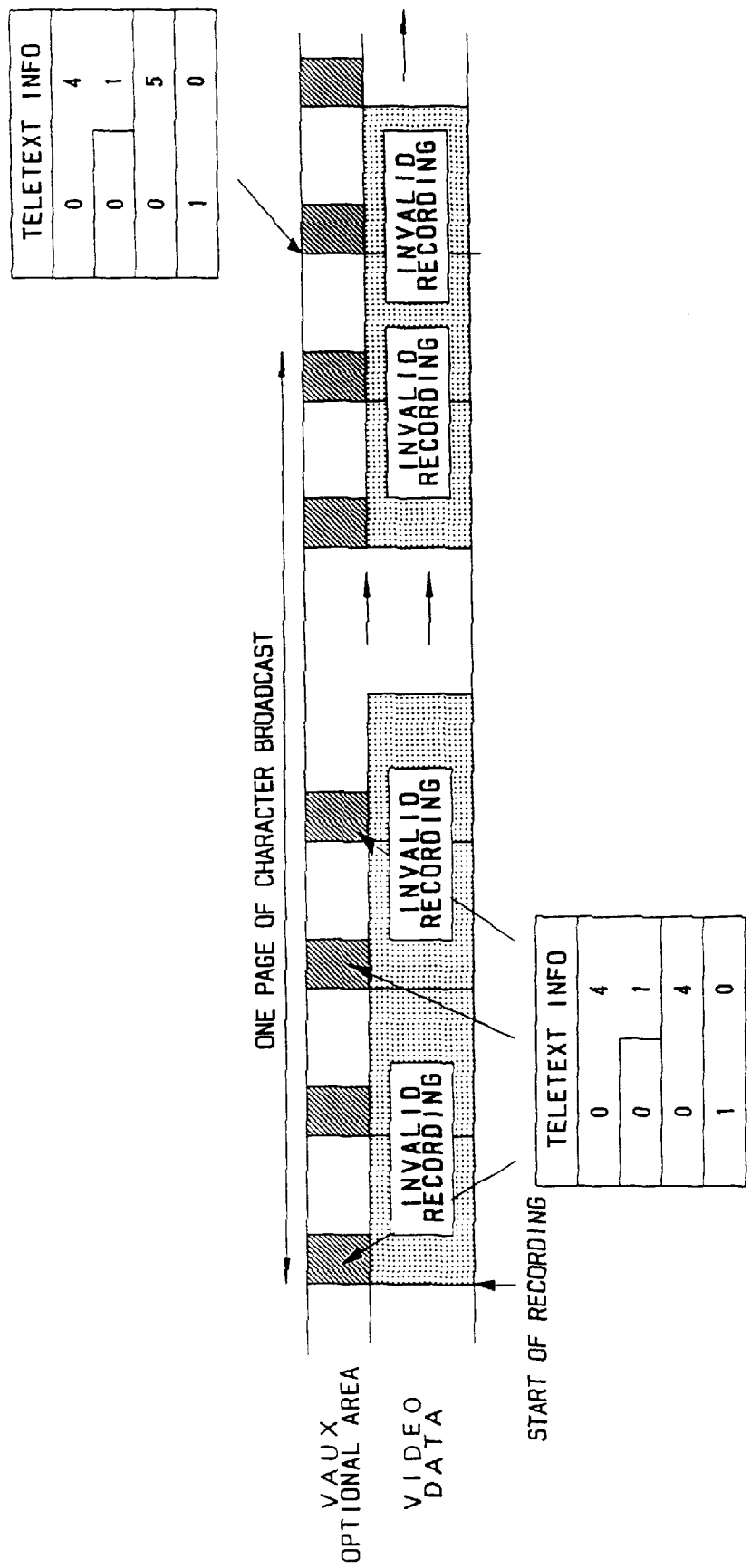

FIG. 44 is a diagram in the case where only the designated character broadcasting program is selected and recorded into the VAUX optional area on the tape and the video data area is made invalid. In FIG. 44, even in case of the timer recording operation or even in the manual recording operation, the recording of the VAUX optional area is started from the position at which the page of the program designated by the teletext information pack was found. In this case, since only the teletext data is recorded, nothing is recorded in the video data area or is handled as an invalid data. That is, the video data is recorded as invalid data by setting the recording mode that is defined in the VAUX source control pack (01100001) (position of 61 in FIG. 25) which is recorded in the main area of the VAUX into 11. In case of such a recording, it is sufficient to use substantially the same control or the like of the mechanism system as that of the conventional one. In a manner similar to the foregoing case, it is desirable to record the same character broadcasting data a plurality of number of times for preparation of the case where an error or the like occurs. The same character broadcasting data can be also recorded in ten tracks a plurality of number of times or the same data can be also recorded until the next page is transmitted.

Figure 45:
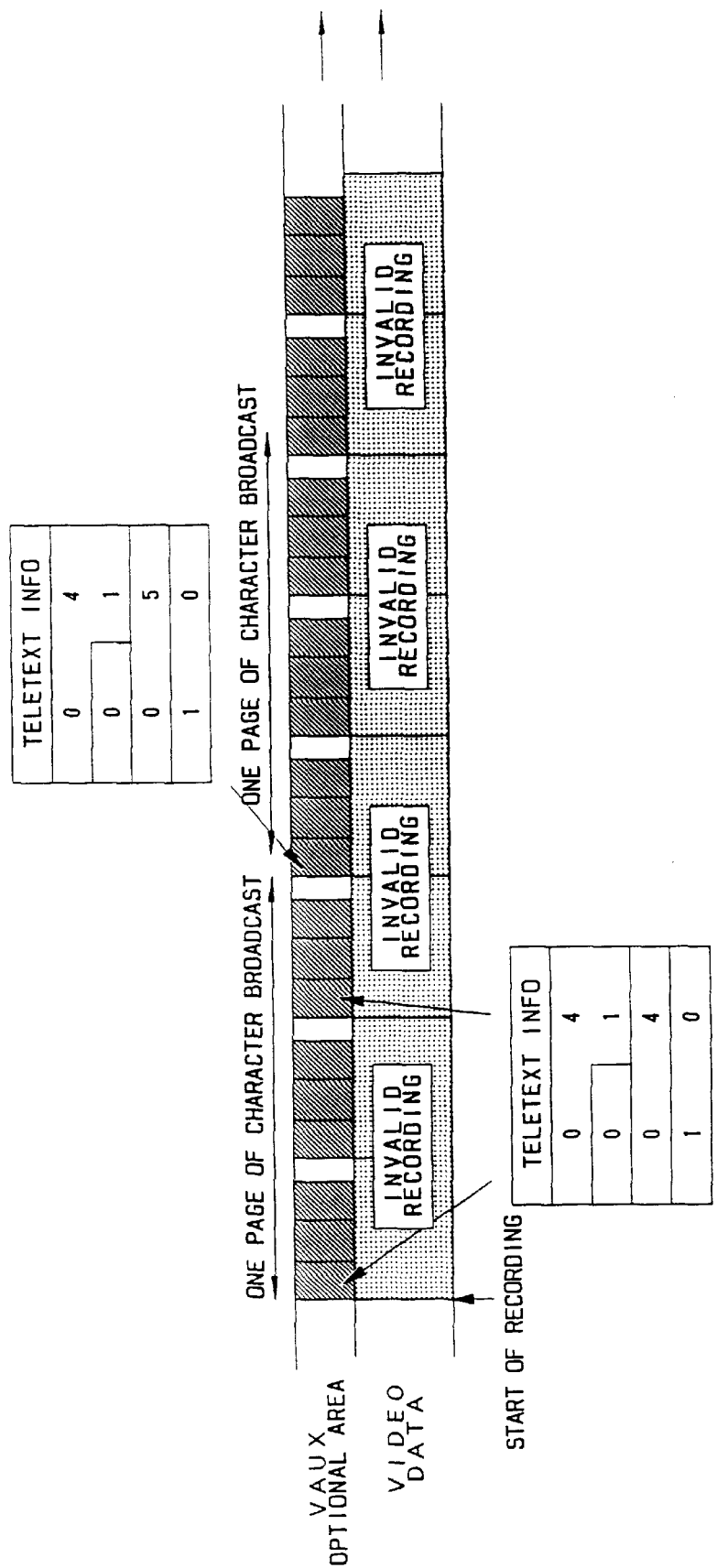

FIG. 45 is a diagram in the case where the character broadcasting program is designated and, when the page of the designated character broadcasting program is sent, it is fetched into the buffer memory, and when the data of one page is received, it is recorded, and the tape is stopped until the data of the next page is recorded into the buffer memory. Data is recorded as invalid data into the video data area in a manner similar to FIG. 44. In the recording as shown in FIG. 45, two H lines in which desired character broadcasting data is included are fetched into the buffer memory. When the data of a predetermined amount (for example, one page) is stored, the mechanism system is driven and the character broadcasting data is directly written into the VAUX optional area without decoding. The mechanism system is held in a stopped state until the next writing timing (the data of the next one page is recorded into the buffer memory). As mentioned above, by densely recording the character broadcasting data, a data storing efficiency can be raised. Even in the non-batch type program, since it is changed to the batch type program, the pages can be successively transmitted without a waiting time. Further, the servo circuit system of the mechanism has a compatibility with the conventional one.

Figure 46:
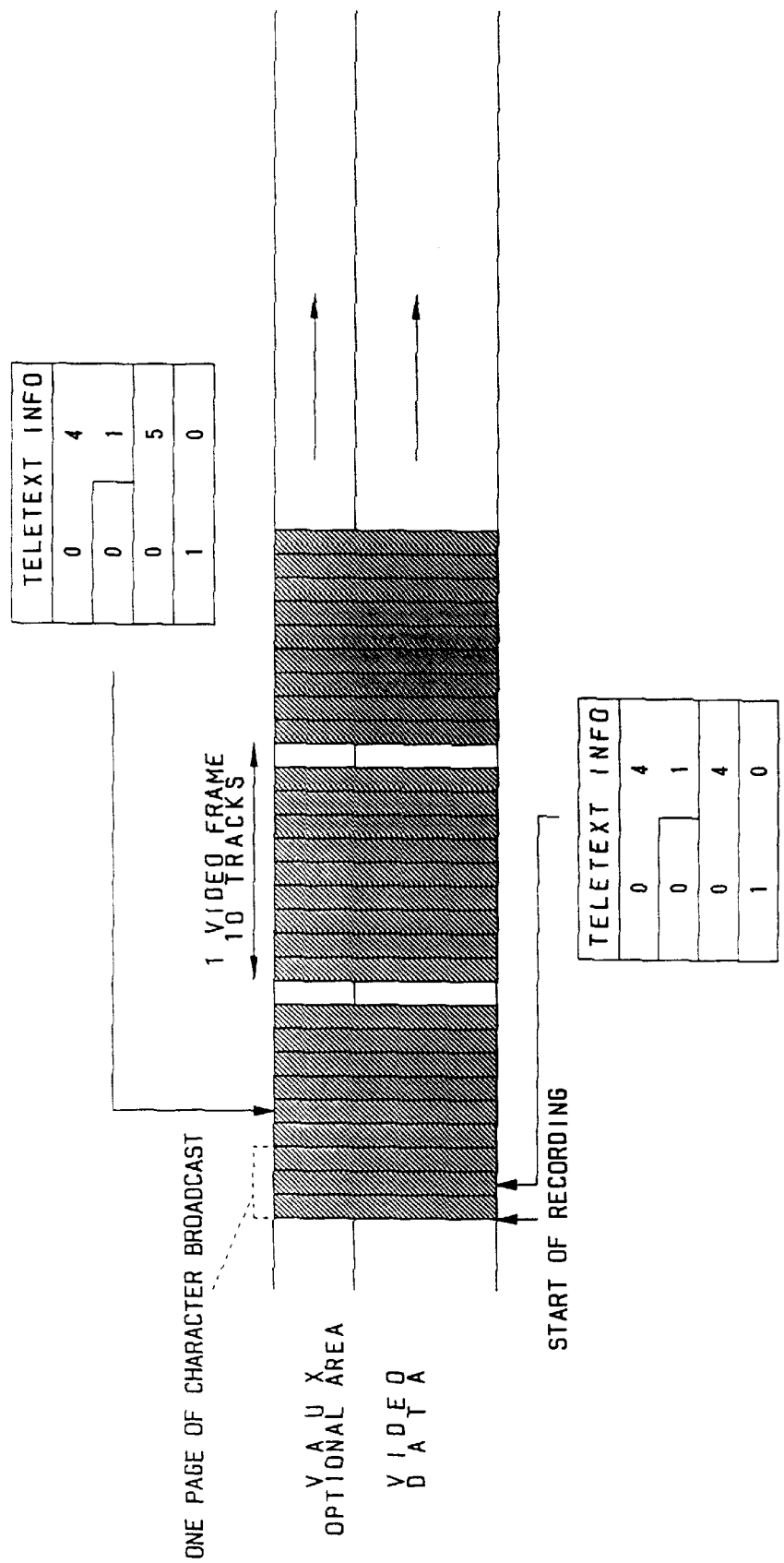
Figure 50:
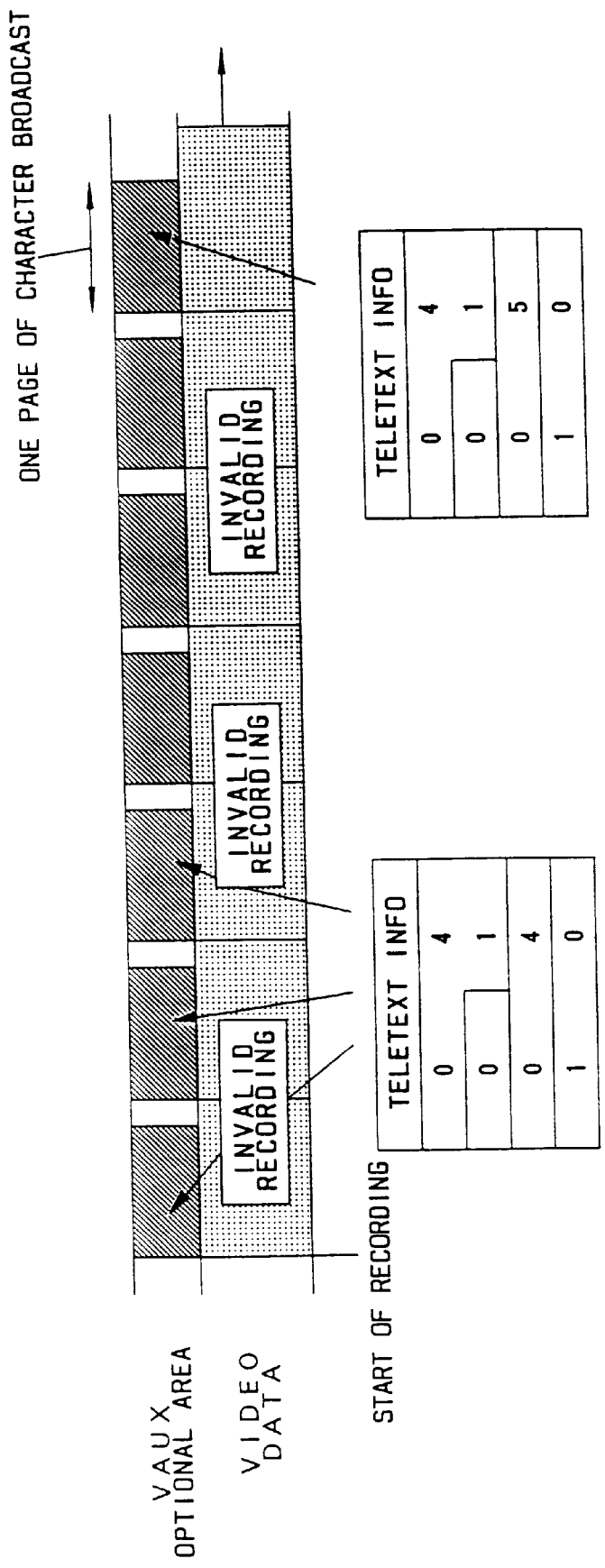

FIG. 46 is a diagram in case of recording the character broadcasting data by using not only the VAUX optional area but also the video data area. In FIG. 46, the character broadcasting data is densely recorded into the above two areas. In case of also recording the character broadcasting data into the video area as mentioned above, such a recording can be realized by setting the recording mode that is recorded into PC2 of the VAUX source control pack shown in FIG. 47 into "11". When the recording mode is set to "00", "original" is shown. When it is set to "01", "reserve" is shown. When it is set to "10", "insertion" is shown. As mentioned above, by also using the video data area for the recording of the character broadcasting data, the data storing efficiency can be remarkably raised. In case of recording the character broadcast by using the video data area as shown in FIGS. 50 and 51, which will be explained later, by setting the recording mode in the pack into "11", such a recording can be realized. In addition to the video data area, the audio data area can be also used in the recording of the character broadcasting data. The VAUX source pack will be explained in detail hereinlater. In such a recording, the H lines including the character broadcasting data of the character broadcasting program designated by the teletext information pack are fetched into the buffer memory. When the data of a predetermined amount (for example, maximum pages that can be written into one video data frame) is fetched, the mechanism system is driven. Due to this, the character broadcasting data is written onto the tape. When the memory capacity of the recording area in one video frame (ten tracks) doesn't coincide with the amount of character broadcasting data to be recorded, after the data of the maximum pages was recorded, the mechanism system is stopped. The mechanism system is held in a stop state until the next writing timing. By such a recording, even in case of the non-batch type program, since it is changed to the batch type program, the pages can be successively transmitted without a waiting time.

Figure 48:
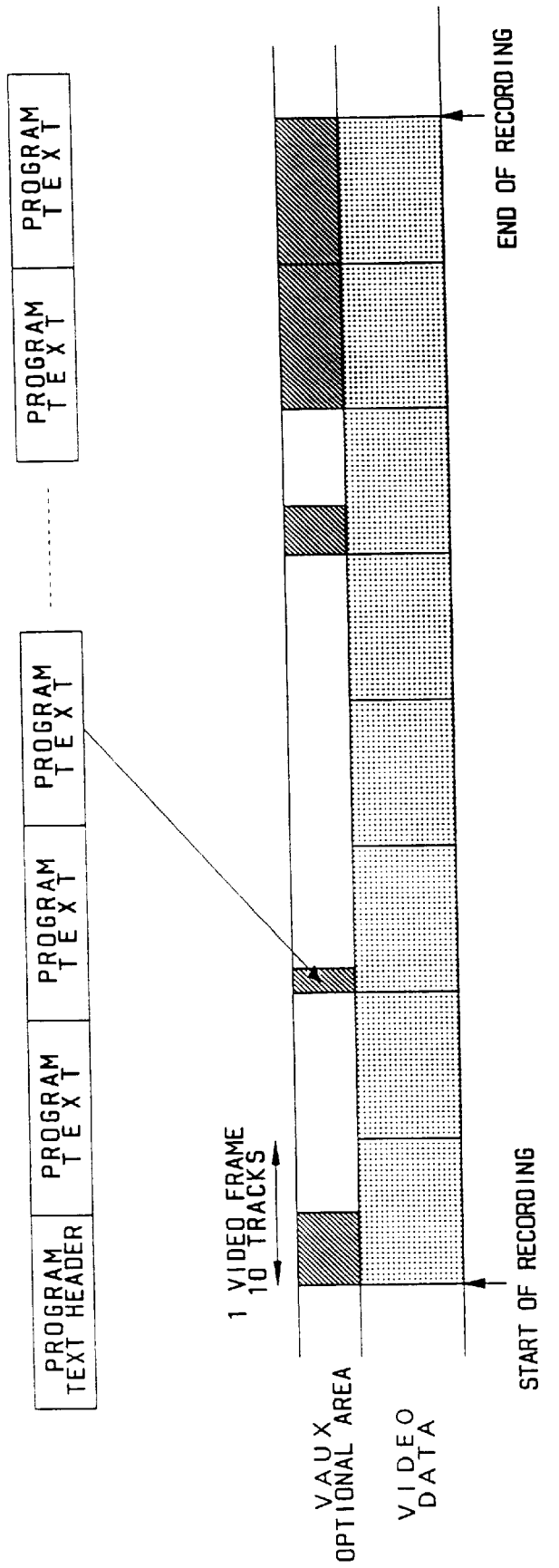

FIGS. 48 to 51 show recording areas on the tape in case of decoding and recording the data of the character broadcast. The data is recorded as a program as mentioned above. FIG. 48 is a diagram in case of selecting and recording only the data (for example, outline, summary, or subtitles) regarding the television program in the character broadcasting data. By setting the mode to automatically record the character broadcasting data at the time of the video recording, only the portions in which the subtitle program or complementary program appears are recorded. Since a data amount in case of decoding is larger than that in the case where the data is not decoded, the whole character broadcasting data cannot be recorded. Therefore, only the character broadcasting program regarding the television program is recorded. When considering the television of the wide type, it is considered that the subtitle or the like is transmitted in the character broadcast instead of the image. Therefore, it is desirable to always store the character broadcasting data.

Figure 49:
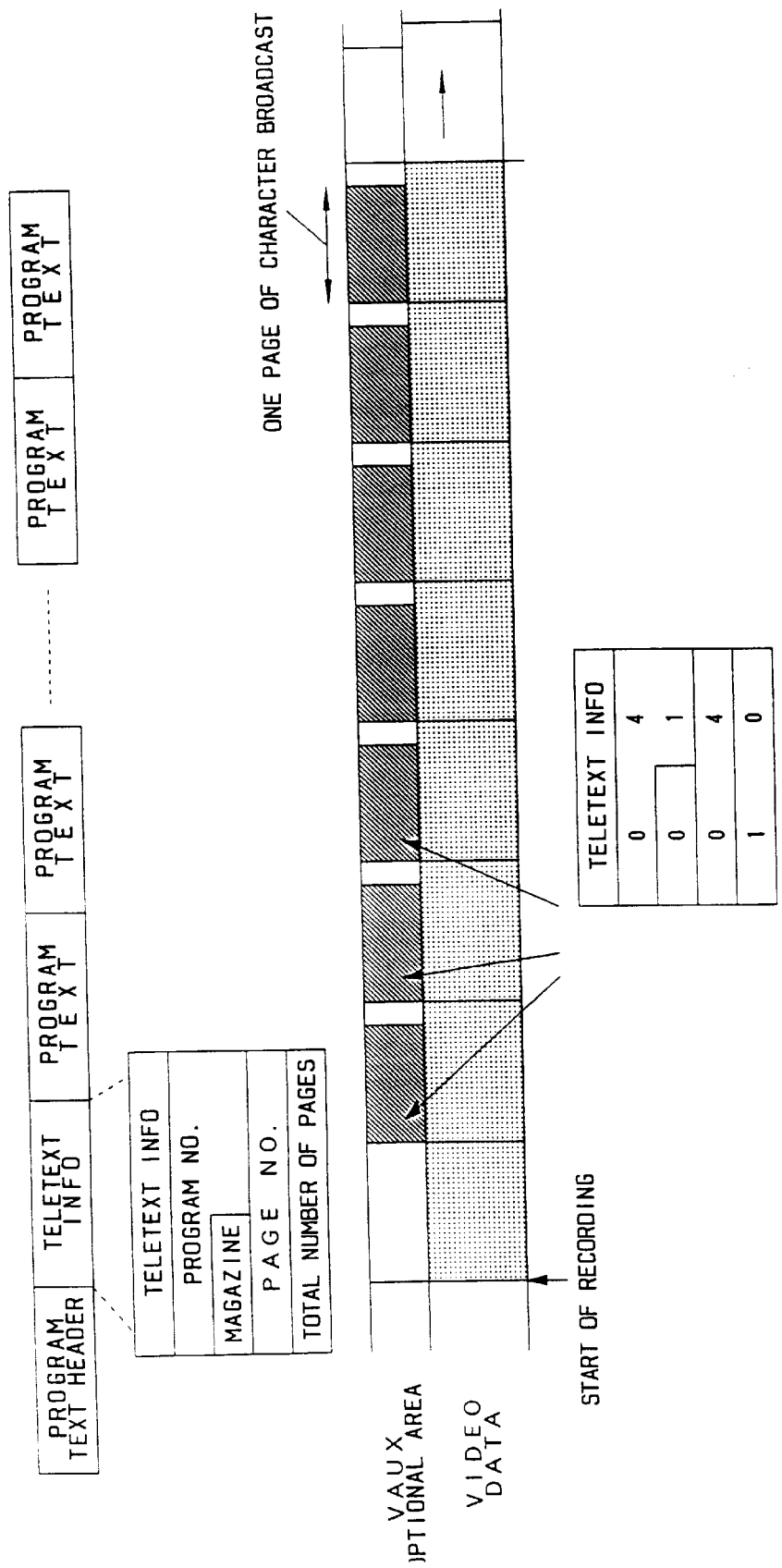

FIG. 49 is a diagram in the case where the character broadcasting data is selected and recorded and the teletext information pack are inserted and recorded. As will be also understood from FIG. 49, the teletext information pack is inserted between the program text header pack and the program text pack. Information which designates the program is recorded in the teletext information pack. In case of the full screen or the text type with control code, the data of one page of one character broadcasting program is collected and decoded and, after that, the decoded data is recorded. Consequently, the pages can be continuously recorded. In case of recording the subtitle in the recording of the essence, the recording is performed only once. Thus, for example, the video image is generated in a manner such that the motion of the human mouth coincides with the timing of the subtitle. The reason why the recording start position of the video data differs from the recording start position of the VAUX area is because, as mentioned above, it takes a time until the page of only the designated character broadcasting program is written into the buffer memory and the decoding of the page is finished.

FIG. 50 is a diagram in the case where only the designated character broadcasting program is selected and recorded into the VAUX optional area and no data is recorded in the video data area. FIG. 50 fundamentally has a recording format similar to that shown in FIG. 49. That is, it is sufficient to use substantially the same control or the like of the mechanism system as that of the conventional one. The data of the same page is repetitively recorded until the decoding of the next page is finished. In case of recording the subtitle, it is also recorded only once.

FIG. 51 fundamentally has a recording format similar to that shown in FIG. 50. In this case, however, data is recorded twice, for example, for the purpose of a countermeasure of the same character broadcasting data error. In this case, until the data of the next page is stored into the buffer memory and decoded, the mechanism is stopped in a manner similar to the case of FIG. 45. It will be also obviously understood that the recording using the video area and audio area can be performed in a manner similar to the case of FIG. 46. By densely recording the character broadcasting data, a data storing efficiency is remarkably improved.

A case of performing a recording reservation by using the MIC will now be described hereinbelow. In the MIC, the recording is fundamentally executed on an event unit basis. "event" denotes one data group of the MIC as mentioned above. For example, in case of a timer recording reservation event, a timer recording date/hour pack (recording reservation year/month/day) is set to an event header. The timer recording reservation event is fundamentally constructed by three packs of the timer recording date/hour pack, a timer recording S/S pack (recording reservation start and end times), and a VAUX source pack (TV channel). By adding a recording start position pack (recording start position), the timer recording is started from the track position. As mentioned above, the timer reservation recording event is constructed by a plurality of packs as shown in FIG. 55. There are three kinds of using methods of the timer recording S/S pack as shown in FIGS. 56A to 56C.

The packs which are used in the timer recording event will now be described in detail hereinbelow. FIG. 52 shows a pack called a "timer recording date/hour pack" of the MIC. Such a pack construction is used when the header is equal to "00000010". SL and the date are recorded into PC1. The SL indicates a mode. When SL=0, an LP mode is shown. When SL=1, an SP mode is shown. RP, TCF, and month are recorded into PC2. RP indicates a recording proof. That is, when RP=0, the overwriting recording is inhibited. On the other hand, when RP=1, the overwriting recording can be performed. TCF denotes a timer control flag. When TCF=00, the day of the week is set by an every week reservation. When TCF=01, the day of the week is set by only one reservation. When TCF=10, a reservation is made. When month=00, no month is designated. When month=01 to 12 (BCD code), January to December are shown, respectively. Year is recorded into PC3. When year=00 to 99, respective years are shown. When year=FF, no information is recorded. A text and a genre category are recorded into PC4. When text=0, there is text information. When text=1, there is no text information. The text flag is effective only for use in the MIC.

FIG. 53 shows a pack called a "timer recording S/S pack". Such a pack construction is set when the header is equal to "00000011". A minute unit of the recording start time is shown in PC1. An hour unit of the recording start time is shown in PC2. An end minute is shown in PC3. A recording method flag is shown in upper two bits of PC4 and the recording end time is shown by the remaining bits. When the value of the recording method flag is equal to 00, the ordinary video recording (there is no character broadcasting recording) is shown. When it is equal to 01, the video recording and character broadcasting recording are shown. When it is equal to 10, the recording of only the character broadcasting is shown. When it is equal to 11, no information is shown. Each data excluding the recording method flag is written by a BCD code.

FIG. 54 shows a pack called a source pack of the VAUX. Such a pack construction is set when the header is equal to "01100000". The digit of 10 of the television channel is recorded into upper four bits of PC1 and the digit of 1 of the TV channel is recorded into lower four bits. B/W, EN, CLF, and the digit of 100 of the TV channel are recorded into PC2. B/W indicates a black and white flag. When B/W=0, the black and white recording is shown. When B/W=1, the color recording is shown. In an industrial VCR, the B/W flag is always set to 1. EN denotes a color frame enable flag. When EN=0, a CLF which will be explained hereinlater is made effective. When EN=1, the CLF is made invalid. CLF denotes a color frame ID code. In the 525 lines/60 Hz system, when CLF=00, a color frame A is shown. When CLF=01, a color frame B is shown. In the other cases, a reservation is shown. In the 625 lines/50 Hz system, when CLF=00, the first and second frames are shown. When CLF=01, the third and fourth frames are shown. When CLF=10, the fifth and sixth frames are shown. When CLF=11, the seventh and eighth frames are shown. The S type defines the kind of video signal by a combination with the 50 Hz/60 Hz flag. For example, the S type defines the NTSC (525 lines/60 Hz), PAL (625 lines/50 Hz), HD (1125 lines/60 Hz), or HD (1250 lines/50 Hz). If an ID code indicating that the character broadcasting data has been recorded is defined in the S type, the character broadcasting data can be also recorded in the video data area.

There are two patterns in execution of the timer recording reservation one of them is a method whereby the recording is started at the start time by a timer clock built in the VCR and the recording is finished at the end time. The other is a method whereby the execution is stopped by using a control signal that is transmitted from the TV station.

The latter method has already put into practical use in, for example, Europe. Further, there are two methods in the latter method. One of them is a VPS (Video Program System) that is used in, for example, Germany. The other is a method using a packet 8/30 of the teletext that is used in England. According to the VPS, the start time of the program written in a TV column or the like of a newspaper is continuously transmitted during the broadcasting of the program as a program code of such a program in the 16 line in the V blanking period of the television broadcasting signal. In the VCR, the recording is executed for a period of time during which the signal exists and, when the signal disappears, the recording is stopped. In England or the like in which the 16 line has already been used for another object, similar processes are executed by using the packet 8/30 of the teletext.

The timer reservation (video recording and character broadcasting recording; or recording of only a character broadcast) including a character broadcast will now be described. In this case, the timer recording reservation event as shown in FIG. 55 is stored into the MIC. First, a case where the signal (VPS; packet 8/30) for timer recording is not broadcasted into the television signal will be described. In the case where a timer recording S/S pack shown in FIG. 56A has been stored in the timer recording reservation event, the recording is started at the start time by a clock timer built in the VCR and the recording is stopped at the end time. In the case where the timer recording S/S pack shown in FIG. 56B has been stored, the recording is started at the start time by the clock timer built in the VCR and the recording is performed up to the end of the cassette tape. When the timer recording S/S packs shown in FIGS. 56A and 56B are used, a timer recording date/hour pack as an event header pack and a VAUX source pack to designate the TV channel or the like are certainly necessary. When a timer recording S/S pack shown in FIG. 56C has been stored, the recording is started by the user and the recording is stopped at the end time by the clock timer built in the VCR. In this case, since the user has already designated the TV channel, the event is constructed by two packs of the timer recording date/hour pack and the timer recording S/S pack.

The case where the signal (VPS; packet 8/30) for the timer recording is broadcasted into the television signal will now be described hereinbelow. When the timer recording S/S pack shown in FIG. 56A has been stored in the timer recording reservation event, the recording is started at the start time by the clock timer built in the VCR and the recording is stopped at the end time. When the timer recording S/S pack shown in FIG. 56B has been stored, the program code (at the time of the recording start in the pack)

in the V blanking of the television signal is searched. The VCR continues the recording for a period of time during which the signal exists and stops the recording when the signal disappears. When the timer recording S/S pack shown in FIG. 56C has been stored, the recording is started by the user and the recording is stopped at the end time by the clock timer built in the VCR.

The recording method flag that is written in PC4 of the timer recording S/S pack will now be described with reference to FIGS. 57A to 57C. In case of recording the character broadcast, the value of the recording method flag is set to 01 or 10. As mentioned above, in the case where the recording method flag is set to "00", the ordinary video recording is executed and, when it is set to "11", no information is recorded.

In case of FIGS. 57A to 57C, since the recording method flag has been set to "01", the teletext information pack is recorded subsequently to the three packs regarding the conventional timer recording reservation. In the teletext information pack shown in FIG. 57A, only the program number is designated and only the designated character broadcasting program is recorded. In FIG. 57B, the program number and the data up to the page number therein have been designated. Only the designated page of the designated character broadcasting program are recorded. In FIG. 57C, since a plurality of character broadcasting programs have been reserved, a plurality of (two) teletext information packs have been recorded and two character broadcasting programs are recorded. By setting the recording method flags in FIGS. 57A, 57B, and 57C into "01", only the character broadcasting recording reservation can be made.

Figure 58A:
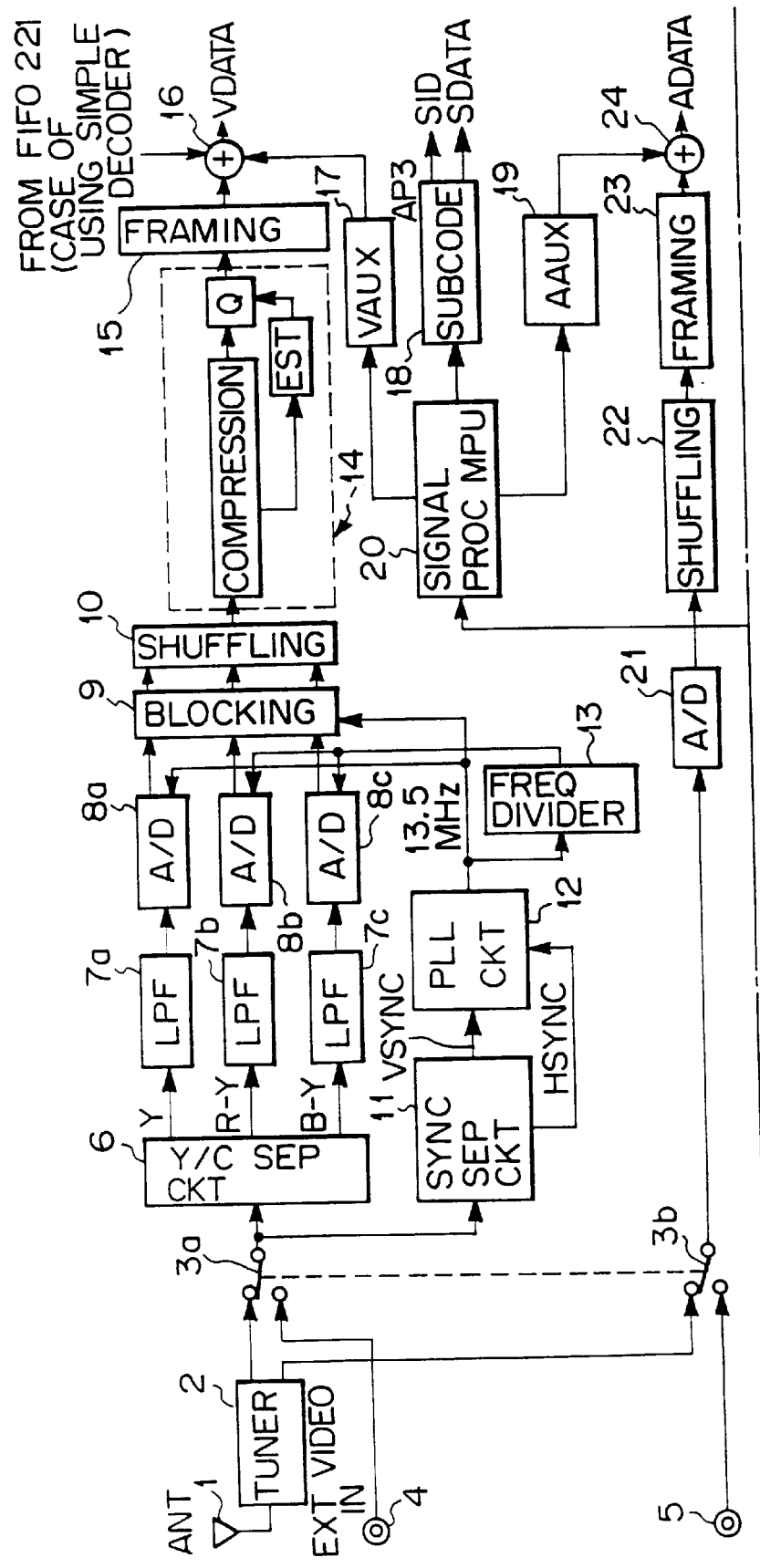
Figure 58B:
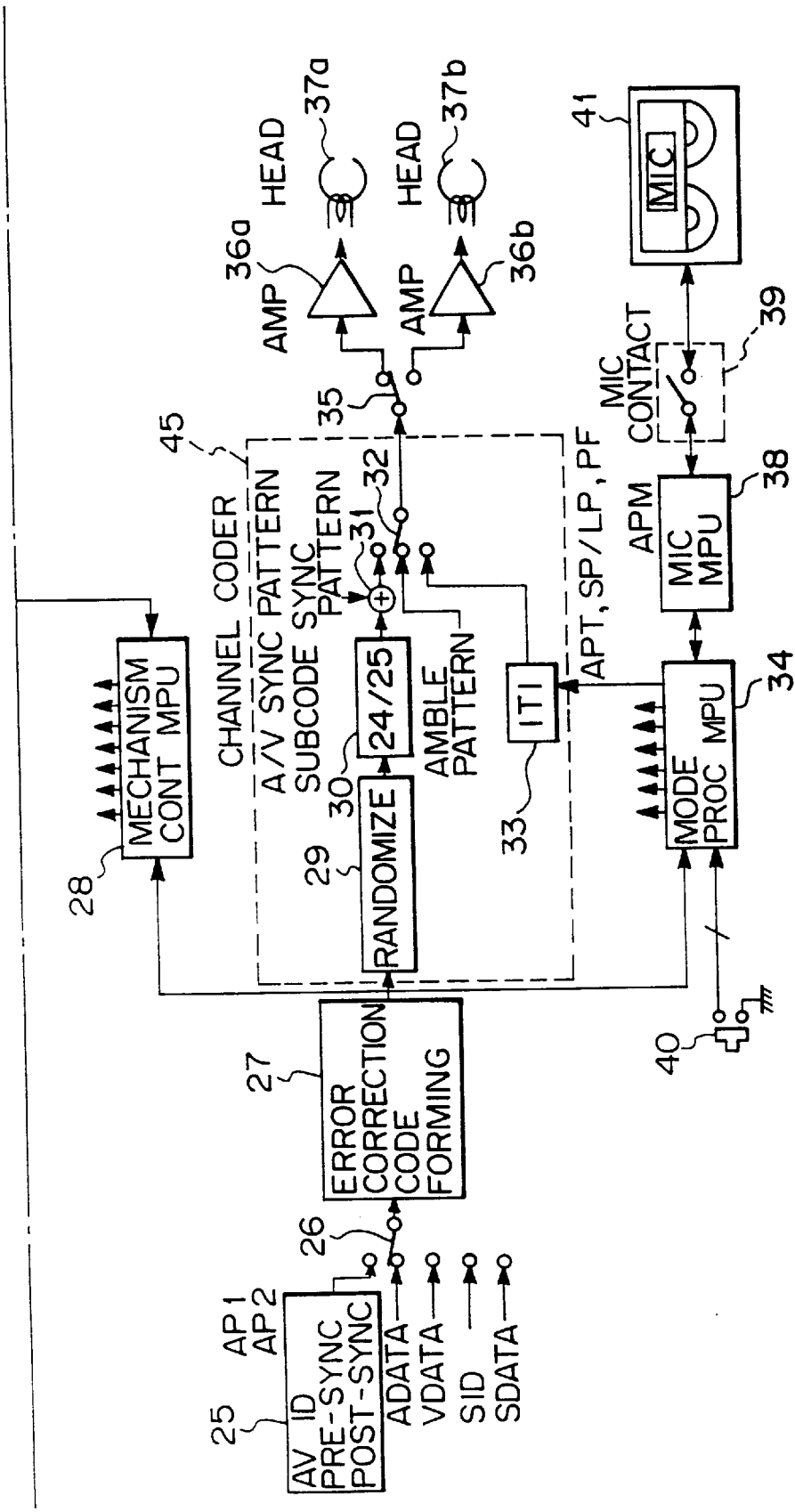

FIG. 58A and 58B show a construction of the recording system of the digital VCR to which the invention is applied. In the digital VCR, a composite color video signal is separated into a digital luminance signal (Y) and color difference signals (R-Y, B-Y). Those signals are compressed by a high efficient coding system using a DCT transformation and a variable length code and are recorded. For example, the character multiplex broadcast can be recorded by using the VAUX.

In FIGS. 58A and 58B, a television radio wave signal is received by an antenna 1. The signal received by the antenna 1 is supplied to a tuner 2. A composite color video signal and an audio signal of the NTSC system, PAL system, or the like are demodulated from the television signal by the tuner 2. The composite video signal from the tuner 2 is supplied to a switch 3a. The audio signal is supplied to a switch 3b.

An analog composite video color video signal is supplied to an external video input terminal 4. The composite video signal from the external video input terminal 4 is supplied to the switch 3a. The analog audio signal is supplied to an external audio input terminal 5. The analog audio signal is supplied to the switch 3b.

One of the composite video signal from the tuner 2 and the composite video signal from the external video input terminal 4 is selected by the switch 3a. An output of the switch 3a is supplied to a Y/C separating circuit 6 and is also supplied to a sync separating circuit 11. The luminance signal (Y) and color difference signals (R-Y, B-Y) are separated from the composite video signal by the Y/C separating circuit 6.

The luminance signal (Y) and color difference signals (R-Y, B-Y) from the Y/C separating circuit 6 are supplied to A/D converters 8a, 8b, and 8c through low pass filters 7a, 7b, and 7c, respectively. The low pass filters 7a, 7b, and 7c band limit the input signals in order to eliminate an aliasing distortion. Cut-off frequencies of the low pass filters 7a, 7b, and 7c are set to, for example, 5.75 MHZ for the luminance signal (Y; sampling frequency is equal to 13.5 MHz (rate of 4)) and to 2.75 MHz for the color difference signals (R-Y, B-Y) in case of a sampling frequency 6.75 MHz (rate of 2) and to 1.45 MHz in case of a sampling frequency of 3.375 MHz (rate of 1).

A vertical sync signal (V sync) and a horizontal sync signal (H sync) are extracted by the sync separating circuit 11. The vertical sync signal (V sync) and horizontal sync signal (H sync) from the sync separating circuit 11 are supplied to a PLL (Phase Locked Loop) circuit 12. A clock of a basic sampling frequency 13.5 MHZ locked with the input video signal is formed by the PLL circuit 12. The sampling frequency of 13.5 MHz is called a rate of 4 as mentioned above. The clock of the basic sampling frequency 13.5 MHz is supplied to the A/D converter 8a. The clock of the basic sampling frequency 13.5 MHz is supplied to a frequency divider 13. A clock of a frequency that is ¼ of the basic sampling frequency is formed by the frequency divider 13. The clock (rate of 1) of the frequency of ¼ of the basic sampling frequency is supplied to the A/D converters 8b and 8c.

The digital component video signals Y, R-Y, and B-Y from the A/D converters 8a, 8b, and 8c are supplied to a block forming circuit 9. Data on a real screen is processed by the block forming circuit 9 so as to obtain blocks of 8 samples×8 lines. An output of the block forming circuit 9 is supplied to a shuffling circuit 10 and is shuffled. The shuffling is executed in order to avoid that the data recorded on a tape is concentratedly lost due to a clog of the head, a traverse scratch of the tape, or the like. At the same time, in the shuffling circuit 10, the luminance signal and the color difference signals are rearranged so that they can be easily processed at the post stage.

An output of the shuffling circuit 10 is supplied to a data compression coding circuit 14. The data compression coding section 14 comprises a compressing circuit using a DCT system and a variable length coding, an estimator for estimating whether the result could be compressed to a predetermined data amount or not, and a quantizer for finally quantizing on the basis of the result of the discrimination. The video data compressed as mentioned above is condensed into a predetermined sync block by a framing circuit 15 in accordance with a predetermined rule. An output of the framing circuit 15 is supplied to a synthesizing circuit 16.

On the other hand, one of the audio signal from the tuner 2 and the audio signal from the external audio signal input terminal 5 is selected by the switch 3b. An output of the switch 3b is supplied to an A/D converter 21. The analog audio signal is digitized by the A/D converter 21. The digital audio signal obtained as mentioned above is supplied to a shuffling circuit 22. The digital audio data is shuffled by the shuffling circuit 22. An output of the shuffling circuit 22 is supplied to a framing circuit 23. The audio data is condensed into the audio sync block by the framing circuit 23. An output of the framing circuit 23 is supplied to a synthesizing circuit 24.

A mode processing microcomputer 34 is a microcomputer for performing a man-machine interface and operates synchronously with a field frequency 60 Hz or 50 Hz of a television image. Since a signal processing microcomputer 20 is operated on the side nearer to the machine, it operates synchronously with, for example, a rotational speed 9000 r.p.m. and 150 Hz of a drum.

The mode processing microcomputer 34 produces each pack data of the video auxiliary data VAUX, audio auxiliary data AAUX, and subcode. The absolute track number included in a "title end" pack or the like is produced by the signal processing microcomputer 20. A TTC (time title code) that is stored into the subcode is also produced by the signal processing microcomputer 20.

In the digital VCR to which the invention is applied, further, data of a character multiplex broadcast can be recorded into the VAUX. A process in this instance is also executed in the mode processing microcomputer 34. In this case, as shown in FIG. 31, a header pack is added to the head upon recording and, after that, the character multiplex broadcasting data which is not decoded or which was decoded is arranged in a pack structure. In case of recording without decoding, a terminate code is added to the last. FFh indicative of no information is stored into the remaining pack data areas and is sent to the framing circuit 15.

The video auxiliary data VAUX produced by the signal processing microcomputer 20 is supplied to the synthesizing circuit 16 through a VAUX circuit 17. The video auxiliary data VAUX is synthesized to the output of the framing circuit 15 by the synthesizing circuit 16. The audio auxiliary data AAUX generated by the signal processing microcomputer 20 is supplied to the synthesizing circuit 24 through an AAUX circuit 19. The audio auxiliary data AAUX is synthesized to an output of the framing circuit 23 by the synthesizing circuit 24. Outputs of the synthesizing circuits 16 and 24 are supplied to a switch 26. Data SID and AP3 of an ID section and subcode pack data SDATA are produced by a subcode circuit 18 on the basis of an output of the signal processing microcomputer 20 and are supplied to the switch 26. Each ID section of AV (audio/video) and a presync and a postsync are respectively formed by a sync generating circuit 25 and are supplied to the switch 26. AP1 and AP2 are produced by the circuit 25 and are inserted into a predetermined ID section. An output of the circuit 25 or the ADATA, VDATA, SID, and SDATA are switched by the switch 26 at a predetermined timing.

An output of the switch circuit 26 is supplied to an error correction code forming circuit 27. A predetermined parity is added by the error correction code forming circuit 27. An output of the error correction code forming circuit 27 is supplied to a random number forming circuit 29. The random number forming circuit 29 forms random numbers so as not to deviate recording data. An output of the random number forming circuit 29 is supplied to a 24/25 converting circuit 30 and the data of 24 bits is converted into 25 bits. Due to this, a DC component which causes a problem at the time of the magnetic recording or reproduction is eliminated. Further, although not shown, a coding process (1/1-$D^2$) of PRIV (partial response; class 4) adapted to the digital recording is also executed.

An output of the 24/25 converting circuit 30 is supplied to a synthesizing circuit 31. Sync patterns of audio/video and subcode are synthesized to the output of the 24/25 converting circuit 30 by the synthesizing circuit 31. An output of the synthesizing circuit 31 is supplied to a switch 32.

Each data of APT, SP/LP, and PF is output from the mode processing microcomputer 34 to execute a mode management of the whole VCR and is supplied to an ITI circuit 33. Data of the ITI sector is generated from the ITI circuit 33. The switch 32 switches those data and an amble pattern at a proper timing.

The data switched by the switch 32 is further switched by a switch 35 in accordance with a head switching timing. An output of the switch 35 is amplified by head amplifiers 36*a* and 36*b* and supplied to heads 37*a* and 37*b*.

A switch 40 is an external switch of the VCR main body and is a switch group for instructing the recording, reproduction, and the like. Among them, there is a switch to set the recording mode of SP/LP and the result of the switching is instructed to a mechanism control microcomputer 28 and the signal processing microcomputer 20. An MIC microcomputer 38 is connected to the mode processing microcomputer 34. The APM and the pack data in the MIC are produced by the MIC microcomputer 38. The data is supplied to a cassette 41 with the MIC through an MIC contact 39.

As mentioned above, in the digital VCR to which the present invention is applied, the digital luminance signal (Y) and color difference signals (R-Y, B-Y) are compressed and recorded into the video sector and the digital audio signal is recorded into the audio sector. The VAUX and AAUX can be recorded. The data of the character multiplex broadcast can be recorded into the optional areas of the VAUX and AAUX. The VAUX data and AAUX data are recorded by a pack structure.

In the recording and reproduction of the character broadcasting signal, there are a method of directly recording and reproducing the signal as original data without decoding and a method of decoding the signal and recording and reproducing as character data. In case of decoding and recording, a complete type decoder which can completely decode the character multiplex broadcasting signal is necessary. In case of recording without decoding, a simple type decoder can be used.

Figure 59A:
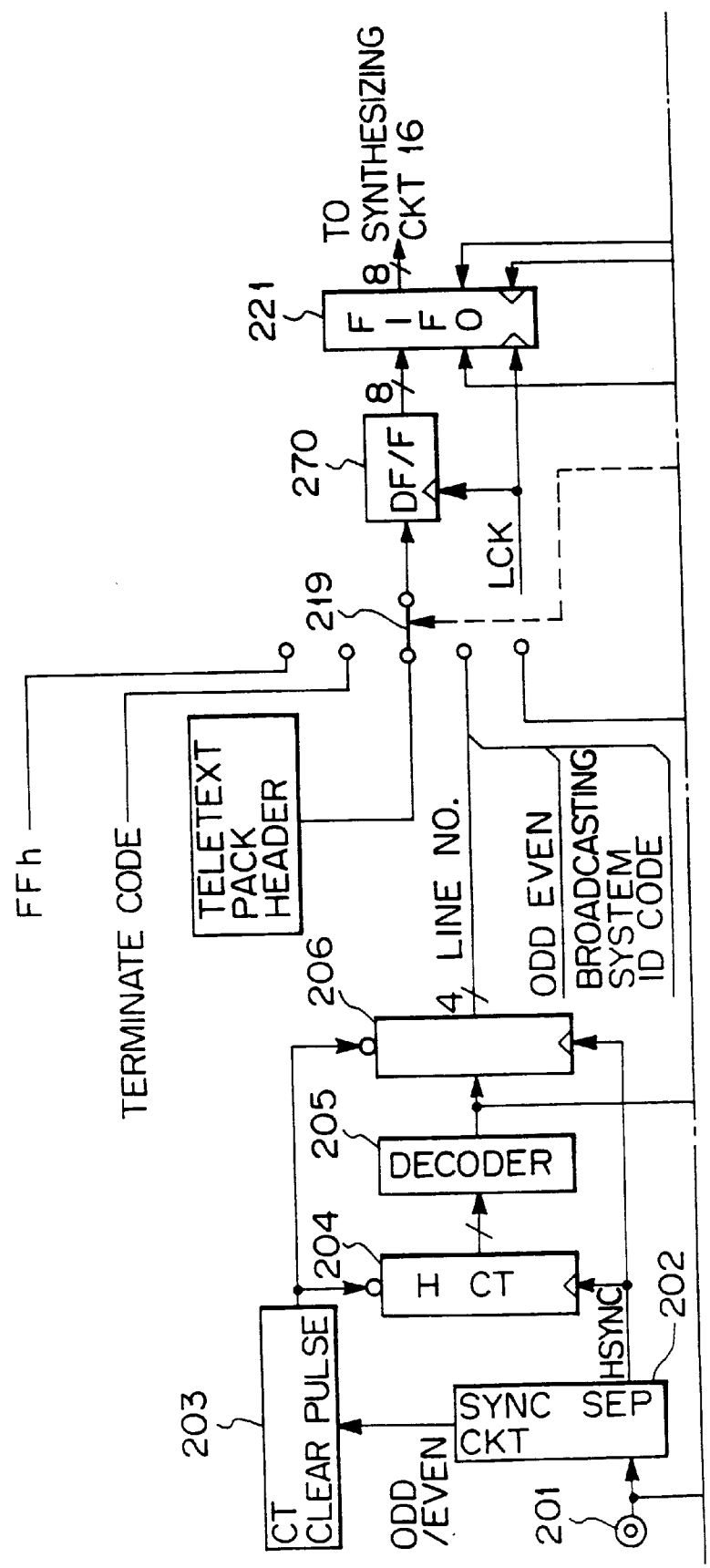
Figure 59B:
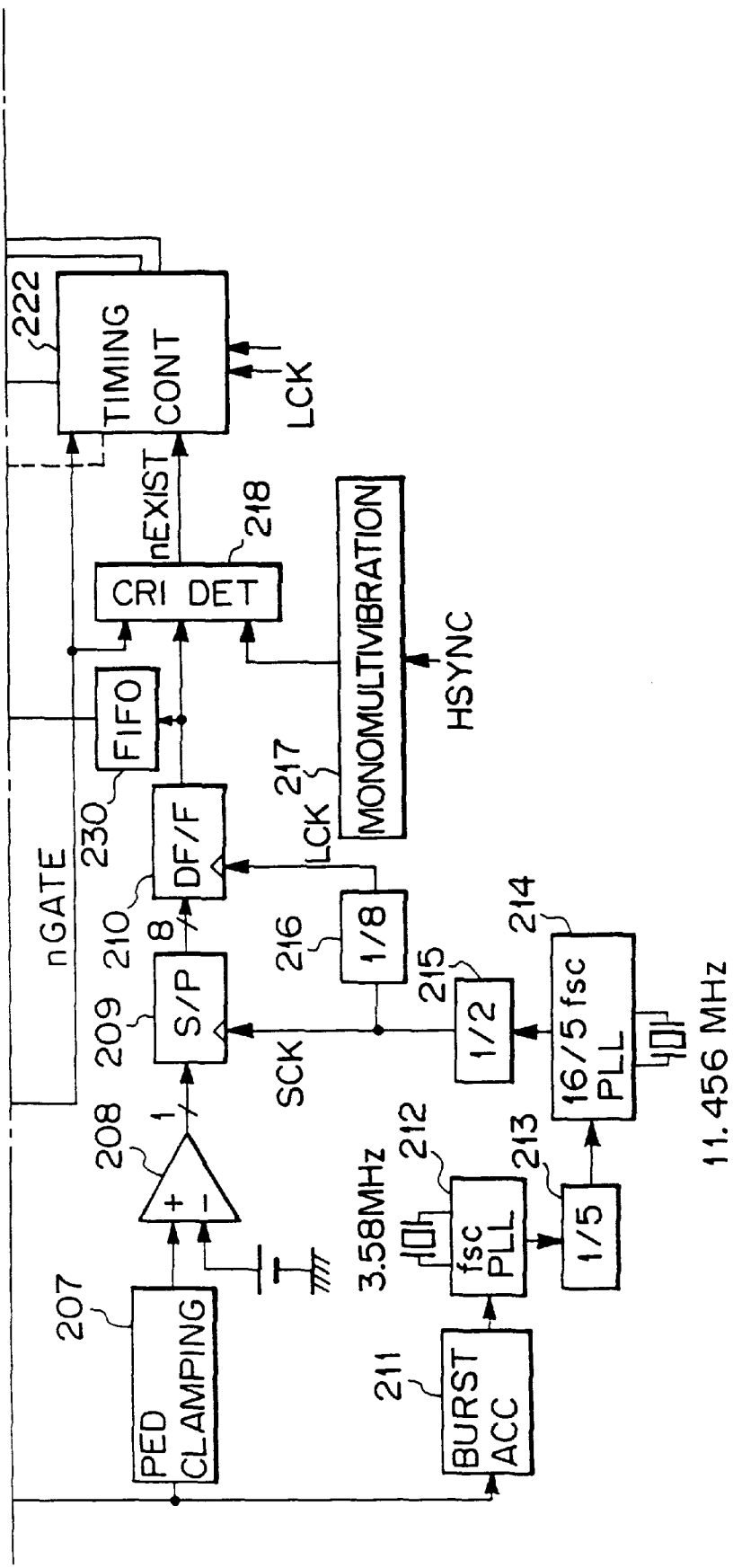

According to the simple type decoder, the presence or absence of the character multiplex broadcast is detected and, when there is the character multiplex broadcast, a VAUX text header pack is added to the head, the data is written by a pack structure after that, and a terminate code is added to the last, and after that, FFh indicative of no information is written into the remaining pack data areas, and the resultant information is transmitted (refer to FIG. 32). FIGS. 59A and 59B show an example of the circuit. Explanation will now be limited to the Japanese character multiplex broadcast here. The other systems are substantially similar to that mentioned above except the frequencies. In FIGS. 59A and 59B, a composite color video signal is supplied to an input terminal 201. The input composite color video signal is supplied to a sync separating circuit 202 and is also supplied to a pedestal clamping circuit 207 and a burst ACC circuit 211.

A field discrimination signal of odd number/even number and a horizontal sync signal H sync are formed by a sync separating circuit 202. An odd number/even number signal is supplied to a counter clear pulse forming circuit 203. A leading edge and a trailing edge of the odd number/even number signal are extracted by the counter clear pulse forming circuit 203. An H counter 204 and a line number forming circuit 206 are cleared by such a clear pulse.

The H counter 204 counts the number of horizontal sync signals H syncs from a change point of the odd number/even number signal. A count output is supplied to a decoder 205. The output of the H counter 204 is decoded by the decoder 205 and an nGATE signal is formed. The nGATE signal is a signal that is set to the L level for a storage H line period of time decided by the character multiplex broadcast. The line number forming circuit 206 is activated for a period of time of nGATE=L. Due to this, the line number is formed. The line number is supplied to a switch 219.

On the other hand, the input composite color video signal is supplied to the pedestal clamping circuit 207, by which a DC component of the pedestal level is stabilized. After that, the resultant signal is supplied to a comparator 208. A comparison voltage of the comparator 208 is set to, for example, 0.5 V and an intermediate level between 70% of the white level and the pedestal level is given. An output of the comparator 208 is what is called a digital signal of the TTL level. The output of the comparator 208 is supplied to an S/P converting circuit 209. The S/P converting circuit 209 converts a serial communication into a parallel signal. Serial data is converted into a byte-unit data by the S/P converting circuit 209.

A serial clock SCK is formed in the following manner. First, the input composite color video signal is supplied to the burst ACC circuit 211 in order to stabilize an amplitude of a color burst signal of the input composite color video signal. An output of the ACC circuit 211 is supplied to a PLL circuit 212. A reference clock of a subcarrier signal frequency fsc, for example, 3.58 MHz in case of the NTSC system is formed by the PLL circuit 212. The output signal of 3.58 MHz is frequency divided into 1/5 by a frequency divider 213. An output of the frequency divider 213 is set to a reference signal of a (16/5 fsc) PLL circuit 214. The clock signal stabilized by such double PLL circuits is further frequency divided into the signal of a duty ratio 50% by a frequency divider 215. Such a signal is set to a basic clock SCK of the Japanese character multiplex broadcast of 5.727272 MHz. This signal is further frequency divided into 1/8 by a frequency divider 216. The 1/8 frequency divided signal is used for the byte data.

The byte signal obtained by the S/P converting circuit 209 is latched into a D F/F (D-type flip-flop) 210. An output of the D F/F 210 is supplied to a CRI (clock run-in) detecting circuit 218. An output of a monomultivibrator 217 obtained by triggering the H sync and the nGATE signal are also supplied to the CRI detecting circuit 218. A period of time of 16 or less CPI pulses which has been predetermined by the specification is extracted from the H sync signal by the monomultivibrator 217 (refer to FIG. 1). When nGATE=L at such a timing, so long as an output of the D F/F 210 is equal to 00 h, this means that there is no CRI. Therefore, it can be judged that there is no character multiplex broadcasting data. For example, when AAh (10101010), this means that the character multiplex broadcasting data exists, so that nEXIST=L. The result and the nGATE, LCK, and the like are supplied to a timing controller 222 at the next stage.

The timing controller 222 is connected to the mode processing microcomputer 34 (FIGS. 58A and 58B). The detection result of the timing controller 222 is sent to the mode processing microcomputer 34. The data during the judgment is accumulated into an FIFO 230.

When recording character data, the line number, odd number/even number, and a broadcasting system ID code (which is prepared by the VCR set itself) that differs in dependence on the shipping district are input to the switch 219. Further, a pack header (01100111) of the teletext pack, a terminate code, and FFh to fill the invalid data are input to the switch 219. Data from the FIFO 230 is given to one input of the switch 219. On the basis of those data, the timing controller 222 switches the switch 219, for example, from the T1 pack to the T71 pack in FIG. 32. An output of the switch 219 is supplied to a D F/F 220, by which the time is adjusted. After that, it is written into an FIFO 221 by the timing controller.

A T0 pack (VAUX text header pack) in FIG. 32 and a teletext information pack in FIG. 40B are formed by the mode processing microcomputer 34 in FIGS. 58A and 58B separately from FIGS. 59A and 59B and are given to the VAUX circuit 17 (FIG. 58). By the link work with the timing controller 222, those packs and the T1 to T71 packs in the FIFO 221 are synthesized by the synthesizing circuit 16 in FIGS. 58A and 58B. As shown in FIG. 33, in case of writing a number of times, it is sufficient to merely repeat the above works. The sync separating circuit 202 in FIGS. 59A and 59B can be shared with the sync separating circuit 11 in FIGS. 58A and 58B. In case of the full decoder, in place of FIGS. 59A and 59B, an LSI for a character multiplex broadcast which has already been commercially available is directly used and the decoded character data is input to the mode processing microcomputer 34. The construction is exchanged as shown in FIGS. 41A and 41B and the data is given to the VAUX circuit 17 in FIGS. 58A and 58B. The data is recorded into the VAUX optional area in FIG. 25.

Figure 60B:
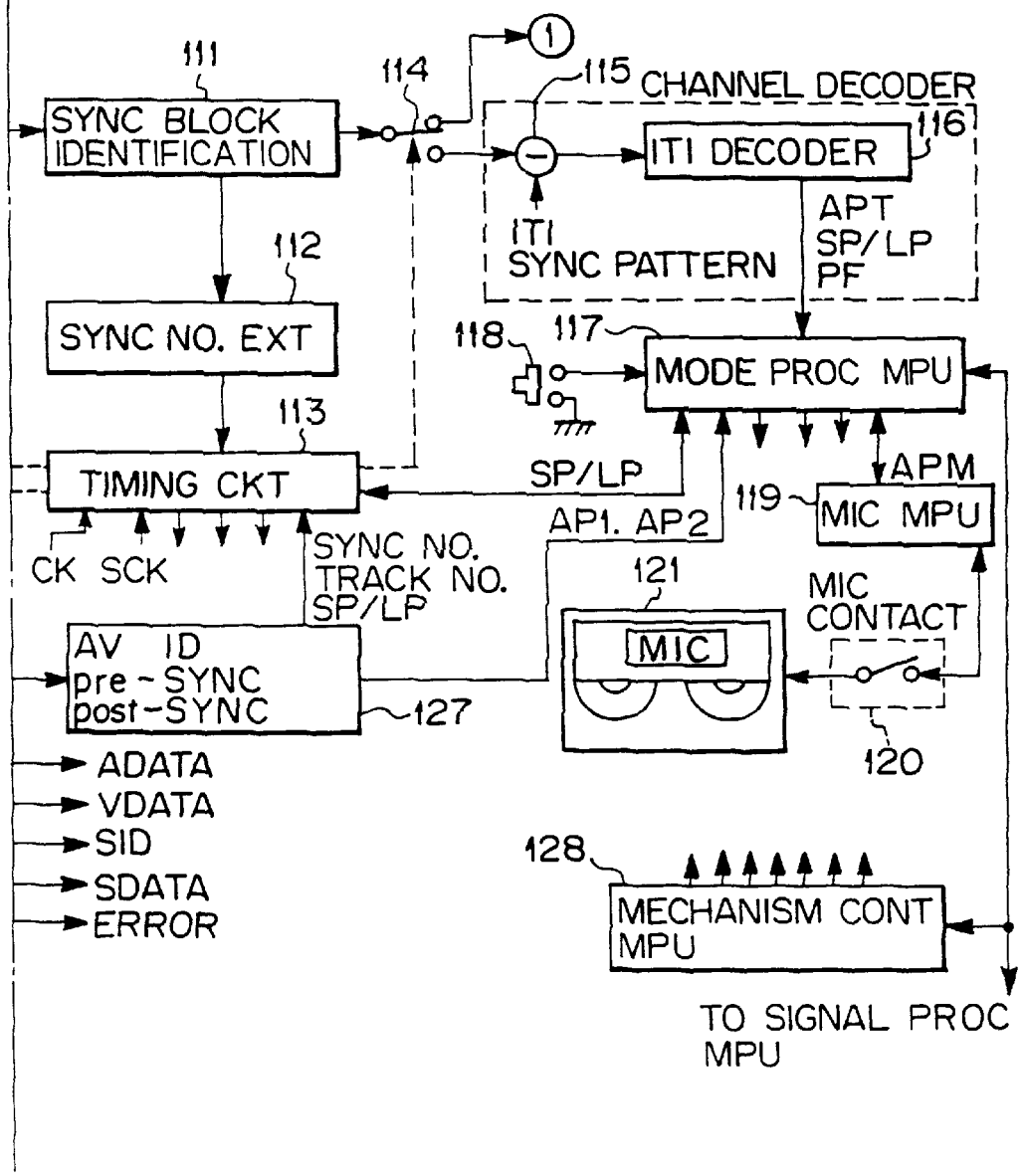

A construction on the reproduction side of the digital VCR to which the invention is applied will now be described with reference to FIGS. 60A, 60B, 61A and 61B. In FIGS. 60A and 60B, signals derived from heads 101a and 101b are amplified by head amplifiers 102a and 102b and are switched by a switch 103. An output of the switch 103 is supplied to an equalizing circuit 104. The equalizing circuit 104 executes a process opposite to what is called an emphasis process (for example, partial response; class 4) executed upon recording in order to improve the electromagnetic converting characteristics between the tape and the magnetic tape.

An output of the equalizing circuit 104 is supplied to an A/D converter 106 and to a clock extracting circuit 105. A clock component is extracted by the clock extracting circuit 105. The output of the equalizing circuit 104 is digitized by using the A/D converter 106 by the extracted clock. The 1-bit data obtained as mentioned above is written into an FIFO 107.

An output of the FIFO 107 is supplied to a sync pattern detecting circuit 108. The sync pattern of each area is supplied to the sync pattern detecting circuit 108 through a switch 109. The switch 109 is switched by a timing circuit 113. The sync pattern detecting circuit 108 has what is called a flywheel construction. When the sync pattern is once detected, the sync pattern detecting circuit 108 discriminates whether the same sync pattern again comes after a predetermined sync block length since then or not. By constructing in a manner such that, when the above sync pattern is detected to be correct, for example, three or more times, it is regarded as true, an erroneous detection is prevented.

When the sync pattern is detected as mentioned above, by extracting which portion from an output at each stage of the FIFO 107, one sync block can be fetched or a shift amount is determined. Therefore, on the basis of it, the necessary bits are fetched into a sync block identification latch 111 by a switch 110. Due to this, the fetched sync number is taken out by an extracting circuit 112 and input to the timing circuit 113. Since the position on the track at which the head is located can be known from the read sync number, the switch 109 and a switch 114 are switched on the basis of the head position. The switch 114 has been switched to the lower side at the time of the ITI sector. The ITI sync pattern is separated by a separating circuit 115 and supplied to an ITI decoder 116. Since the area of the ITI has already been coded and recorded, by decoding it, each data of APT, SP/LP, and PF can be taken out. Those data is given to a mode processing microcomputer 117 which is connected to an operation key 118 on the outside of the set and which decides the operating mode or the like of the whole set.

An MIC microcomputer 119 to manage the APM or the like is connected to the mode processing microcomputer 117. Information from a cassette 121 with an MIC is given to the microcomputer 119 with the MIC through an MIC contact 120 and processes of the MIC are executed while dividing the roles with the mode processing microcomputer 117. There is also a case where the MIC microcomputer is omitted and the MIC process is executed by the mode processing microcomputer 117 in accordance with the set. The mode processing microcomputer 117 performs the system control of the whole set by linking with a mechanism control microcomputer 128 and a signal processing microcomputer 151.

The switch 114 has been switched to the upper side in case of the A/V sector or subcode sector. After the sync pattern of each sector was extracted by a separating circuit 122, it is transmitted through a 24/25 inverse converting circuit 123 and is further supplied to an inverse random number forming circuit 124 and is returned to the original data train. The data fetched as mentioned above is supplied to an error correcting circuit 125.

Error data is detected and corrected by the error correcting circuit 125. An error flag is added to the uncorrectable data and such data is output after that. Each data is switched by a switch 126.

A circuit 127 is in charge of the ID section of the A/V sector and each sync of Pre and Post. The sync number, track number, and each signal of SP/LP stored in each sync of Pre and Post are extracted. They are given to the timing circuit 113, thereby producing various timings.

Further, AP1 and AP2 are extracted by the circuit 127 and are given to the mode processing microcomputer and a format is checked. When AP1 and AP2=000, the area 2 is respectively defined as an image data area and the operation is performed in the ordinary manner. In the other cases, however, a warning operation such as an alarming process or the like is performed.

With respect to SP/LP, it is compared with that derived from the ITI by the mode processing microcomputer 117. The SP/LP information has been written three times in the TIA area in the ITI area, so that the reliability is raised by a majority decision process or the like due to only such a multiwriting process. As presyncs, there are two syncs for each of the audio and video and the SP/LP information is written at total four locations. The majority decision is also performed there and the reliability is raised. When both of them finally don't coincide, the information in the ITI area is preferentially used.

Figure 61B:
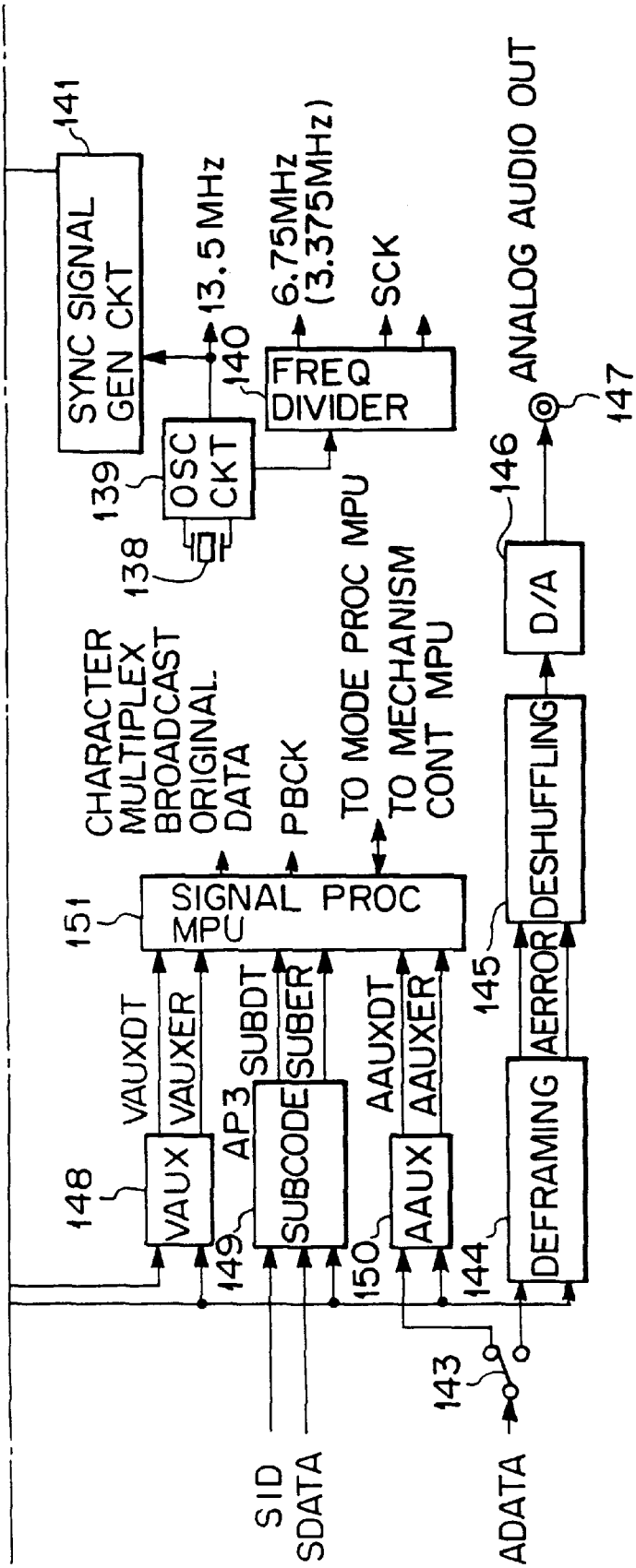

The reproduction data from the video sector is divided into the video data and the VAUX data by a switch 129 in FIGS. 61A and 61B. The video data is supplied to a deframing circuit 130 together with an error flag. The deframing circuit 130 performs an inverse conversion of the framing.

The image data is supplied to a data inverse compression coding section. That is, the image data is transmitted through an inverse quantizing circuit 131 and an inverse compressing circuit 132 and is returned to the data before compression. Subsequently, the data is returned to the data of the original image space arrangement by a deshuffling circuit 133 and a block combining circuit 134.

After the deshuffling, the processes are executed separately with respect to three systems of the luminance signal (Y) and the color difference signals (R-Y, B-Y). Those signals are returned to the analog signals by D/A converters 135a, 135b, and 135c. In this instance, the outputs which were frequency divided by an oscillating circuit 139 and a frequency divider 140 are used. Namely, 13.5 MHz is used for the luminance signal (Y). 6.75 MHz and 3.375 MHz are used for the color difference signals, respectively.

The signals obtained as mentioned above are synthesized by a Y/C synthesizing circuit 136 and is further synthesized to a sync signal output of a sync signal generating circuit 141 by a synthesizing circuit 137. The resultant signal is output as a composite video signal from an output terminal 142.

The reproduction data from the audio sector is divided into the audio data and the AAUX data by a switch 143. The audio data is returned to the data on the original time base by a next deshuffling circuit 145. In this instance, an interpolating process of audio data is executed on the basis of the error flag as necessary. The processed signal is supplied to a D/A converter 146 and is returned to the analog audio signal. The analog audio signal is output from an output terminal 147 while taking a timing such as a lip sync or the like with the image data.

The VAUX data and AAUX data divided by the switches 129 and 143 are respectively supplied to a VAUX circuit 148 and an AAUX circuit 150 and are subjected to a preparation such as a majority decision process or the like at the time of the multiwriting as shown in FIG. 33 with reference to the error flag. The ID section and data section of the subcode sector are supplied to a subcode circuit 149. The preparation such as a majority decision process or the like is also executed here with reference to the error flag. After that, the processes data is supplied to the signal processing microcomputer 151 and the final reading operation is executed.

For example, in the case where the character multiplex broadcasting data has been recorded in the optional areas of the VAUX without decoding, the character multiplex broadcasting data is reconstructed into the composite video signal in the following manner.

First, the contents of the TO pack (VAUX text header pack) and teletext information pack in FIG. 32 are fetched by the signal processing microcomputer 151 in FIG. 61. The data that is used for display is given to the mode processing microcomputer 117 in FIG. 60. After that, the original data of the character multiplex broadcast obtained by eliminating the pack header 01100111 of each pack from the packs T1 to T71 is extracted and accumulated into an FIFO 301 in FIG. 62. A clock PBCK formed by the signal processing microcomputer 151 is used as a write clock of the FIFO 301. When the signal processing microcomputer 151 recognizes the terminate code of the T71 pack, the generation of the PBCK is stopped. That is, the writing into the FIFO 301 is stopped. Although the accumulation of the data is completed at the end of one frame period (for example, scan of ten tracks here), the ID code data of the T1 pack is soon fetched into a D F/F 303. Since there is the broadcasting system ID code here, the ID code data is input to a timing controller 302 to control the timing of the FIFO 301 or the like.

The ID code data is compared with the ID which the set itself has and a check is made to see if it is the character multiplex system that cannot be reproduced by the set or not. If NO, the fetched data is abandoned as it is and the subsequent operations are stopped. When it can be reproduced, the odd number/even number and the line number which have already been fetched in the D F/F 303 are converted into the inherent H line number by a decoder 304.

A stable clock using a crystal is formed by an fsc oscillator 307. Such a clock is used as a master clock and various clocks are formed from the master clock. That is, the clock is frequency divided into 16/5 by a frequency divider 308 and is further supplied to a ½ frequency divider 309 in order to obtain a duty ratio 50%. Thus, an SCK of 5.727272 MHz as a basic clock of the Japanese character multiplex broadcast is formed. This clock is further supplied to a ⅛ frequency divider 310 and an LCK clock that is handled on a byte unit basis is formed. The fsc is also supplied to a sync signal generating circuit 311 and an H sync signal is formed. At the same time, a pulse to clear an H counter 313 is formed by a circuit 312. An output HNO. of the H counter 313 is given to a comparator 305.

The comparator 305 always compares the output of the H counter 313 and an H line number output of the decoder 304 and coincidence information is given to the timing controller 302. When they coincide, the next data is input to a D F/F 306 from the FIFO 301. The CRI and the FC that is determined every system have already been prepared for a switch 325.

They are switched in accordance with the order CRI, FC, data, data, . . . and are transmitted to a D F/F 315 and are, further, converted into the serial data by an S/P converter 316 by using the clock SCK.

The output composite signal has to be finally set into the analog signal of 2 Vpp. For this purpose, the serial data and the H sync signal at the TTL level are converted into predetermined voltage levels by TTL → analog level converting circuits 317 and 320. The image data of eight bits is converted into the analog voltage by an A/D converter 326 and is, further, adjusted so as to coincide with a predetermined level by a level converting circuit 318. The fsc is also adjusted to the level as a color burst signal by a circuit 319.

Whether the image data is generated or the character multiplex broadcasting data is generated is judged by switching an analog switch 327 by a coincidence output of the comparator 305. A timing for fetching which data in the H sync is produced by an intra-H timing generating circuit 314. In response to such a timing, the analog switch 321 is switched. Due to this, the H sync, color burst, character multiplex broadcasting data, and image data are sequentially inserted into the H sync in accordance with this order. In the switch 321, the level matching or the like of the pedestal level is also obviously performed and those levels are mixed in an analog manner. An output of the switch 321 is adjusted to 2 Vpp by an amplifier 322 and is output as a composite video to an output terminal 323.

Figure 62A:
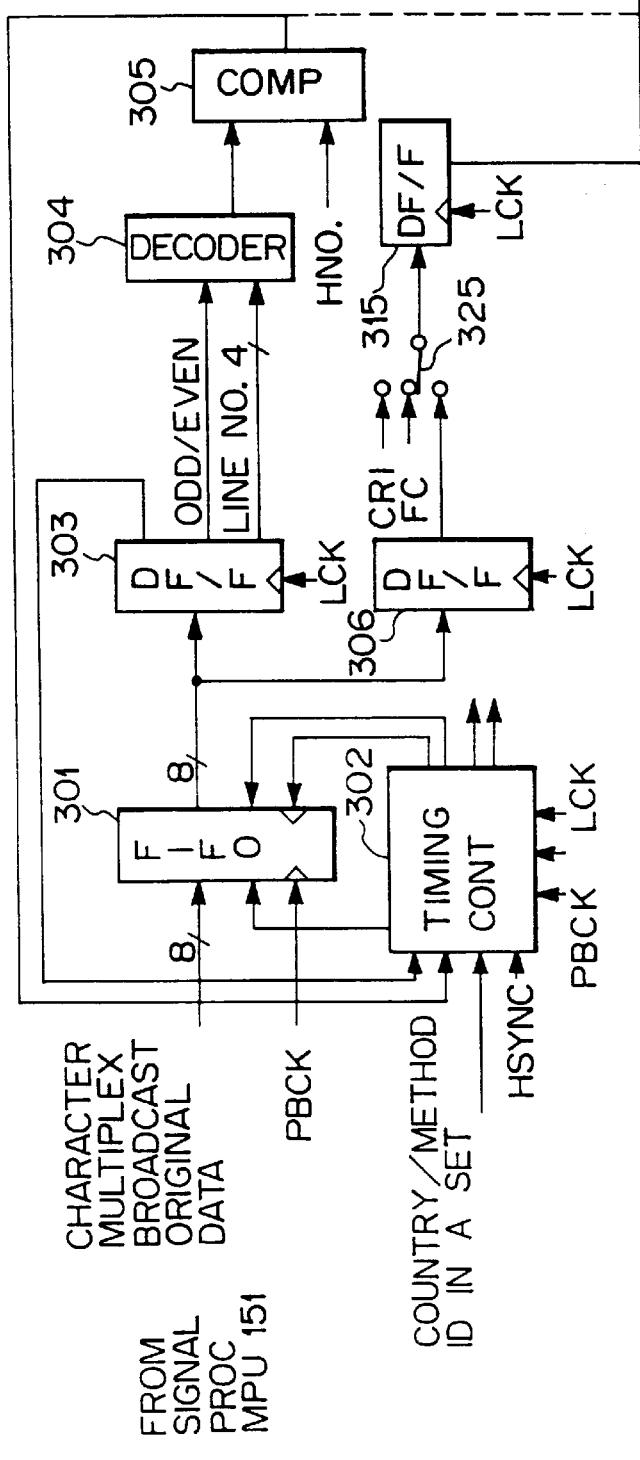
Figure 62B:
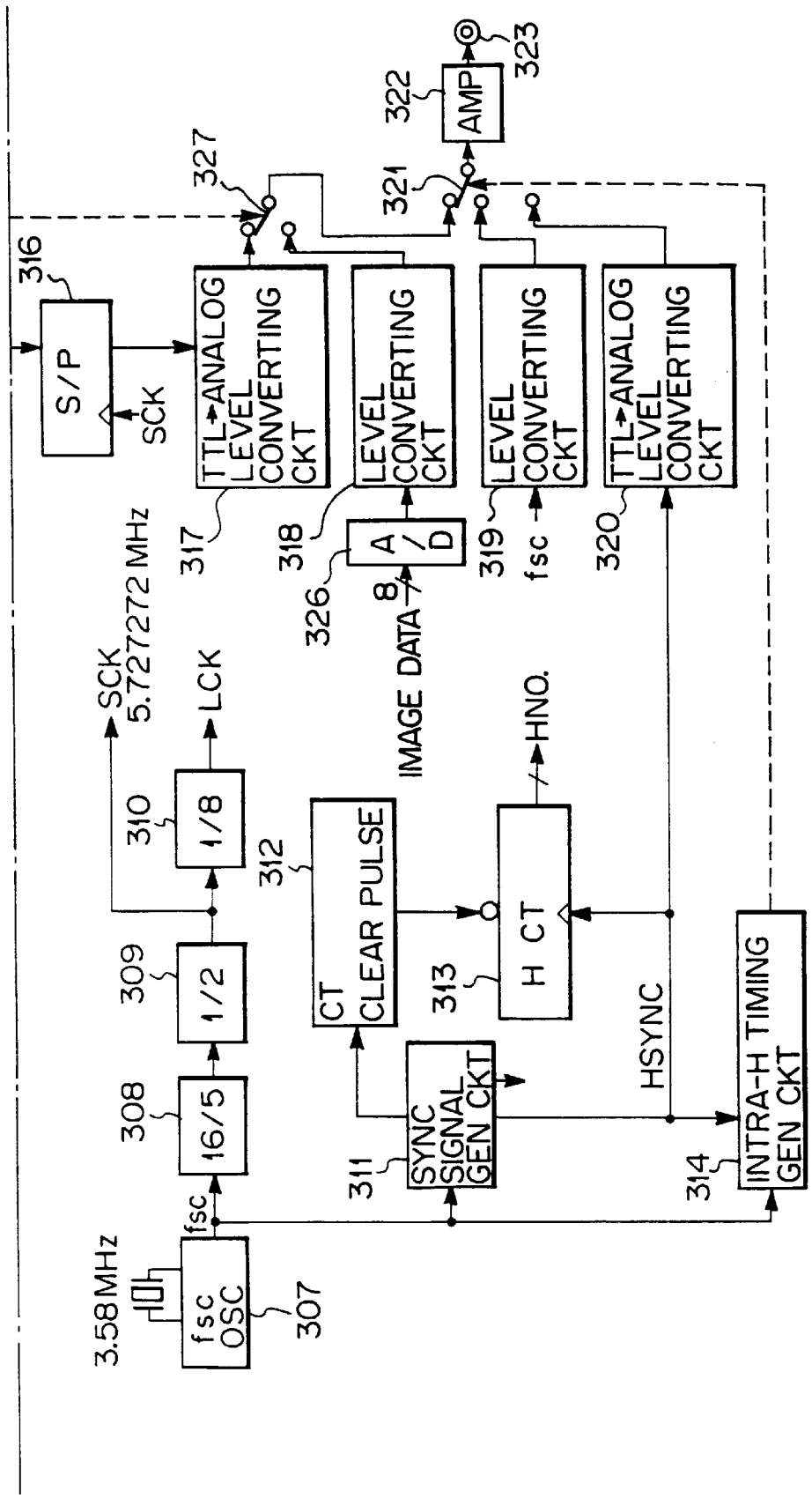

FIGS. 62A and 62B is inserted into a portion obtained by eliminating the sync signal generating circuit 141, synthesizing circuit 137, and analog video output 142 in FIGS. 61A and 61B. That is, an output of the Y/C synthesizing circuit 136 in FIG. 61A and 61B is input to the A/D converting circuit 326. As shown in FIGS. 41A and 41B, when the character broadcast is decoded and recorded, the character data is handed over by the linking operation of the signal processing microcomputer 151 in FIGS. 61A and 61B and the mode processing microcomputer 117 in FIGS. 60A and 60B. The mode processing microcomputer judges the text type in the program text header and executes a display operation.

According to the above apparatus, by recording only the character broadcasting program which the viewer wants to see onto the tape, the viewer can see the character broadcasting program while eliminating the waiting time for the data reception and a consumption amount of the tape can be also reduced.

That is, in the above apparatus, only when the designated character broadcasting program is received, a capstan or the like is controlled and the data is recorded onto the tape. Therefore, by reproducing the tape, the viewer can see the character broadcasting program while eliminating the waiting time.

By simultaneously recording the character multiplex broadcast irrespective of whether the user is conscious or not, the data can be also effectively used later. A broadcast such as subtitle broadcast, complementary broadcast, or the like regarding the television program is particularly useful. As for the recording area, not only the conventional optional areas of the VAUX but also the other areas can be efficiently recorded.

We claim:

1. A recording and reproducing apparatus comprising:
   means for receiving character broadcasting information transmitted via a vertical blanking signal of an audio/video signal;
   means for detecting a prefix portion of the character broadcasting information and for recognizing character information of the character broadcasting information;
   means for selecting desired character information from the recognized character information;
   separating means for separating said desired character information from said character broadcasting information according to said detected prefix portion;
   recording means for recording said separated character information in a pack structure so that said separated character information may be recorded a plurality of times in a plurality of tracks, and at different corresponding positions within adjacent tracks independent of said audio/video signal, wherein a video signal is recorded on a first area of a recording medium, an audio signal is recorded on a second area of the recording medium, and said separated character information is recorded on a third area of the recording medium;
   reproducing means for reproducing said recorded character information, said recorded audio signal, and said recorded video signal from said recording medium;
   means for inserting the reproduced character information into a predetermined vertical blanking period of a corresponding reproduced audio/video signal to produce a combined signal; and
   means for outputting the combined signal.

2. A recording and reproducing apparatus according to claim 1, wherein said recording and reproducing apparatus is a digital signal recording and reproducing apparatus which digitally encodes analog signals or digital signals before the recording and/or reproducing thereof.

3. The recording and reproducing apparatus according to claim 1, wherein said selected character information comprises a plurality of pages, and said recording means operates to record the separated character information when all of the character information is received.

4. The recording and reproducing apparatus according to claim 3, wherein said recording means sequentially records in accordance with the order of page numbers.

5. The recording and reproducing apparatus according to claim 4, further comprising means for designating the recording order of the plurality of pages; and
   wherein said recording means sequentially records in accordance with said designated page order.

6. The recording and reproducing apparatus according to claim 1, wherein said recording means records portions excluding clock run-in and framing code portions in a character broadcasting signal without decoding.

7. The recording and reproducing apparatus according to claim 1, wherein said recording means further includes means for decoding said separated character information.

8. The recording and reproducing apparatus according to claim 1, further comprising means for detecting whether the contents of said character information have been updated; and
   wherein the selected character information is repetitively received and wherein the record means is operative to record the updated character information if it is determined that the contents have been updated.

9. The recording and reproducing apparatus according to claim 8, wherein if it is determined that the contents were updated, the updated character information is recorded together with an update time.

10. The recording and reproducing apparatus according to claim 1, wherein said recorded audio/video signal corresponds to the character information, and further comprising:
    means for inserting the reproduced character information into a predetermined vertical blanking period of the corresponding audio/video signal to produce a combined signal; and
    means for outputting the combined signal.

* * * * *